United States Patent
Han et al.

(10) Patent No.: US 10,649,461 B2
(45) Date of Patent: May 12, 2020

(54) AROUND VIEW MONITORING APPARATUS FOR VEHICLE, DRIVING CONTROL APPARATUS, AND VEHICLE

(71) Applicant: LG Electronics Inc., Seoul (KR)

(72) Inventors: Kihoon Han, Seoul (KR); Junghee Park, Seoul (KR); Sangyol Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/835,779

(22) Filed: Dec. 8, 2017

(65) Prior Publication Data
US 2018/0164831 A1    Jun. 14, 2018

(30) Foreign Application Priority Data
Dec. 9, 2016 (KR) .......................... 10-2016-0167365

(51) Int. Cl.
*H04N 7/18*      (2006.01)
*G05D 1/02*      (2020.01)
(Continued)

(52) U.S. Cl.
CPC ............. *G05D 1/0246* (2013.01); *B60R 1/00* (2013.01); *B60R 11/04* (2013.01); *G06T 3/0018* (2013.01); *G06T 5/006* (2013.01); *H04L 29/06027* (2013.01); *H04L 29/08* (2013.01); *B60R 2001/1253* (2013.01); *B60R 2300/105* (2013.01); *B60R 2300/207* (2013.01);
(Continued)

(58) Field of Classification Search
CPC ........ B01D 71/52; B01D 71/68; B01D 71/76; B01D 71/82; C08G 65/00; G05D 1/0246; G06T 3/0018; G06T 5/006; H04L 29/06027

USPC ......................................................... 348/148
See application file for complete search history.

(56) References Cited

U.S. PATENT DOCUMENTS 9,712,791 B2 *  7/2017  Kim ..................... H04N 7/181
10,214,156 B2 *  2/2019  Moenig ................. B60R 11/04
(Continued)

FOREIGN PATENT DOCUMENTS

JP    2010042727    2/2010
JP    4640238       3/2011
(Continued)

OTHER PUBLICATIONS

Extended European Search Report in European Application No. 17197695.4, dated Nov. 27, 2017, 6 pages.

*Primary Examiner* — Gims S Philippe
(74) *Attorney, Agent, or Firm* — Fish & Richardson P.C.

(57) ABSTRACT

An apparatus configured to provide a view around a vehicle, the apparatus including: a plurality of cameras attached to a body of the vehicle and configured to acquire respective images of surroundings of the vehicle, wherein at least one of the plurality of cameras is attached to a moving part of the body of the vehicle; a display unit; and at least one processor. The at least one processor is configured to: obtain movement information of the moving part of the body of the vehicle; generate an around view image by compositing respective images acquired by the plurality of cameras; correct the around view image based on the movement information of the moving part of the body of the vehicle; and control the display unit to display the corrected around view image.

33 Claims, 45 Drawing Sheets

(51) Int. Cl.
*B60R 1/00* (2006.01)
*B60R 11/04* (2006.01)
*G06T 3/00* (2006.01)
*G06T 5/00* (2006.01)
*H04L 29/06* (2006.01)
*H04L 29/08* (2006.01)
*B60R 1/12* (2006.01)

(52) U.S. Cl.
CPC ... *B60R 2300/303* (2013.01); *B60R 2300/402* (2013.01); *B60R 2300/607* (2013.01); *B60R 2300/8093* (2013.01)

(56) References Cited

U.S. PATENT DOCUMENTS

| | | | |
|---|---|---|---|
| 2002/0039136 A1* | 4/2002 | Okamoto | B60R 1/00 348/148 |
| 2008/0294315 A1* | 11/2008 | Breed | B60N 2/002 701/49 |
| 2014/0160275 A1* | 6/2014 | Sakakibara | B62D 15/029 348/118 |
| 2015/0350607 A1 | 12/2015 | Jang et al. | |
| 2016/0159281 A1 | 6/2016 | Kim et al. | |
| 2017/0286763 A1* | 10/2017 | Fukuda | G06T 7/254 |
| 2019/0163988 A1* | 5/2019 | Watanabe | B60W 50/14 |

FOREIGN PATENT DOCUMENTS

| | | |
|---|---|---|
| JP | 2014049848 | 3/2014 |
| KR | 102016007384 | 6/2016 |

\* cited by examiner

1931

AROUND VIEW MONITORING APPARATUS FOR VEHICLE, DRIVING CONTROL APPARATUS, AND VEHICLE

CROSS-REFERENCE TO RELATED APPLICATION

This application claims an earlier filing date and right of priority to Korean Patent Application No. 10-2016-0167365, filed on Dec. 9, 2016 in the Korean Intellectual Property Office, the contents of which is incorporated herein by reference in its entirety.

TECHNICAL FIELD

The present disclosure relates to an apparatus for providing a view around a vehicle, a driving control apparatus, and a vehicle.

BACKGROUND

A vehicle is an apparatus that moves in a direction desired by a user riding therein. A typical example of the vehicle may be an automobile.

A variety of sensors and electronic devices are being mounted in vehicles to enhance user convenience. For example, an Advanced Driver Assistance System (ADAS) is being actively studied for user driving convenience. In addition, autonomous vehicles are under active development.

SUMMARY

In one aspect, an apparatus configured to provide a view around a vehicle includes: a plurality of cameras attached to a body of the vehicle and configured to acquire respective images of surroundings of the vehicle, wherein at least one of the plurality of cameras is attached to a moving part of the body of the vehicle; a display unit; and at least one processor. The at least one processor is configured to: obtain movement information of the moving part of the body of the vehicle; generate an around view image by compositing respective images acquired by the plurality of cameras; correct the around view image based on the movement information of the moving part of the body of the vehicle; and control the display unit to display the corrected around view image.

Implementations may include one or more of the following features. For example, the at least one processor is configured to control the display unit to display a correction status of the around view image.

In some implementations, the at least one processor is configured to: determine that a blind spot is created in the around view image due to a movement of the moving part; and highlight a region in the corrected around view image, wherein the region corresponds to the blind spot.

In some implementations, the at least one processor is configured to, based on the movement information of the moving part of the body of the vehicle, correct the around view image by modifying a composition region of an image acquired by a camera attached to the moving part, wherein the composition region is a portion of the image used for generating the around view image.

In some implementations, the apparatus further includes a camera position adjustment unit configured to adjust respective positions of the plurality of cameras, and the at least one processor is configured to adjust, based on the movement information of the moving part, the respective positions of the plurality of cameras through the camera position adjustment unit.

In some implementations, the plurality of cameras includes a first camera attached to the moving part, the camera position adjustment unit includes a first drive unit configured to adjust a position of the first camera, and the at least one processor is configured to: acquire first movement information indicating a movement of the moving part in a first direction; and based on the first movement information, control the first drive unit to move the first camera in a second direction opposite to the first direction.

In some implementations, the at least one processor is configured to: determine a first speed at which the moving part moves in the first direction; and control the first drive unit to move the first camera in the second direction at a second speed that corresponds to the first speed of the moving part moving in the first direction.

In some implementations, the apparatus further includes an auxiliary camera configured to acquire an auxiliary image, and the at least one processor is configured to: acquire the auxiliary image based on a detection of movement of the moving part; and correct the around view image by compositing the auxiliary image.

In some implementations, the at least one processor is configured to control the display unit to display information associated with a state of movement of the moving part.

In some implementations, the moving part includes a left side mirror and a right side mirror, the plurality of cameras includes a first camera attached to the left side mirror and a second camera attached to the right side mirror, and the at least one processor is configured to correct the around view image based on respective movement information of the left side mirror and the right side mirror.

In some implementations, the at least one processor is configured to: determine that a blind spot is created in the around view image due to respective folding movements of the left side mirror and the right side mirror, and highlight a region in the corrected around view image, wherein the region corresponds to the blind spot.

In some implementations, the at least one processor is configured to correct the around view image by modifying a first composition region of a first image acquired by the first camera based on a folding movement of the left side mirror and by modifying a second composition region of a second image acquired by the second camera based on a folding movement of the right side mirror, wherein the first and second composition regions are respective portions of the first and second images used for generating the around view image.

In some implementations, the apparatus further includes a camera position adjustment unit configured to adjust respective positions of the plurality of cameras, wherein the camera position adjustment unit includes a first drive unit configured to adjust a position of the first camera and a second drive unit configured to adjust a position of the second camera, and the at least one processor is configured to: control the first drive unit to move the first camera based on a folding movement of the left side mirror; and control the second drive unit to move the second camera based on a folding movement of the right side mirror.

In some implementations, the at least one processor is configured to: control the first drive unit to move the first camera in a direction opposite to a direction of the folding movement of the left side mirror; and control the second drive unit to move the second camera in a direction opposite to a direction of the folding movement of the right side mirror.

In some implementations, the at least one processor is configured to: determine a first speed of the folding movement of the left side mirror and a second speed of the folding movement of the right side mirror; control the first drive unit to move the first camera at a third speed that corresponds to the first speed of the folding movement of the left side mirror; and control the second drive unit to move the second camera at a fourth speed that corresponds to the second speed of the folding movement of the right side mirror.

In some implementations, the at least one processor is configured to control the display unit to display information associated with respective states of folding movement of the left side mirror and the right side mirror.

In some implementations, the moving part includes a left front door and a right front door; the plurality of cameras includes a first camera attached to the left front door and a second camera attached to the right front door; and the at least one processor is configured to correct the around view image based on respective movement information of the left front door and the right front door.

In some implementations, the at least one processor is configured to: determine that a blind spot is created in the around view image due to respective opening movements of the left front door and the right front door; and highlight a region in the corrected around view image, wherein the region corresponds to the blind spot.

In some implementations, the at least one processor is configured to correct the around view image by modifying a first composition region of a first image acquired by the first camera based on an opening movement of the left front door and by modifying a second composition region of a second image acquired by the second camera based on an opening movement of the right front door, wherein the first and second composition regions are respective portions of the first and second images used for generating the around view image.

In some implementations, at least one processor is configured to control the display unit to display information associated with respective states of opening movement of the left front door and the right front door.

In some implementations, the apparatus further includes: a first auxiliary camera configured to acquire a first auxiliary image of a left side area of the vehicle; and a second auxiliary camera configured to acquire a second auxiliary image of a right side area of the vehicle, and the at least one processor is configured to: acquire the first and second auxiliary images based on a detection of respective opening movements of the left front door and the right front door; and correct the around view image by compositing the first and second auxiliary images.

In some implementations, the first auxiliary camera is attached to an inner surface of the left front door or to a left rocker panel, and the second auxiliary camera is attached to an inner surface of the right front door or to a right rocker panel.

In some implementations, the at least one processor is configured to: acquire movement information associated with respective opening movements of the left rear door and the right rear door; determine that a blind spot is created in the around view image due to respective opening movements of the left rear door and the right rear door; and highlight a region in the corrected around view image, wherein the region corresponds to the blind spot.

In some implementations, the at least one processor is configured to control the display unit to display information associated with respective states of opening movement of the left rear door and the right rear door.

In some implementations, the apparatus further includes: a third auxiliary camera configured to acquire a third auxiliary image of a left side area of a vehicle; and a fourth auxiliary camera configured to acquire a fourth auxiliary image of a right side area of the vehicle, and the at least one processor is configured to: acquire the third and fourth auxiliary images based on a detection of respective opening movements of the left rear door and the right rear door; and correct the around view image by compositing the third and fourth auxiliary images.

In some implementations, the third auxiliary camera is attached to an inner surface of the left rear door or to a left rocker panel, and the fourth auxiliary camera is attached to an inner surface of the right rear door or to a right rocker panel.

In some implementations, the moving part includes a rearward door, the plurality of cameras includes a third camera attached to the rearward door, and the at least one processor is configured to correct the around view image based on movement information of the rearward door.

In some implementations, the at least one processor is configured to: determine that a blind spot has been created in the around view image due to an opening movement of the rearward door; and highlight a region in the corrected around view image, wherein the region corresponds to the blind spot.

In some implementations, the at least one processor is configured to, based on an opening movement of the rearward door, correct the around view image by modifying a composition region of a third image acquired by the third camera, wherein the composition region is a portion of the third image used for generating the around view image.

In some implementations, the at least one processor is configured to correct the around view image by scaling the third image based on the opening movement of the rearward door.

In some implementations, the apparatus further includes a camera position adjustment unit configured to adjust respective positions of the plurality of cameras, wherein the camera position adjustment unit includes a third drive unit configured to adjust a position of the third camera, and the at least one processor is configured to control the third drive unit to move the third camera based on an opening movement of the rearward door.

In some implementations, the at least one processor is configured to, based on the opening movement of the rearward door, control the third drive unit to rotate the third camera in a direction opposite to a direction of the opening movement of the rearward door.

In some implementations, the at least one processor is configured to: determine a speed of the opening movement of the rearward door; and control the third drive unit to move the third camera at a speed proportional to the speed of the opening movement of the rearward door.

In some implementations, the at least one processor is configured to control the display unit to display information associated with a state of movement of the rearward door.

In some implementations, the at least one processor is configured to: detect an object outside the vehicle based on the corrected around view image; and provide a first control signal for controlling a movement of the vehicle, the first control signal based on the detection of the object; and control the movement of the vehicle based on the first control signal.

In some implementations, the moving part includes at least one of a front left door, a front right door, a rear left door, a rear right door, or a rearward door, and the at least one processor is configured to determine that the vehicle is moving and the moving part is open.

In some implementations, the at least one processor is configured to: acquire distance information associated with a distance between the detected object and the vehicle; determine that the distance between the detected object and the vehicle is less than or equal to a reference value; and set the first control signal to perform a brake operation of the vehicle.

In some implementations, the apparatus further includes a sound output unit, and the at least one processor is configured to: determine that a passenger is boarding or disembarking from the vehicle; determine that the distance between the detected object and the vehicle is less than or equal to the reference value, and the vehicle is stopped; and control the sound output unit to output a warning sound.

In some implementations, the at least one processor is configured to: determine that the distance between the detected object and the vehicle is less than or equal to the reference value; and provide a signal to restrict movement of the moving part.

In some implementations, the at least one processor is configured to: acquire seat occupancy information; and control the display unit or a sound output unit to output the seat occupancy information.

In some implementations, the at least one processor is configured to provide a second control signal to perform an autonomous parking maneuver based on the corrected around view image.

In some implementations, the moving part includes a left side mirror and a right side mirror, and the at least one processor is configured to, based on the corrected around view image, provide the second signal to perform the autonomous parking maneuver with the left side mirror and the right side mirror in folded positions.

In some implementations, the moving part includes at least one of a front left door, a front right door, a rear left door, a rear right door, or a rearward door, and the at least one processor is configured to provide the second signal to perform the autonomous parking maneuver with the moving part open.

In some implementations, the at least one processor is configured to: determine that a blind spot has been created in the corrected around view image due to a movement of the moving part; and set the second control signal to stop the autonomous parking maneuver.

In another aspect, a driving control apparatus includes: an apparatus configured to provide a view around a vehicle, the apparatus including a plurality of cameras attached to a body of the vehicle and configured to acquire respective images of surroundings of the vehicle, wherein at least one of the plurality of cameras is attached to a moving part of the body of the vehicle; a display unit; an object detection sensor comprising at least one of a camera, a radar, a lidar, an ultrasonic sensor, or an infrared sensor, and configured to detect the object and generate information associated with the object; and at least one processor. The at least one processor is configured to: obtain movement information of the moving part of the body of the vehicle; generate an around view image by compositing respective images acquired by the plurality of cameras; correct the around view image based on the movement information of the moving part of the body of the vehicle; control the display unit to display the corrected around view image; detect an object outside the vehicle based on the corrected around view image; provide a first control signal for controlling a movement of the vehicle, the first control signal based on the detection of the object; generate a third control signal based on the information associated with the object to control the movement of the vehicle; and control the movement of the vehicle based on the first control signal and the third control signal.

In another aspect, a vehicle includes: a plurality of wheels; a power source configured to drive at least two of the plurality of wheels; and an apparatus configured to provide a view around a vehicle, the apparatus including a plurality of cameras attached to a body of the vehicle and configured to acquire respective images of surroundings of the vehicle, wherein at least one of the plurality of cameras is attached to a moving part of the body of the vehicle; a display unit; and at least one processor. The at least one processor is configured to: obtain movement information of the moving part of the body of the vehicle; generate an around view image by compositing respective images acquired by the plurality of cameras; correct the around view image based on the movement information of the moving part of the body of the vehicle; and control the display unit to display the corrected around view image.

All or part of the features described throughout this application may be implemented as a computer program product including instructions that are stored on one or more non-transitory machine-readable storage media, and that are executable on one or more processing devices. All or part of the features described throughout this application may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1:
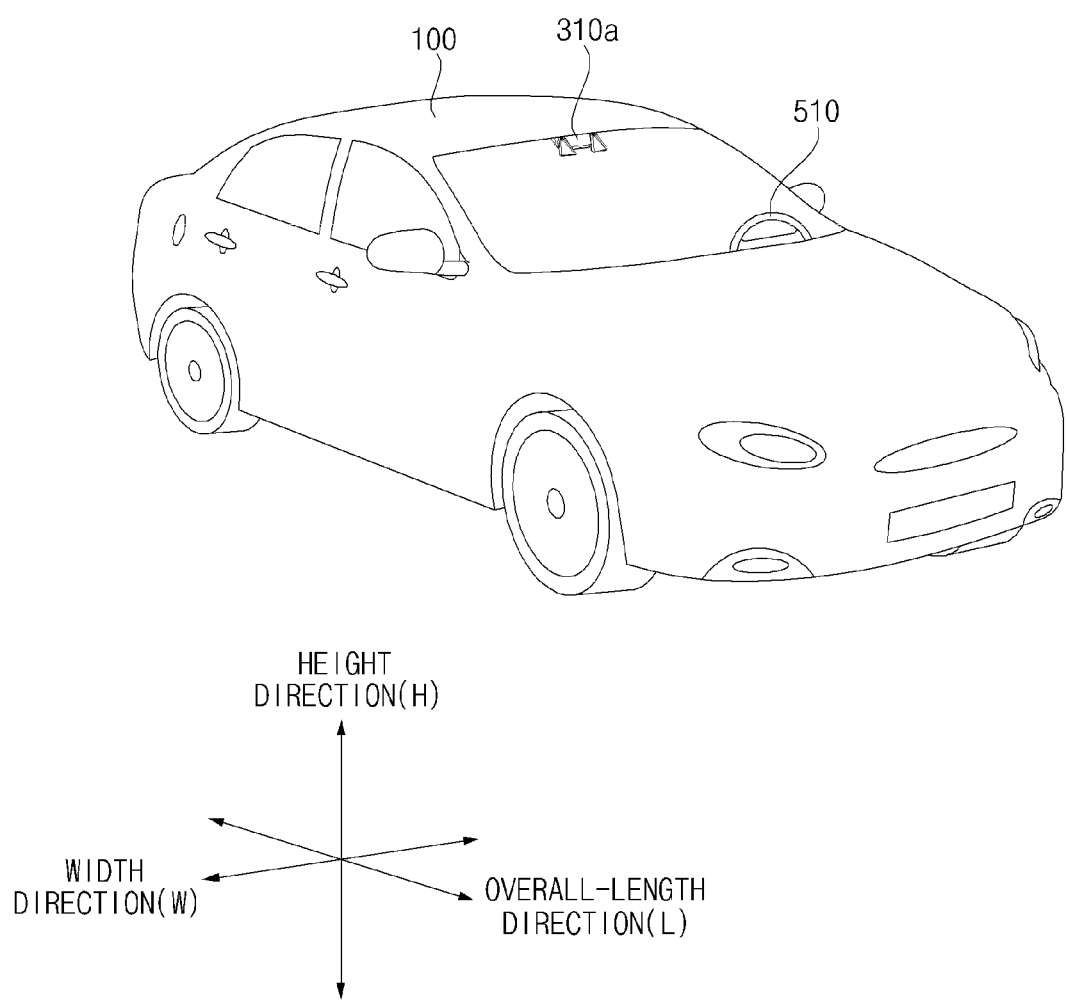
FIG. 1 is a diagram illustrating an example of an exterior of a vehicle.

An apparatus for a vehicle is described herein that adaptively provides views of the surroundings of a vehicle and adaptively controls the vehicle. Although some vehicles may be provided with an around-view monitoring (AVM) apparatus that includes a plurality of cameras, such apparatus may provide inaccurate around view images in certain situations. For example, if a camera is attached to a moveable part of the vehicle such as a side mirror, a door, or a rearward door, the camera may move along with the object to which it is attached, thereby generating an inaccurate around view image.

Systems and techniques are disclosed herein that enable an apparatus that adaptively provides an around-view of a vehicle and adaptively controls the vehicle using at least one camera attached to a moveable part of the vehicle.

In some implementations, the apparatus provides a user with a corrected around view image to a user based on a current configuration of the vehicle. The apparatus may also inform the user of the current configuration of the vehicle (e.g., rear door is open).

The apparatus may improve safe driving by highlighting a region corresponding to a blind spot which has been created by movement of a camera attached to a moving part, and alerting the user to the created blind spot.

In some implementations, an auxiliary camera is provided to reduce or eliminate the blind spot caused by movement of a camera.

In some implementations, an orientation of the camera attached to a moving part is modified in response to movement of the moving part to at least partially correct the around view image.

Some implementations may provide an Around View Monitoring (AVM) apparatus that provides an around view image which is not distorted despite movement of a moving part.

The driving control apparatus may include an AVM apparatus.

In accordance with an implementation of the present disclosure, an Around View Monitoring (AVM) apparatus includes: a plurality of cameras attached to at least one of a moving part and a fixed part of a vehicle body; a display unit; and at least one processor configured to acquire movement information of the moving part, generate an around view image by compositing a plurality of images acquired by the plurality of cameras, correct the around view image based on the movement information, and control the display unit to output the corrected around view image.

In some implementations, a driving control apparatus includes: an Around View Monitoring (AVM) apparatus; an object detection sensor configured to comprise at least one of a camera, a radar, a lidar, an ultrasonic sensor, and an infrared sensor, detect a surrounding object, and generate information on the object; and a controller configured to generate movement of the vehicle based on the information on the object, and control a vehicle drive device to cause the vehicle to move based on the first control signal and the second control signal.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a diagram illustrating an example of an exterior of a vehicle.

Figure 2:
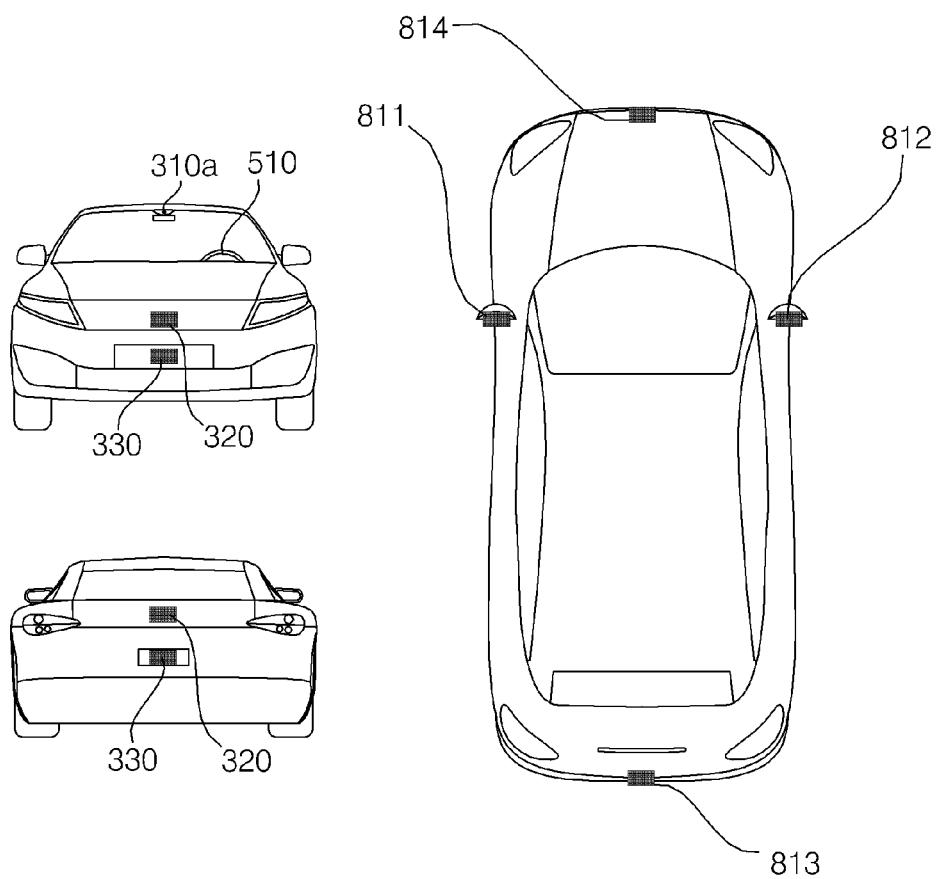
FIG. 2 is a diagram illustrating an example of a vehicle at various angles.

FIG. 2 is a diagram illustrating an example of a vehicle at various angles.

Figure 3:
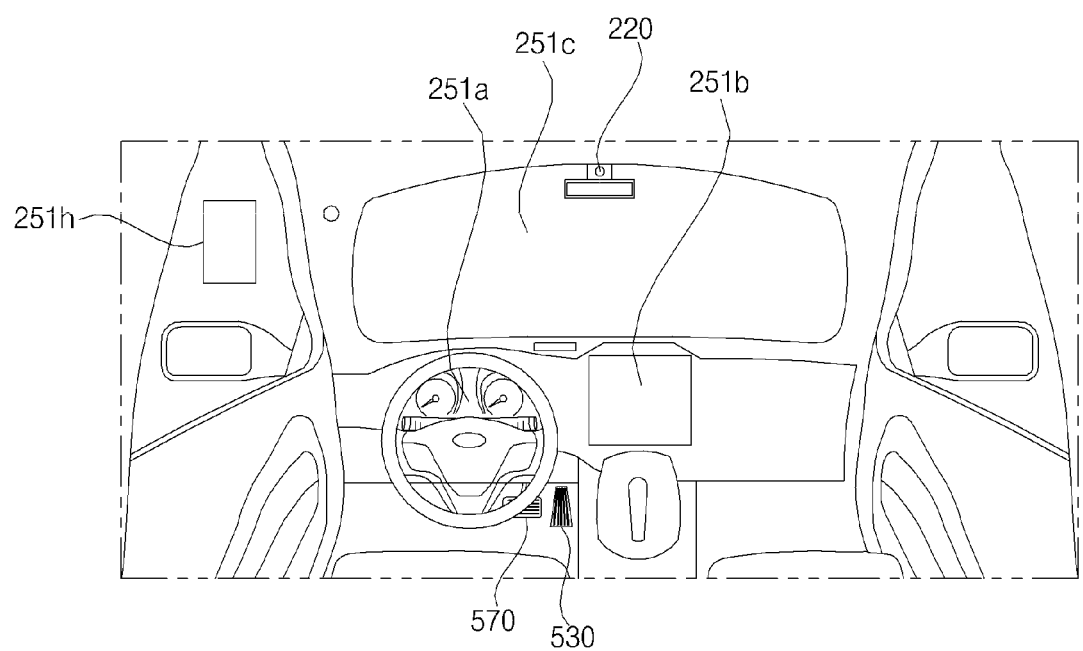
FIGS. 3 and 4 are views illustrating an interior portion of an example of a vehicle.
Figure 4:
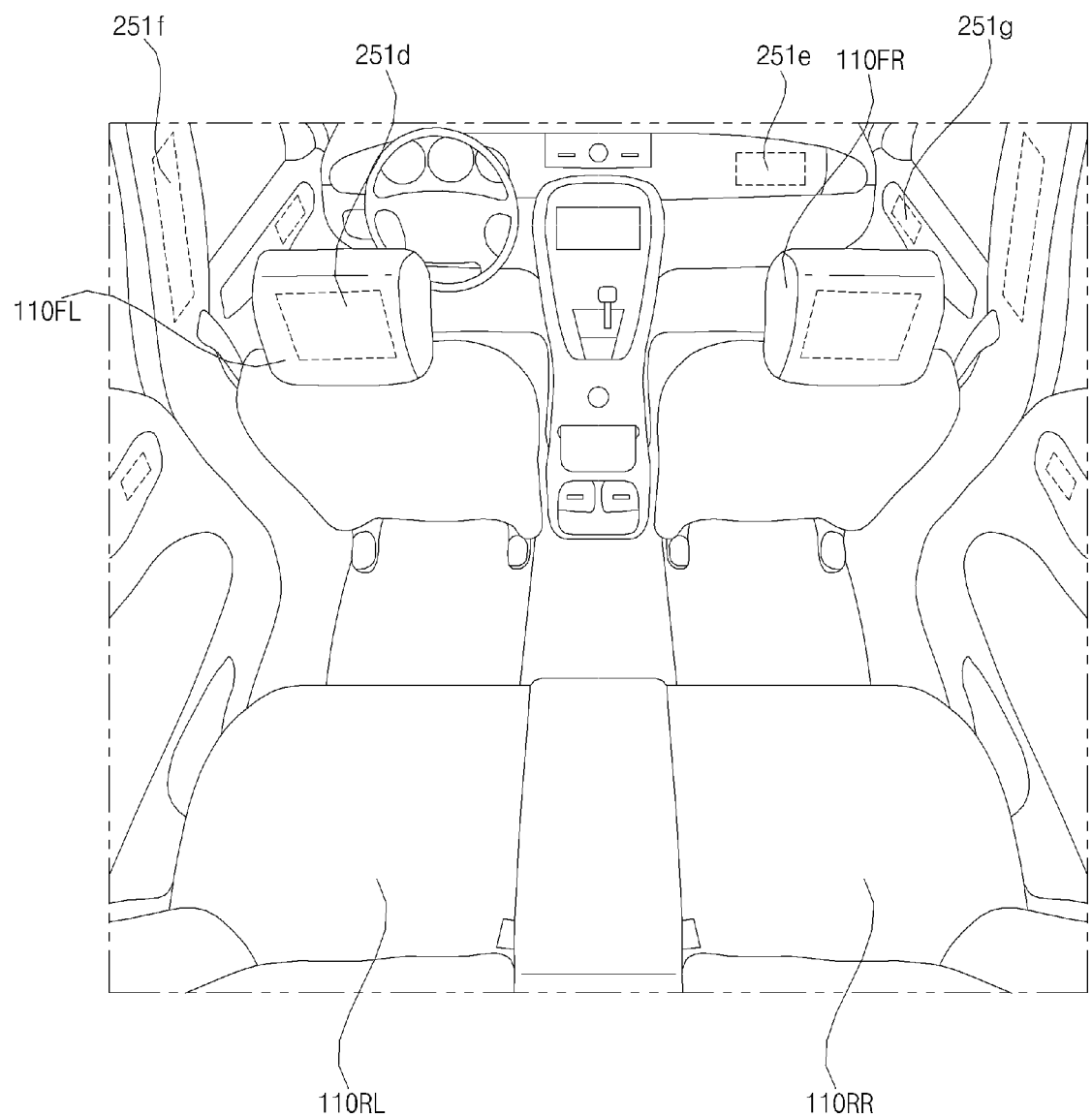

FIGS. 3 and 4 are views illustrating an interior portion of an example of a vehicle.

Figure 5:
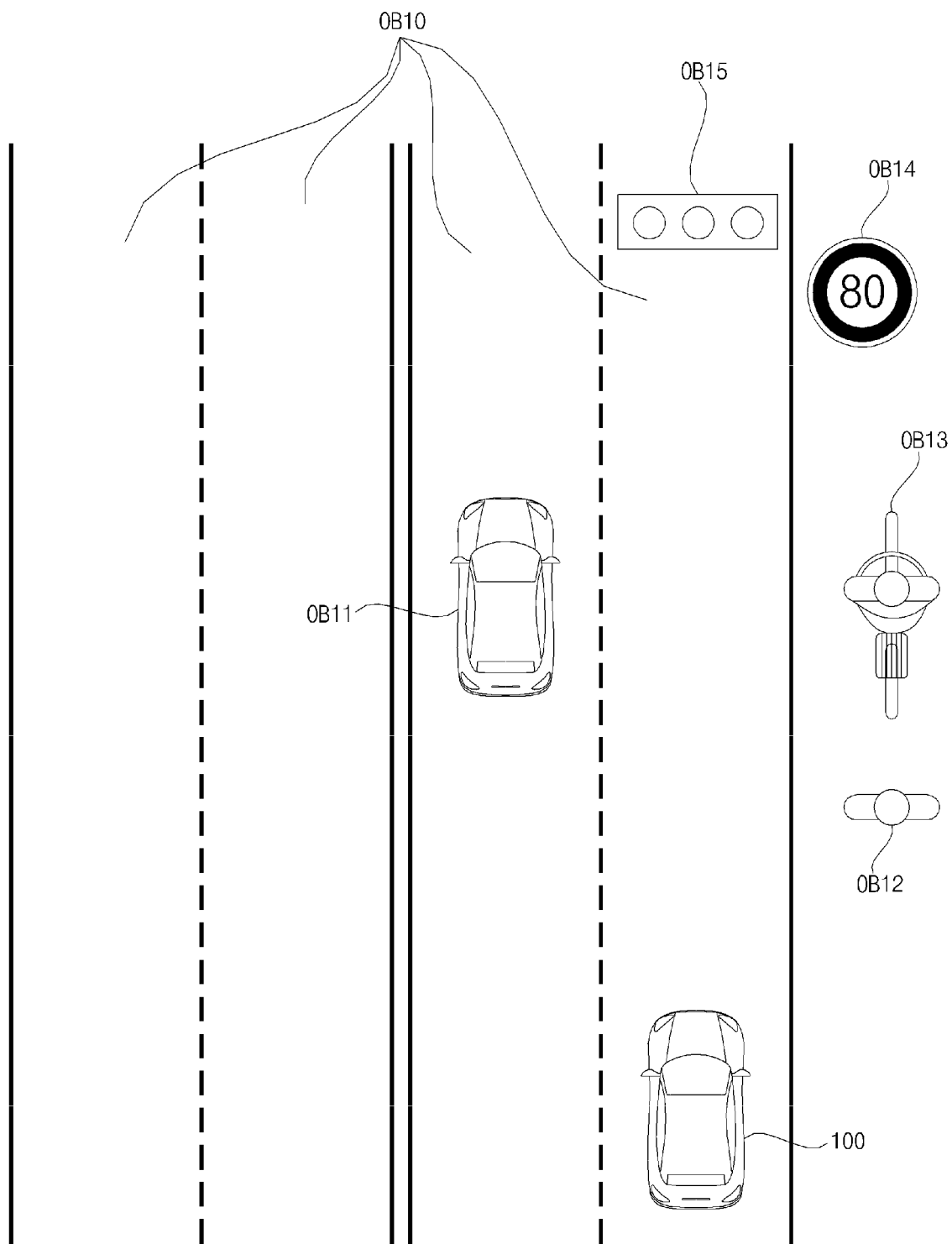
FIGS. 5 and 6 are reference views illustrating examples of objects that are relevant to driving.
Figure 6:
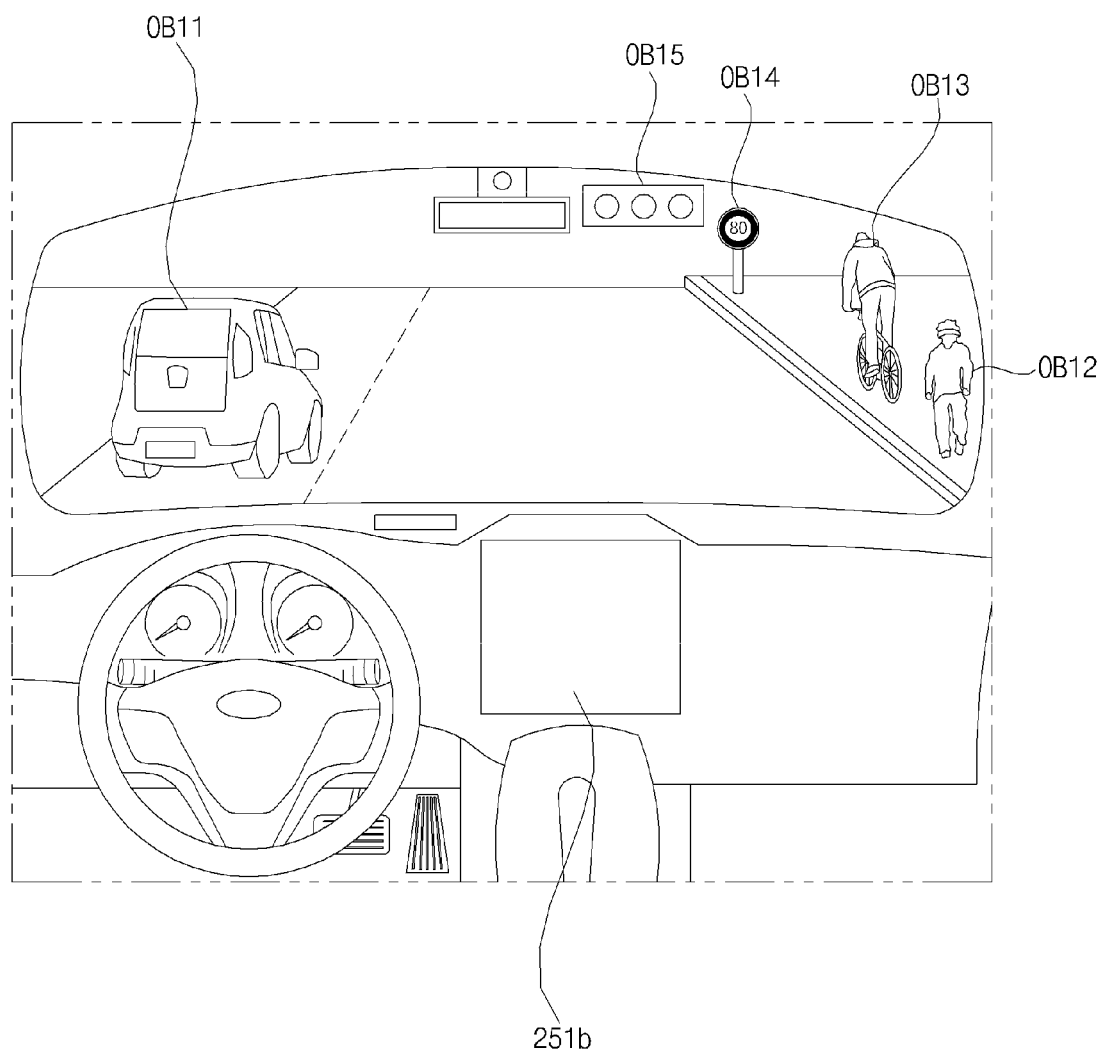

FIGS. 5 and 6 are reference views illustrating examples of objects that are relevant to driving.

Figure 7:
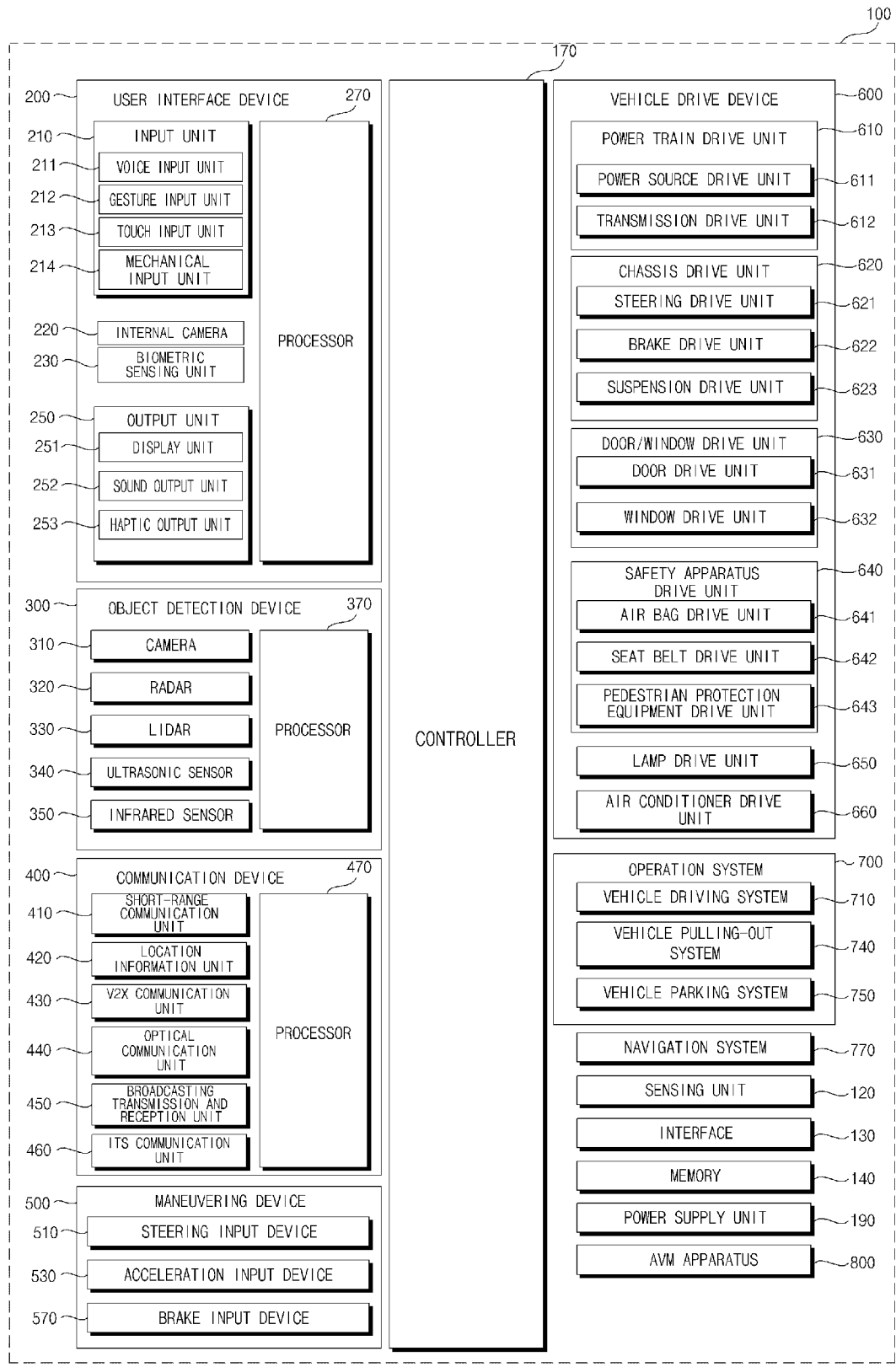
FIG. 7 is a block diagram illustrating subsystems of an example of a vehicle.

FIG. 7 is a block diagram illustrating subsystems of an example of a vehicle.

FIGS. 1 to 7, a vehicle 100 may include a plurality of wheels, which are rotated by a power source, and a steering input device 510 for controlling the driving direction of the vehicle 100.

The vehicle 100 may be an autonomous vehicle.

The vehicle 100 may be switched to an autonomous driving mode or a manual mode in response to a user input.

For example, in response to a user input received through a user interface apparatus 200, the vehicle 100 may be switched from a manual mode to an autonomous driving mode, or vice versa. The vehicle 100 may be switched to an autonomous mode or a manual mode based on driving situation information.

The driving situation information may include at least one of the following: information on an object outside a vehicle, navigation information, and vehicle condition information.

For example, the vehicle 100 may be switched from the manual mode to the autonomous driving mode, or vice versa, based on driving situation information generated in the object detection apparatus 300.

In another example, the vehicle 100 may be switched from the manual mode to the autonomous driving mode, or vice versa, based on driving situation information received through a communication apparatus 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on an operation system 700.

For example, the autonomous vehicle 100 may operate based on information, data, or signals generated in a driving system 710, a parking-out system 740, and a parking system 750.

While operating in the manual mode, the autonomous vehicle 100 may receive a user input for driving of the vehicle 100 through a driving operation device 500. The vehicle 100 may operate based on the user input received through the driving operation device 500.

The term "overall length" refers to the length from the front end to the rear end of the vehicle 100, the term "overall width" refers to the width of the vehicle 100, and the term "overall height" refers to the height from the bottom of the wheel to the roof. In the following description, the term "overall length direction L" may refer to the reference direction for the measurement of the overall length of the vehicle 100, the term "overall width direction W" may refer to the reference direction for the measurement of the overall width of the vehicle 100, and the term "overall height direction H" may refer to the reference direction for the measurement of the overall height of the vehicle 100.

As illustrated in FIG. 7, the vehicle 100 may include the user interface apparatus 200, the object detection apparatus 300, the communication apparatus 400, the driving operation device 500, a vehicle drive apparatus 600, an operation system 700, a navigation system 770, a sensing unit 120, an interface unit 130, a memory 140, at least one processor such as controller 170, a power supply unit 190, and an Around View Monitoring (AVM) apparatus 800.

In some implementations, the vehicle 100 may further include other components in addition to the aforementioned components, or may not include some of the aforementioned components.

The user interface apparatus 200 is configured to communicate between the vehicle 100 and a user. The user interface apparatus 200 may receive a user input, and provide information generated in the vehicle 100 to the user. The vehicle 100 may implement User Interfaces (UI) or User Experience (UX) through the user interface apparatus 200.

The user interface apparatus 200 may include an input unit 210, an internal camera 220, a bio-sensing unit 230, an output unit 250, and at least one processor, such as processor 270.

In some implementations, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be located inside the vehicle 100. For example, the input unit 210 may be disposed in one region of a steering wheel, one region of an instrument panel, one region of a seat, one region of each pillar, one region of a door, one region of a center console, one region of a head lining, one region of a sun visor, one region of a windshield, or one region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of optical output units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be integrally formed with a display unit 251 as one body to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle. The processor 270 may sense a user's condition based on the images of the inside of the vehicle. The processor 270 may acquire information on eye gaze information of the user. The processor 270 may sense a gesture of the user from the images of the inside of the vehicle.

The bio-sensing unit 230 may acquire biological information of the user. The bio-sensing unit 230 may include a sensor for acquire biological information of the user, and may utilize the sensor to acquire finger print information, heart rate information, etc. of the user. The biological information may be used for user authentication.

The output unit 250 is configured to generate a visual, acoustic, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251a to 251g.

The display unit 251 may be disposed in one region of a steering wheel, one region 251a, 251b, or 251e of an instrument panel, one region 251d of a seat, one region 251f of each pillar, one region 251g of a door, one region of a center console, one region of a head lining, one region of a sun visor, one region 251c of a windshield, or one region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output thereof.

The processor 270 may control the overall operation of each unit of the user interface apparatus 200.

In some implementations, the user interface apparatus 200 may include a plurality of processors 270 or may not include the processor 270.

In a case where the user interface apparatus 200 does not include the processor 270, the user interface apparatus 200 may operate under the control of the controller 170 or a processor of a different device inside the vehicle 100.

Meanwhile, the user interface apparatus 200 may be referred to as a display device for vehicles.

The user interface apparatus 200 may operate under the control of the controller 170.

The object detection apparatus 300 is configured to detect an object located outside the vehicle 100. The object detection apparatus 300 may generate object information based on sensing data.

The object information may include information as to whether any object exists, location information of an object, information on distance between the vehicle 100 and the object, and information on speed of the vehicle relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling or a lane next to the lane in which the vehicle 100 is traveling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic lamp OB15, a traffic sign OB14, and a pattern or text painted on a road surface.

The light may be light generated by a lamp provided in the nearby vehicle. The light may be light generated by a street light. The light may be solar light.

The road may include a road surface, a curve, and slopes, such as an uphill slope and a downhill slope.

The structure may be a body located around the road in the state of being fixed onto the ground. For example, the structure may include a streetlight, a roadside tree, a building, a traffic lamp, and a bridge.

The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection apparatus 300 may include a camera 310, a radar 320, a lidar 330, an ultrasonic sensor 340, an infrared sensor 350, and a processor 370.

In some implementations, the object detection device 300 may further include other components in addition to the aforementioned components, or may not include some of the aforementioned components.

The camera 310 may be located at an appropriate position outside the vehicle in order to acquire images of the outside of the vehicle. The camera 310 may be a mono camera, a stereo camera 310a, an Around View Monitoring (AVM) camera 310b, or a 360-degree camera.

The camera 310 may utilize various image processing algorithms to acquire location information of the object, information on the distance to the object, and information on the speed relative to the object.

For example, the camera 310 may acquire the information on the distance to the object and the information on the speed relative to the object, based on a change in size of the object over time in acquired images.

For example, the camera 310 may acquire the information on distance to the object and the information on the speed relative to the object through a pin hole model or through profiling a road surface.

In another example, the camera 310 may acquire the information on the distance to the object and the information on the speed relative to the object, based on information on disparity between stereo images acquired by the stereo camera 310a.

For example, the camera 310 may be disposed near a front windshield in the vehicle in order to acquire images of the front of the vehicle. Alternatively, the camera 310 may be disposed around a front bumper or a radiator grill.

In another example, the camera 310 may be disposed near a rear glass in the vehicle in order to acquire images of the rear of the vehicle. Alternatively, the camera 310 may be disposed around a rear bumper, a trunk, or a tailgate.

In yet another example, the camera 310 may be disposed near at least one of the side windows in the vehicle in order to acquire images of the side of the vehicle. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing sensing data with pre-stored data, the sensing data which is sensed by the camera 310, the radar 320, the lidar 330, the ultrasonic sensor 340, and the infrared sensor 350.

The processor 370 may detect an object and track the detected object based on acquired images. The processor 370 may, for example, calculate the distance to the object and the speed relative to the object.

For example, based on change in size over time of an object in acquired images, the processor 370 may acquire information on distance to the object and information on speed relative to the object.

For example, the processor 370 may acquire information on distance to an object and information on speed relative to the object, by utilizing a pin hole model or by profiling a road surface.

For example, based on information on disparity of stereo images acquired by a stereo camera 310a, the camera 310 may acquire the information on distance to an object and information on speed relative to the object.

The processor 370 may detect an object and track the detected object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect an object and track the detected object based on a reflection laser light which is formed as a result of reflection of transmission laser by the object. Based on the laser light, the processor 370 may, for example, calculate the distance to the object and the speed relative to the object.

The processor 370 may detect an object and track the detected object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect an object and track the detected object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In a case where the object detection apparatus 300 does not include the processor 370, the object detection apparatus 300 may operate under the control of the controller 170 or a processor inside the vehicle 100.

The object detection apparatus 300 may operate under the control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some implementations, the communication apparatus 400 may include a plurality of processors 470, or may not include the processor 470.

In a case where the communication apparatus 400 does not include the processor 470, the communication apparatus 400 may operate under the control of the controller 170 or a processor of a device inside of the vehicle 100.

Meanwhile, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under the control of the controller 170.

The driving manipulation apparatus 500 is configured to receive a user input for driving the vehicle 100.

In the manual mode, the vehicle 100 may operate based on a signal provided by the driving operation device 500.

The driving manipulation apparatus 500 may include a steering input device 510, an acceleration input device 530, and a brake input device 570.

The steering input device 510 may receive a user input with regard to the driving direction of the vehicle 100. The steering input device 510 may take the form of a wheel to enable a steering input through the rotation thereof. In some implementations, the steering input device may be configured as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under the control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety equipment drive unit 640, a lamp drive unit 650, and an air conditioner drive unit 660.

In some implementations, the vehicle drive apparatus 600 may further include other components in addition to the aforementioned components, or may not include some of the aforementioned components.

Meanwhile, the vehicle drive apparatus 600 may include a processor. Each unit of the vehicle drive apparatus 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine depending on control of the controller 170.

In a case where an electric motor is the power source, the power source drive unit 611 may control the motor. The power source drive unit 610 may control, for example, the RPM and toque of the motor under the control of the controller 170.

The transmission drive unit 612 may perform control of a transmission.

The transmission drive unit 612 may adjust the state of the transmission. The transmission drive unit 612 may change the transmission to a drive (D), reverse (R), neutral (N), or park (P) state.

Meanwhile, in a case where an engine is the power source, the transmission drive unit 612 may adjust a gear-engaged state to the drive (D) state.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the driving direction of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may perform control such that a different degree-braking force is applied to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a seat belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The seat belt drive unit 642 may perform electronic control of a seatbelt apparatus inside the vehicle 100. For example, upon detection of a dangerous situation, the seat belt drive unit 642 may control passengers to be fixed onto seats 110FL, 110FR, 110RL, and 110RR with seat belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include a processor. Each unit of the vehicle dive device 600 may include its own processor.

The vehicle drive apparatus 600 may operate under the control of the controller 170.

The operation system 700 is a system for controlling the overall driving operation of the vehicle 100. The operation system 700 may operate in the autonomous driving mode.

The operation system 700 may include the driving system 710, the parking-out system 740, and the parking system 750.

In some implementations, the operation system 700 may further include other components in addition to the aforementioned components, or may not include some of the aforementioned component.

Meanwhile, the operation system 700 may include a processor. Each unit of the operation system 700 may include its own processor.

Meanwhile, in some implementations, in a case where the operation system 700 is implemented as software, the operation system 700 may be a part of, or executed by the controller 170.

Meanwhile, in some implementations, the operation system 700 may include at least one of the user interface apparatus 270, the object detection apparatus 300, the communication apparatus 400, the driving manipulation apparatus 500, the vehicle drive apparatus 600, the navigation system 770, the sensing unit 120, or the controller 170.

The driving system 710 may perform driving of the vehicle 100.

The driving system 710 may receive navigation information from the navigation system 700 and provide a control signal to the vehicle drive apparatus 600 to perform driving of the vehicle 100.

The driving system 710 may receive object information from the object detection apparatus 300 and provides a control signal to the vehicle drive apparatus 600 to perform driving of the vehicle 100.

The driving system 710 may receive a signal from an external device through the communication apparatus 400 and provides a control signal to the vehicle drive apparatus 600 to perform driving of the vehicle 100.

The driving system 710 may be a system which includes at least one selected from among the user interface apparatus 270, the object detection apparatus 300, the communication apparatus 400, the driving manipulation apparatus 500, the vehicle drive apparatus 600, the navigation system 770, the sensing unit 120, and the controller 170 to perform driving of the vehicle 100.

The driving system 710 may be referred to as a vehicle driving control apparatus.

The parking-out system 740 may perform a parking-out operation of the vehicle 100.

The parking-out system 740 may receive navigation information from the navigation system 770 and provide a control signal to the vehicle drive apparatus 600 to perform a parking-out operation of the vehicle 100.

The parking-out system 740 may receive object information from the object detection apparatus 300 and provides a control signal to the vehicle drive apparatus 600 to perform a parking-out operation of the vehicle 100.

The parking-out system 740 may receive a signal from an external device through the communication apparatus 400 and provide a control signal to the vehicle drive apparatus 600 to perform a parking-out operation of the vehicle 100.

The parking-out system 740 may be a system which includes at least one selected from among the user interface apparatus 270, the object detection apparatus 300, the communication apparatus 400, the vehicle manipulation apparatus 500, the vehicle drive apparatus 600, the navigation system 700, the sensing unit 120, and the controller 170 to perform a parking-out operation of the vehicle 100.

The parking-out system 740 may be referred to as a vehicle parking-out control apparatus.

The parking system 750 may perform a parking-in operation of the vehicle 100.

The parking system 750 may receive navigation information from the navigation system 770 and provide a control signal to the vehicle drive apparatus 600 to perform a parking-in operation of the vehicle 100.

The parking system 750 may receive object information from the object detection apparatus 300 and provide a control signal to the vehicle drive apparatus 600 to perform a parking operation of the vehicle 100.

The parking system 750 may receive a signal from an external device through the communication apparatus 400 and provide a control signal to the vehicle drive apparatus 600 to perform a parking-in operation of the vehicle 100.

The vehicle parking 750 may be a system which includes at least one selected from among the user interface apparatus 270, the object detection apparatus 300, the communication apparatus 400, the vehicle manipulation apparatus 500, the vehicle drive apparatus 600, the navigation system 700, the sensing unit 120, and the controller 170 to perform a parking-in operation of the vehicle 100.

The parking system 750 may be referred to as a vehicle parking-in control apparatus.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as a sub-component of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface unit 130 may serve as a passage for various kinds of external devices that are connected to the vehicle 100. For example, the interface unit 130 may have a port that is connectable to a mobile terminal and may be connected to the mobile terminal via the port. In this case, the interface unit 130 may exchange data with the mobile terminal.

Meanwhile, the interface unit 130 may serve as a passage for the supply of electrical energy to a mobile terminal connected thereto. When the mobile terminal is electrically connected to the interface unit 130, the interface unit 130 may provide electrical energy, supplied from the power supply unit 190, to the mobile terminal under the control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be implemented as a sub-component of the controller 170.

The controller 170 may control the overall operation of each unit inside the vehicle 100. The controller 170 may be referred to as an Electronic Control Unit (ECU).

The power supply unit 190 may supply power required to operate each component under the control of the controller 170. In particular, the power supply unit 190 may receive power from, for example, a battery inside the vehicle.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The AVM apparatus 800 may generate an around view image by compositing images acquired by a plurality of cameras, and provide the around view image to a user (e.g., an occupant in the vehicle).

Compositing of images refers to combining two or more images to make a single image. Examples of compositing include stitching together multiple images to form a combined image, merging of multiple images, generation of a larger image based on the multiple images. In some implementations, the resulting composited image is a continuous image of an imaged scene or an object. In some implementations, the resulting composited image is not continuous.

Hereinafter, the AVM apparatus 800 according to an implementation will be described in more detail.

Figure 8A:
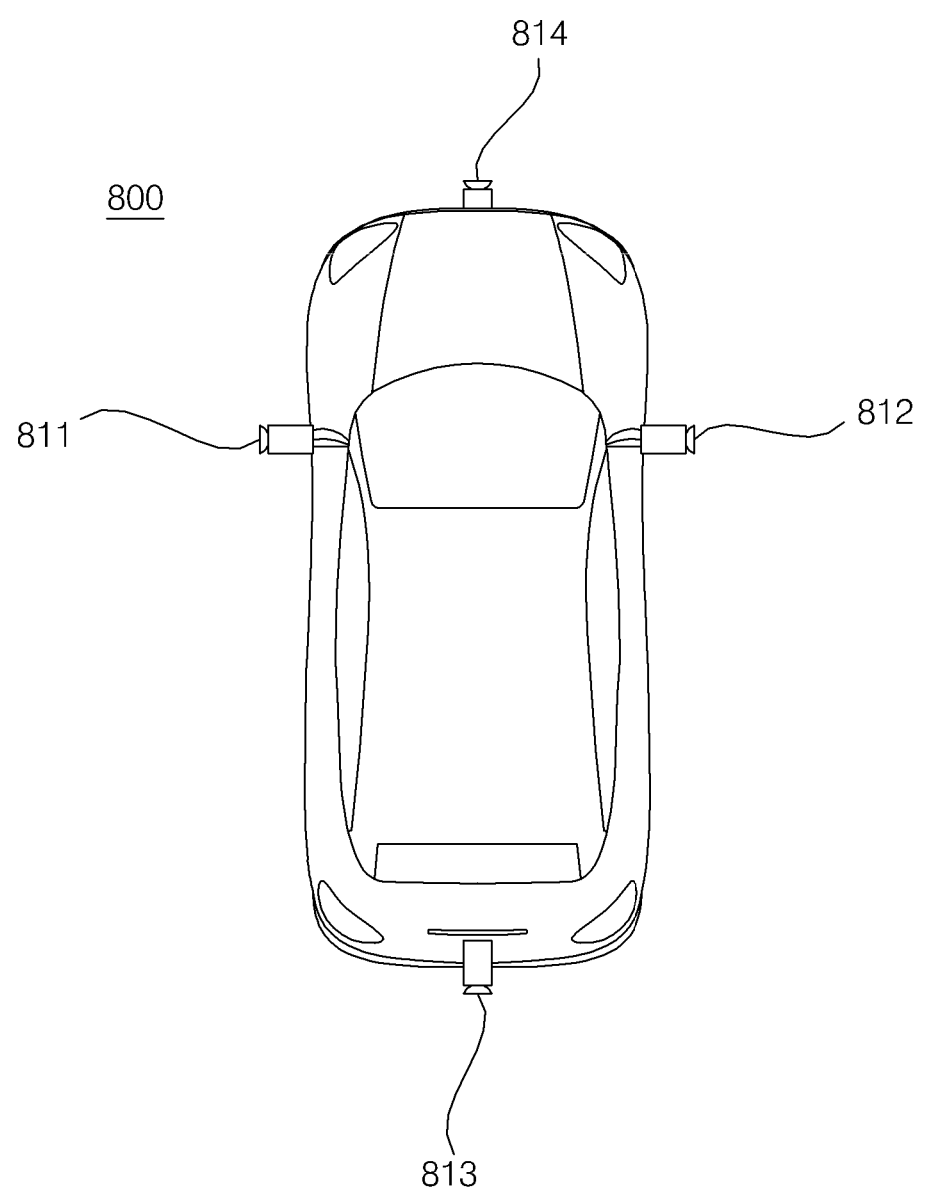
FIG. 8A is a diagram illustrating locations of cameras included in an example of an around-view monitoring apparatus.

FIG. 8A is a diagram illustrating locations of cameras included in an example of an around-view monitoring apparatus. Referring to FIG. 8A, the AVM apparatus 800 may include a plurality of cameras 810.

FIG. 8A shows a case where the AVM apparatus 800 includes four cameras 811, 812, 813, and 814. In some implementations, the AVM apparatus 800 may include less than, or more than four cameras.

The plurality of cameras 811, 812, 813, and 814 may be attached to at least one of a moving part and a fixed part of a vehicle body.

The moving part of the vehicle body indicates a movable part that forms the exterior appearance and frame of the vehicle. For example, the moving part of the vehicle body may include a side mirror, a door, a sunroof, a wiper, a bonnet (or a hood), a wheel, and a window.

The fixed part of the vehicle body indicates a part that is unmovable among parts that define the exterior appearance and frame of the vehicle. For example, the fixed part of the vehicle body may include a bumper, a grill, a fender, a wheel house, a roof, and a windshield.

A first camera 811 may acquire a left view image of the vehicle 100.

The first camera 811 may be attached to a left side mirror that is one of the moving parts. The left side mirror may include a mirror, any of various electric components, a case covering the mirror and the electric components, etc. The left side mirror may be referred to as a left side mirror module.

The first camera 811 may be attached to a left front door that is one of the moving parts. The left front door may include the left side mirror.

A second camera 812 may acquire a left view image of the vehicle 100.

The second camera 812 may be attached to a right side mirror that is one of the moving parts. The right side mirror may include a mirror, any of electric components, a case covering the mirror and the electric components, etc. The right side mirror may be referred to as a right side mirror module.

The second camera 812 may be attached to a right front door that is one of the moving parts. The right front door may include the right side mirror.

A third camera 813 may acquire a rear view image of the vehicle 100.

The third camera 813 may be attached to a rearward door that is one of the moving parts. The rearward door may include a trunk or a tailgate.

A fourth camera 814 may acquire a front view image of the vehicle 100.

The fourth camera 814 may be attached to a bumper that is one of the fixed parts. The fourth camera 814 may be disposed inside of the grill.

Figure 8B:
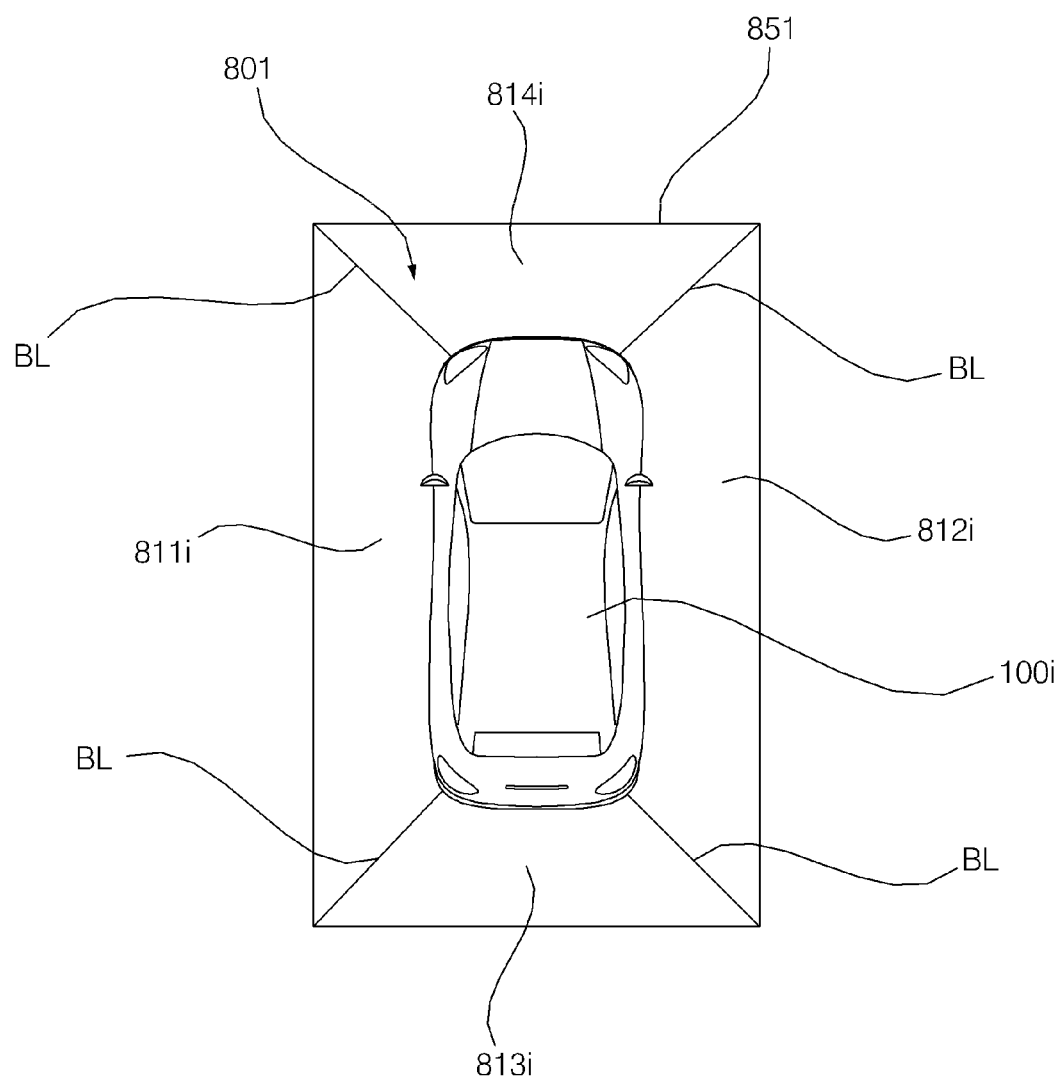
FIG. 8B is a diagram illustrating various regions of an example of an around view image.

FIG. 8B is a diagram illustrating various regions of an example of an around view image.

Referring to FIG. 8B, the AVM apparatus 800 may generate an around view image 801.

The processor 870 of the AVM apparatus 800 may generate the around view image 801 by compositing a plurality of images acquired by the plurality of cameras 810.

For example, the processor of the AVM apparatus 800 may generate the around view image 801 by compositing a first image acquired by the first camera 811, a second image acquired by the second camera 812, a third image acquired by the third camera 813, and a fourth image acquired by the fourth camera 814. The first image may be a left view image of the vehicle 100. The second image may be a right view image of the vehicle 100. The third image may be a rear view image of the vehicle 100. The fourth image may be a front view image of the vehicle 100.

Meanwhile, the around view image 801 may include at least one of a top view, a side view, a front view, and a rear view.

The around view image 801 may be implemented as a second-dimensional (2D) image or a three-dimensional (3D) image.

The around view image 801 may include a boundary line (BL). The boundary line (BL) may be a line used to divide the around view image 801 into regions corresponding to the images acquired by the plurality of cameras 810.

For example, the around view image 801 may include a first region 811$i$, a second region 812$i$, a third region 813$i$, and a fourth region 814$i$.

The first region 811$i$ may be a region corresponding to the first image. The second region 812$i$ may be a region corresponding to the second image. The third region 813$i$ may be a region corresponding to the third image. The fourth region 814$i$ may be a region corresponding to the fourth image.

The around view image 801 may include a vehicle image 100$i$ corresponding to the vehicle 100.

Figure 9:
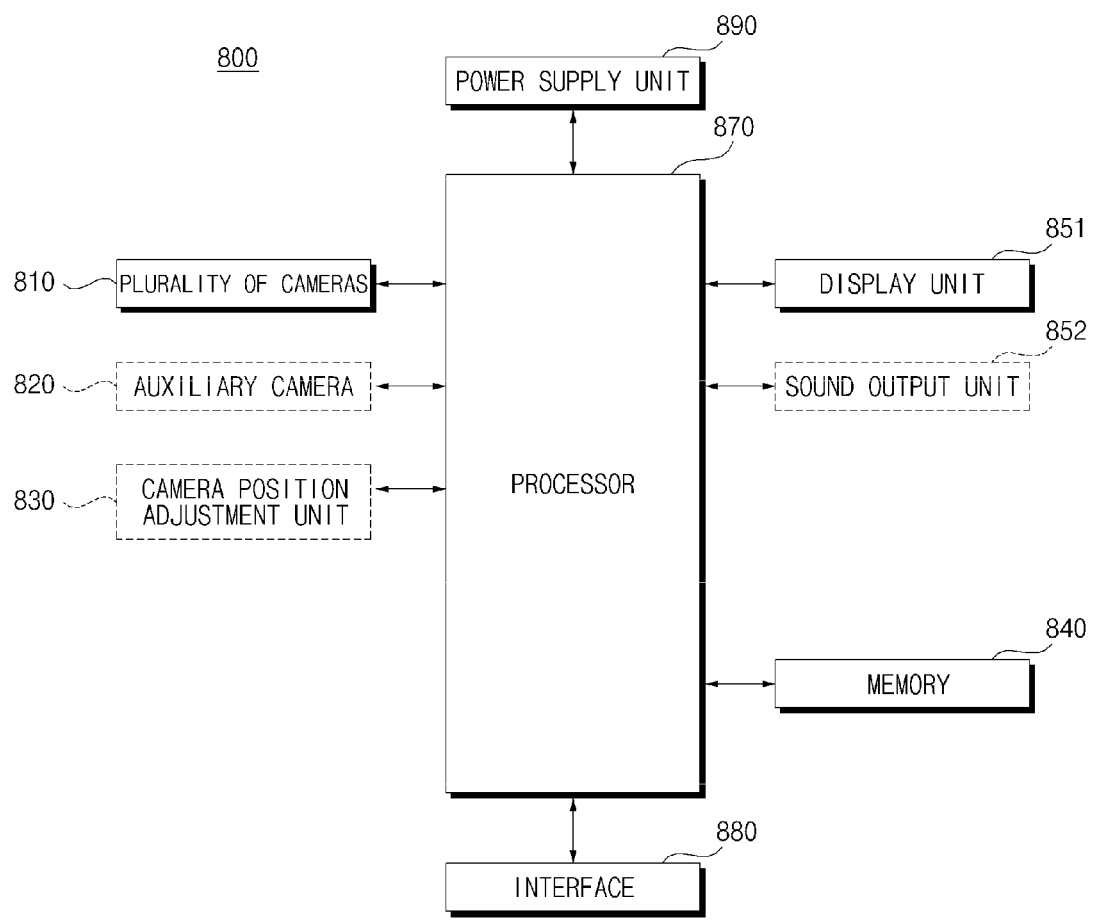
FIG. 9 is a block diagram illustrating subsystems of an example of an around-view monitoring apparatus.

FIG. 9 is a block diagram illustrating subsystems of an example of an around-view monitoring apparatus.

Referring to FIG. 9, the AVM apparatus 800 may include a plurality of cameras 810, a memory 840, a display unit 851, a processor 870, and a power supply unit 890.

In some implementations, the AVM apparatus 800 may further include an auxiliary camera 820, a camera position adjustment unit 830, and a sound output unit 852 individually or in combination.

Each of the plurality of cameras 810 may be attached to one portion of the outer body frame of the vehicle 100.

The plurality of cameras 810 may be attached to at least one of a moving part or a fixed part of the vehicle body.

The auxiliary camera 820 may acquire an auxiliary image upon detection of movement of the moving part.

If a blind spot has been created by movement of the moving part, the auxiliary camera 820 may capture the blind spot.

The auxiliary camera 820 may be disposed at a position where it is easy to capture a blind spot. For example, the auxiliary camera 820 may be disposed inside a door or in one region of a rocker panel.

Meanwhile, the auxiliary camera 820, that is, a field of view (FOV) of the auxiliary camera 820, may be disposed to point upward more than the FOV of the plurality of cameras 810.

For example, the plurality of cameras 810 may be disposed to face a road surface to generate a top view image. The auxiliary camera 820 may be disposed to point further toward the rear of the vehicle 100, compared to the plurality of cameras 810, in order to detect an object during or after movement of the moving part.

The camera position adjustment unit 830 may control a position of each camera 810, such as an orientation, a height, or other position of a camera. The camera position adjustment unit 830 may include a plurality of drive units, the number of which corresponds to the number of the cameras 810. Herein, a drive unit may include a power generation unit, such as a motor, an actuator, and a solenoid.

For example, the camera position adjustment unit 830 may include a first drive unit corresponding to the first camera 811, a second drive unit corresponding to the second camera 812, a third drive unit corresponding to the third camera 813, and a fourth drive unit corresponding to the fourth camera 814.

Under control of the processor 870, the camera position adjustment unit 830 may adjust a position of a camera, attached to a moving part, based on movement information of the moving part.

The memory 840 is electrically connected to the controller 870. The memory 840 may store basic data for each unit, control data for the operational control of each unit, and input/output data. The memory 840 may be any of various hardware storage devices, such as a ROM, a RAM, an EPROM, a flash drive, and a hard drive. The memory 840 may store various data for the overall operation of the AVM apparatus 800, such as programs for the processing or control of the processor 870.

In some implementations, the memory 840 may be integrally formed with the processor 870 or may be implemented as an element of the processor 870.

The display unit 851 may display an around view image under control of the processor 870.

The display unit 851 may be integrally formed with the display unit 251 of the user interface device 200.

The display unit 851 may be referred to as an Audio Video Navigation (AVN) device, a Center Information Display (CID), a head unit, or the like.

The display unit 851 may be combined with the communication device 400 to implement a telematics device.

The sound output unit 852 may output an audio signal under control of the processor 870.

The sound output unit 852 may be integrally formed with the sound output unit 252 of the user interface device 200.

The display unit 851 and the sound output unit 852 may be classified as elements of the AVM apparatus 800.

The processor 870 may control overall operation of each unit of the AVM apparatus 800.

The processor 870 may acquire movement information of a moving part.

The movement information of a moving part may include information on displacement of movement of the moving part, information on a velocity of movement of the moving part, and information on a trajectory of movement of the moving part.

The processor 870 may acquire the movement information of the moving part based on images acquired by the plurality of cameras 810.

The processor 870 may acquire movement information of a moving part based on a movement vector of an object detected from an image that is captured by a camera attached to the moving part. For example, the processor 870 may acquire movement information of a moving part based on a movement vector of a stationary object detected from an image.

The processor 870 may acquire movement information of a moving part by comparing multiple images. For example, the processor 870 may acquire movement information of a moving part by comparing an image acquired by a camera attached to a fixed part and an image acquired by a camera attached to the moving part.

The processor 870 may receive movement information of a moving part via the interface 880. For example, the processor 870 may receive movement information of a moving part from the vehicle drive device 600 via the interface 880.

The processor 870 may receive a plurality of images from the plurality of cameras 810.

For example, the processor 870 may receive a first image from the first camera 811. The first image may be a right view image of the vehicle 100. The processor 870 may receive a second image from the second camera 812. The second image may be a left view image of the vehicle 100. The processor 870 may receive a third image from the third camera 813. The third image may be a rear view image of the vehicle. The processor 870 may receive a fourth image from the fourth camera 814. The fourth image may be a front view image of the vehicle 100.

The processor 870 may generate an around view image by compositing a plurality of images respectively acquired by the plurality of cameras 810.

For example, the processor 870 may generate an around view image by compositing the first image, the second image, the third image, and the fourth image. The around view image may be a top view image.

The processor 870 may correct the around view image based on movement information of a moving part.

When a moving part of the vehicle body moves, a camera attached to the moving part moves as well. In this case, if the movement of the moving part is not reflected in an around view image, a distorted around view image may be provided to a user. To solve this problem, the processor 870 may correct the around view image by reflecting the movement information of the moving part.

In response to the movement of the moving part, the processor 870 may correct an around view image by changing a composition region of an image acquired by a camera attached to the moving part.

When the moving part moves, the camera attached thereto moves as well. In this case, the processor 870 may change a composition region based on the movement of the moving part (that is, movement of the camera).

The processor 870 may set a first region of an image, acquired before movement of a moving part, as a composition region of the image. If the moving part moves, the processor 870 may set a second region of an acquired image as a composition region. The second region may be a region to which the position of the first region has been moved in a direction opposite to a direction of the movement of the moving part (that is, movement of a camera).

The processor 870 may control the camera position adjustment unit 830 based on movement information of a moving part.

The processor 870 may correct an around view image based on an image acquired by a camera of which position has been adjusted.

The plurality of cameras 810 may include a first camera. The first camera may be attached to a moving part.

The camera position adjustment unit 830 may include a first drive unit. The first drive unit may correspond to a first camera. The first drive unit may adjust position of the first camera.

The processor 870 may acquire first movement information that indicates movement of a moving part toward a first direction. Based on the first movement information, the processor 870 may control the first drive unit to cause the first camera to move in a second direction that is opposite to the first direction. At this point, the processor 870 may determine a speed of the movement of the first camera in the second direction to correspond to a speed of movement of the moving part moving in the first direction. The processor 870 may control the first drive unit to cause the first camera to move in the second direction at the determined speed.

The processor 870 may correct an around view image by further compositing an auxiliary image acquired by the auxiliary camera 820. The auxiliary image may be an image of a blind spot that has been created by movement of a moving part.

The processor 870 may control the corrected around view image to be output via the display unit 851.

The processor 870 may control the display unit 851 to output information as to whether an around view image has been corrected.

The processor 870 may highlight a corrected region in an around view image. For example, the processor 870 may highlight the corrected region in a color different from that is used for other regions. For example, the processor 870 may highlight the corrected region by displaying a specific graphic object (for example, an indicator) therein. For example, the processor 870 may highlight the corrected region by applying a different transparency level thereto.

The processor 870 may determine whether a blind spot has been created in an around view image by movement of a moving part. The blind spot may be a region which cannot be acquired by a camera, attached to the moving part, due to the movement of the moving part.

The processor 870 may highlight a region corresponding to a blind spot in a corrected around view image. For example, the processor 870 may highlight the region corresponding to the blind spot in a color different from that is used for other regions. For example, the processor 870 may highlight the region corresponding to the blind spot by displaying a specific graphic object (for example, an indicator) therein. For example, the processor 870 may highlight the region corresponding to the blind spot by applying a different transparency level thereto.

The processor 870 may control the display unit 851 to output information about a state of movement of a moving part.

For example, the processor 870 may control displaying of information about a state of movement of the moving part by adding animation effects to a region corresponding to a moving part in a vehicle image (indicated by reference numeral 100i in FIG. 8B) included in an around view image.

For example, the processor 870 may display information about a state of movement of the moving part by switching a view point of an around view image. For example, the processor 870 may display an around view image by switching between a front view, a rear view, and a side view.

The processor 870 may detect a surrounding object based on a corrected around view image.

The processor 870 may generate information on the detected surrounding object.

Based on the information on the surrounding object, the processor 870 may provide a first control signal to control movement of the vehicle 100. The processor 870 may provide the first control signal to the vehicle drive device 600 via the interface 880.

The processor 870 may provide a signal to control the vehicle 100 in a manner appropriate for an open state of a moving part.

In a case where the vehicle 100 moves with a moving part left opened, the processor 870 may detect a surrounding object based on a corrected around view image. The moving part may include at least one of a front left door, a front right door, a rear left door, a rear right door, and a rearward door.

In a case where the vehicle moves with a moving part being folded, the processor 870 may detect a surrounding object based on a corrected around view image. The moving part may include a left side mirror and a right side mirror.

In this manner, it is possible to drive the vehicle 100 appropriately with a moving part being opened or folded.

The processor 870 may acquire information on a distance between a detected object and the vehicle 100. The processor 870 may acquire the information on a distance between the detected object and the vehicle 100 based on a corrected around view image. For example, the processor 870 may acquire information on a distance between an object and the vehicle 100 using a distance detection algorithm that is based on an image.

If a distance between a detected object and the vehicle 100 is equal to or less than a reference value, the processor 870 may provide a control signal to brake the vehicle 100. The control signal may be provided to the vehicle drive device 600 via the interface 880.

If it is determined that a blind spot has been created by movement of a moving part, the processor 870 may provide a control signal to brake the vehicle 100.

The processor 870 may acquire passenger boarding/disembarking information.

The user interface device 200 may generate passenger boarding/disembarking information using the internal camera 220. The processor 870 may receive the passenger boarding/disembarking information from the user interface device 200 via the interface 880.

If it is determined that a distance between a detected object and the vehicle 100 is equal to or less than a reference value while the vehicle 100 is stopped and passenger boarding/disembarking information is received, the processor 870 may control the sound output unit 852 to output warning sound.

If it is determined that a distance between a detected object and the vehicle 100 is equal to or less than a reference value, the processor 870 may provide a signal to restrict movement of a moving part.

If the vehicle 100 is expected to collide with an object when moving in the middle of opening movement of a moving part, the processor 870 may provide a signal to restrict the opening movement of the moving part. In this manner, it is possible to prevent a collision between the vehicle 100 and the object.

If it is determined that a blind spot has been created by movement of a moving part, the processor 870 may provide a signal to restrict movement of the moving part.

The processor 870 may acquire seat occupancy information.

The user interface device 200 may generate seat occupancy information using the internal camera 220. The processor 870 may receive the seat occupancy information from the user interface device 200 via the interface 880.

The processor 870 may receive seat occupancy information via a weight sensor provided in each seat.

The processor 870 may acquire passenger boarding information and passenger disembarking information.

The user interface device 200 may generate passenger boarding information and passenger disembarking information using the internal camera 220. The processor 870 may receive the passenger boarding information or the passenger disembarking information from the user interface device 200 via the interface 880.

The processor 870 may control the display unit 851 or the sound output unit 852 to output seat occupancy information.

The processor 870 may provide a signal for an autonomous parking maneuver based on a corrected around view image. The processor 870 may provide a control signal to the parking system 750 via the interface 880.

The processor 870 may provide a signal based on a corrected around view image to park the vehicle 100 with the left side mirror and the right side mirror folded. Here, the moving part may include the left side mirror and the right side mirror.

In this manner, it is possible to park the vehicle 100 in a small parking space with the side mirrors folded, thereby improving user convenience and preventing a sideswipe accident.

The processor 870 may provide a signal to park the vehicle 100 with a moving part opened. The moving part may include at least one of a front left door, a front right door, a rear left door, a rear right door, or a rearward door (such as a trunk or tailgate).

In this manner, it is possible to park the vehicle 100 even in a situation where the vehicle 100 needs to travel with the moving part opened, thereby improving user convenience and preventing a sideswipe accident.

If it is determined, based on a corrected around view image, that a blind spot has been created by movement of a moving part in the middle of an autonomous parking maneuver, the processor 870 may provide a control signal to stop performing the autonomous parking maneuver. The processor 870 may provide a control signal to the parking system 750 via the interface 880.

The interface 880 may exchange information, data, or a signal with a different device included in the vehicle 100. The interface 880 may receive information, data, or a signal from the different device included in the vehicle 100. The interface 880 may transmit the received information, data, or signal to the processor 870. The interface 880 may transmit information, data, or signal, generated or processed in the processor 870, to the different device included in the vehicle 100.

The interface 880 may provide a first control signal, generated in the processor 870, to the vehicle drive device 600. The interface 880 may provide a first control signal, generated in the processor 870, to the operation system 700.

Under control of the processor 870, the power supply unit 890 may supply power required for operation of each unit. In particular, the power supply unit 890 may be supplied with power from a batter inside the vehicle.

FIGS. 10A to 12 are diagrams illustrating operation of an example of an around-view monitoring apparatus in different orientations of a side mirror.

FIGS. 10A to 12 shows the left side of the vehicle 100, and while operations performed on the left side of the vehicle 100 is described by FIGS. 10A to 12, the right side of the vehicle may operate in a similar manner.

A moving part may include a left side mirror and a right side mirror.

Figure 10A:
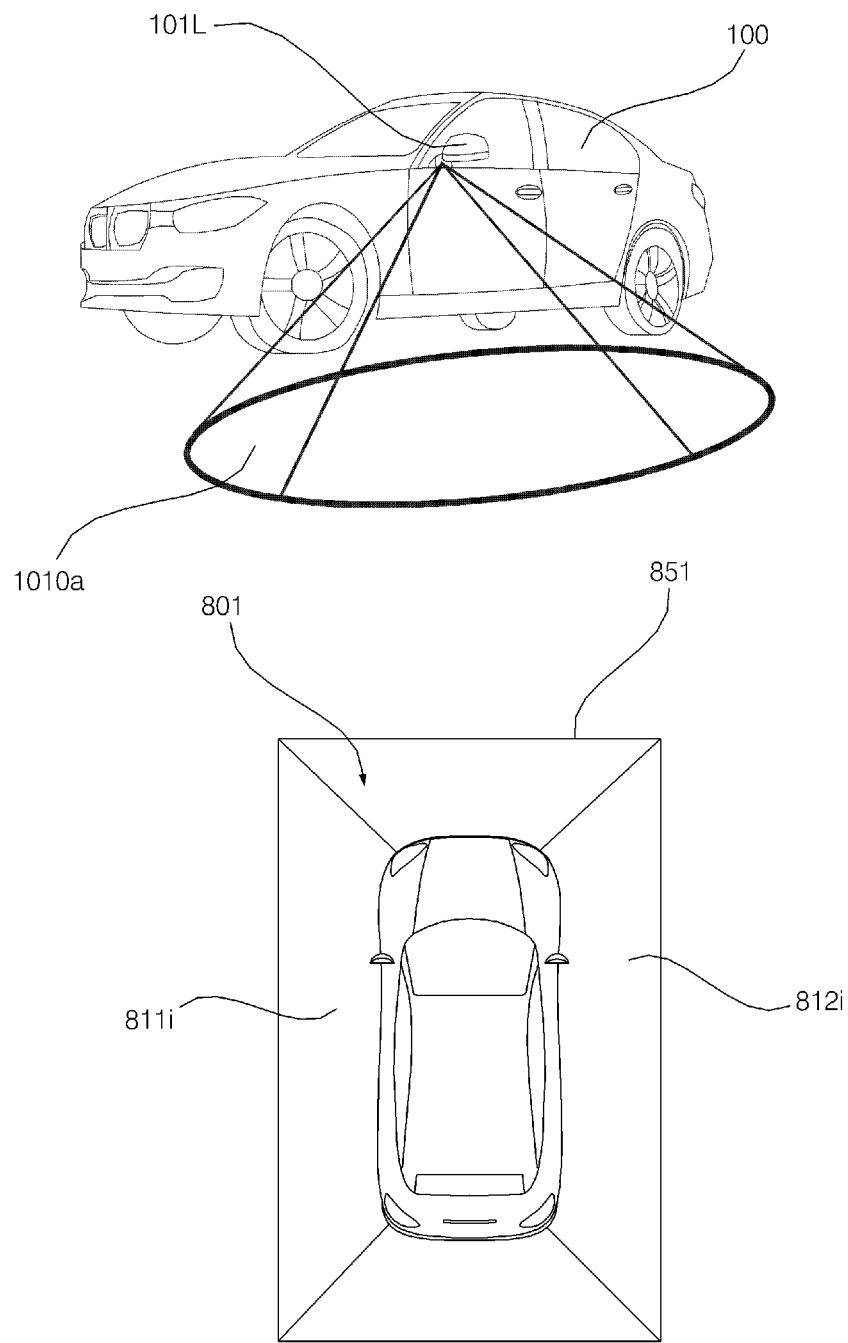
FIGS. 10A to 12 are diagrams illustrating operation of an example of an around-view monitoring apparatus in different orientations of a side mirror.

FIG. 10A shows an example of the display unit 851 and the vehicle 100 when a side mirror is unfolded.

The display unit 851 may display a top view image as an around view image.

The first camera 811 may acquire a first image. The first camera 811 may acquire an image of a left side area 1010a of the vehicle 100. According to a set field of view (FOV), the first camera 811 may acquire an image of the left side area 1010a which is the lower area to the left of the vehicle 100.

Part of the image acquired by the first camera 811 may be used for a composition process to generate an around view image 801. For the composition process to generate the around view image 801, the processor 870 may utilize the first region in the image of the left side area 1010a acquired by the first camera 822. The processor 870 may utilize the first region as an image of the left region 811i of the around view image 801. Here, this first region used for the composition process to generate the around view image 801 may be referred to as a composition region of a first image.

The first camera 811 may be attached to a left side mirror 101L. The first camera 811 may be attached to the case of the left side mirror 101L.

The second camera 812 may acquire a second image. The second camera 812 may acquire an image of a right side area of the vehicle 100. According to a determined FOV, the second camera 812 may acquire an image of the right side area which is the lower image to the right of the vehicle 100.

Part of the image acquired by the second camera 812 may be used for a composition process to generate the around view image 801. For the composition process to generate the around view image 801, the processor 870 may utilize the first region in an image of the right side area acquired by the second camera 812. The processor 870 may utilize the first region as an image of the right region 812i of the around view image 801. Here, this first region used for the composition process to generate the around view image 801 may be referred to as a composition region of a second image.

The second camera 812 may be attached to a right side mirror. For example, the second camera 812 may be attached to the case of the right side mirror.

Figure 10B:
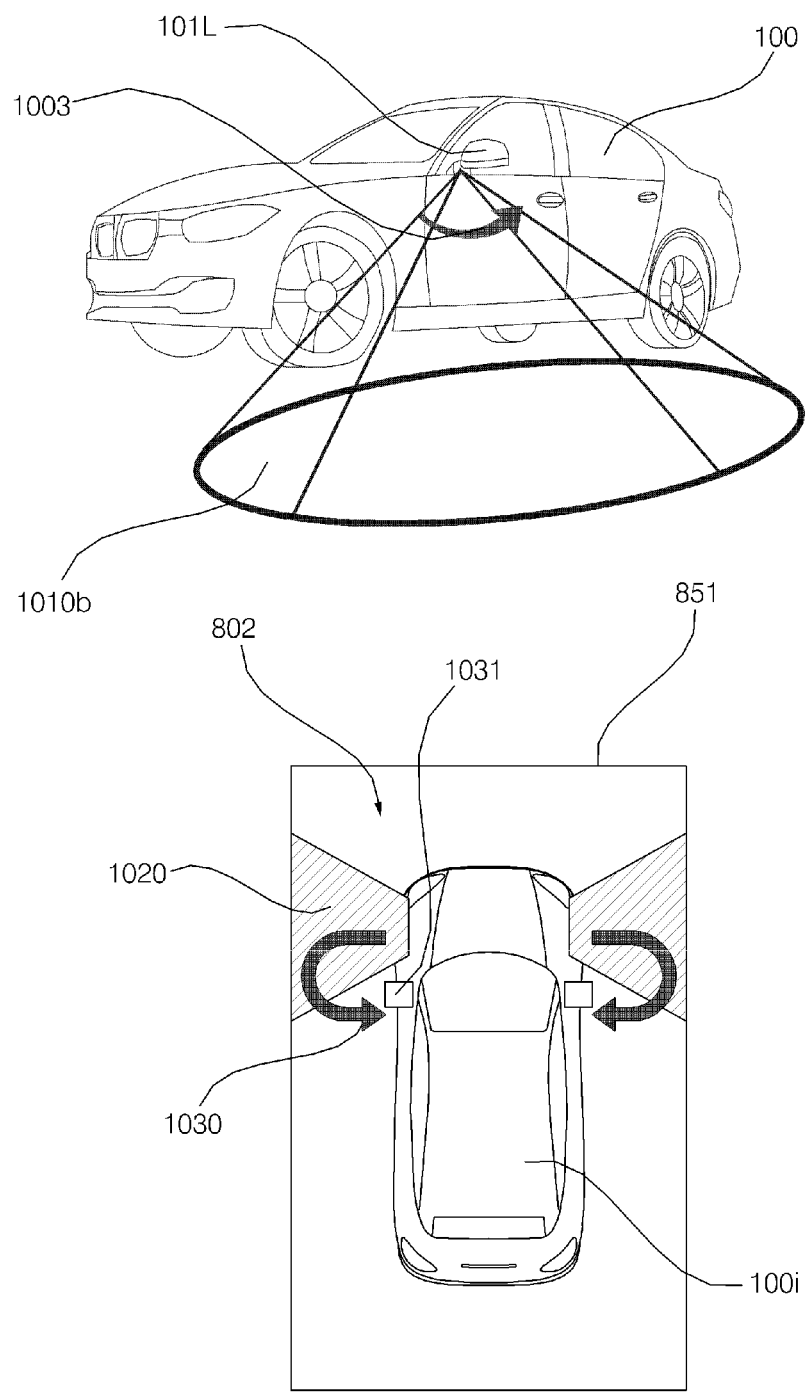

FIG. 10B shows an example of the display unit 851 and the vehicle 100 when the side mirror is folded.

The display unit 851 may display a top view image 802 as a corrected around view image.

In response to folding 1003 of the left side mirror 101L, the first camera 811 attached thereto moves along a trajectory of the folding movement 1003. In this case, a range of an image acquired by the first camera 811 is changed according to movement of the first camera 811.

Specifically, in response to the folding movement 1003 of the left side mirror 101, the first camera 811 moves to point further towards the rear of the vehicle 100. A region in an image to be acquired by the first camera 811 is changed, so that a region to the rear of the vehicle 100 is extended.

When the right side mirror is folded, the second camera attached thereto moves along a trajectory of the folding movement. In this case, a range of an image to be acquired by the second camera 812 is changed in response to the movement of the second camera 812.

Specifically, in response to folding movement of the right side mirror, the second camera 812 moves to thereby point further towards the rear of the vehicle 100. A region in an image to be acquired by the second camera 812 is changed, so that a region to the rear of the vehicle 100 is extended.

The processor 870 may correct an around view image based on movement information of the left side mirror and movement information of the right side mirror.

In response to the folding movement 1003 of the left side mirror 101L, the processor 870 may change a composition region of the first image acquired by the first camera 811. The processor 870 may correct an around view image based on the changed composition region of the first image.

In response to the folding movement 1003 of the left side mirror 101L, the processor 870 may determine a new composition region of the first image, into which a previous region of the first image has been moved after the folding movement 1003 over image coordinates in a direction opposite to a direction of the folding movement 1003 in an effort to correspond to displacement of the folding movement 1003.

In response to folding movement of the right side mirror, the processor 870 may change a composition region of the second image acquired by the second camera 812. The processor 870 may correct an around view image based on the changed composition region of the second image.

In response to folding movement of the right side mirror, the processor 870 may determine a new composition region of a second image, into which a previous composition region of the second image has been moved after the folding movement over image coordinates in a direction opposite to a direction of the folding movement in an effort to correspond to displacement of the folding movement.

Meanwhile, the camera position adjustment unit 830 may include a first drive unit for adjusting position of the first camera 811, and a second drive unit for adjusting a second camera 812.

The processor 870 may control the first drive unit to cause the first camera 811 to move responsive to folding movement of the left side mirror 101L.

For example, the processor 870 may control the first drive unit to cause the first camera 811 to move in a direction opposite to direction of folding movement of the left side mirror 101L.

For example, the processor 870 may control the first drive unit to cause the first camera 811 to move at a speed corresponding to a speed of folding movement of the left side mirror 101L. For example, the processor 870 may control the first drive unit to cause the first camera 811 to move at a speed proportional to an absolute value of the speed of the folding movement of the left side mirror 101L.

For example, the processor 870 may control the first drive unit to cause the first camera 811 to move corresponding to displacement of the folding movement of the left side mirror 101L. For example, the processor 870 may control the first drive unit to move proportionally to displacement of the folding movement of the left side mirror 101L.

The processor 870 may correct an around view image based on an image that is acquired after movement of the first camera 811.

The processor 870 may control the second drive unit to cause the second camera 812 to move responsive to folding movement of the right side mirror.

For example, the processor 870 may control the second drive unit to cause the second camera 812 to move in a direction opposite to a direction of folding movement of the right side mirror.

For example, the processor 870 may control the second drive unit to cause the second camera to move at a speed corresponding to a speed of the folding movement of the right side mirror. For example, the processor 870 may control the second drive unit to cause the second camera 812 to move at a speed proportional to the speed of the folding movement of the right side mirror.

For example, the processor 870 may control the second drive unit to cause the second camera 812 to move corresponding to displacement of the folding movement of the right side mirror. For example, the processor 870 may control the second drive unit to cause the second camera 812 to move proportionally to displacement of the folding movement of the right side mirror.

The processor 870 may correct an around view image based on an image that is acquired after movement of the second camera 812.

The processor 870 may determine whether a blind spot has been created by folding movement 1003 of the left side mirror 101o1L and folding movement of the right side mirror.

If it is determined that a blind spot has been created, the processor 870 may highlight a region 1020, corresponding to the blind spot, in a corrected around view image 802.

When generating an around view image after the folding movement 1003 of the left side mirror 101L, the processor 870 may determine whether a blind spot has been created, by determining whether there is any missing part in the first image.

A subject of an image to be acquired by the first camera 811 is changed due to the folding movement 1003 of the left side mirror 101L. In this case, an image of a region necessary to generate an around view image may not be acquired.

The blind spot may be a region which cannot be acquired due to the folding movement 1003 of the left side mirror 101L among regions necessary to generate an around view image.

The processor 870 may leave the region 1020, corresponding to the blind spot, blank in a corrected around view image.

The processor 870 may highlight the region 1020, which corresponds to the blind spot, in a corrected around view image.

When generating an around view image after folding movement of the right side mirror, the processor 870 may determine whether a blind spot has been created, by determining whether there is any missing part in the second image.

A subject of an image acquired by the second camera 812 is changed due to the folding movement of the right side mirror.

In this case, an image of a region necessary to generate an around view image may not be acquired.

The blind spot may be a region which cannot be acquired due to folding movement of the right side mirror among regions necessary to generate an around view image.

The processor 870 may leave a region, corresponding to a blind spot of the second image, blank in a corrected around view image.

The processor 870 may highlight a region, corresponding to a blind spot of the second image, in a corrected around view image.

The processor 870 may control the display unit 851 to output information about a state of folding movement of the left side mirror 101L and information about a state of folding movement of the right side mirror.

The processor 870 may display the information about a state of folding movement of the left side mirror 101L and the information on folding movement of the right side mirror by displaying graphic objects 1030 respectively corresponding to folding movement of the left side mirror 101L and folding movement of the right side mirror. For example, the processor 870 may control the display unit 851 to display arrows 1030 respectively corresponding to folding movement of the left side mirror 101L and folding movement the right side mirror.

The processor 870 may display the information about a state of folding movement of the left side mirror 101L and the information on folding movement of the right side mirror by adding animation effects to regions 1031 respectively corresponding to the left side mirror 101L and the right side mirror in the vehicle image 100i. For example, the processor 870 may control the display unit 851 to display animation such that an image of the left side mirror and an image of the right side mirror in the vehicle image 100i move to be folded. In this case, the processor 870 may control the display unit 851 to display the animation with 2D or 3D images.

Meanwhile, in some implementations, the processor 870 may display information about a state of folding movement of the left side mirror 101L and the right side mirror by switching a view point of an around view image. For example, the processor 870 may display an around view image by switching between a front view, a rear view, and a side view.

The processor 870 may control the display unit 851 to output information as to whether an around view image has been corrected based on folding movement of the left side mirror 101L and the right side mirror.

Figure 11A:
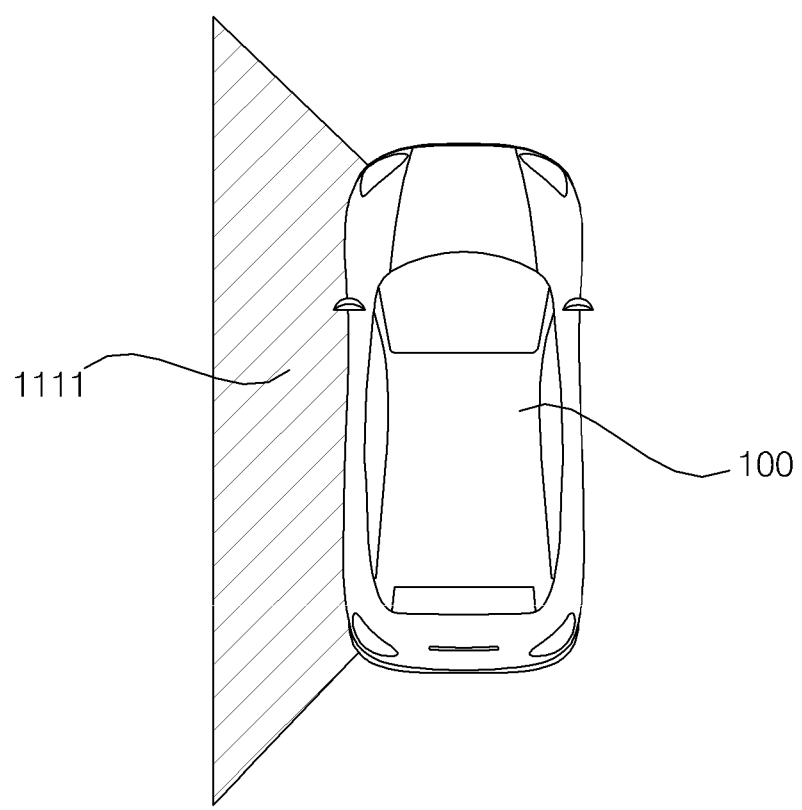
Figure 11B:
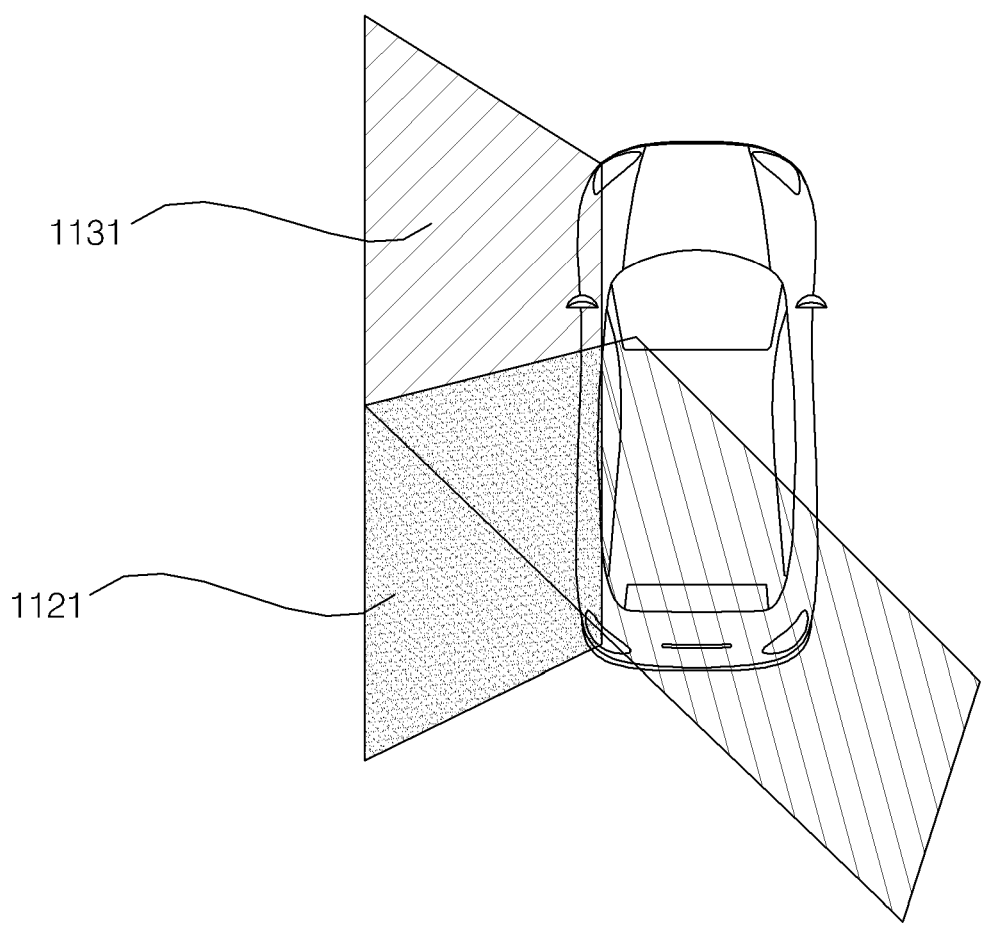

FIGS. 11A and 11B are diagrams for explanation of an operation of correcting an around view image according to an implementation.

For convenience of explanation, description will be provided with reference to a top view of the vehicle 100 in FIGS. 11A and 11B.

As illustrated in FIG. 11A, when the left side mirror 101L is unfolded, the first camera 811 may acquire a first image. The first image may be an image of an area within a specific distance from the left side of the vehicle 100.

The second camera 812 may acquire a second image. The second image may be an image of an area within a specific distance from the right side of the vehicle 100.

The third camera 813 may acquire a third image. The third image may be an image of an area within a specific distance from the rear of vehicle 100.

The fourth camera 814 may acquire a fourth image. The fourth image may be an image of an area within a specific distance from the front of the vehicle 100.

The processor 870 may set a first region of the first image as a composition region. The first region of the first image may be a region which remains in the first image after cropping of regions unnecessary for an around view image. The first region of the first image may be a region corresponding to a region 1111 that exists within a preset distance from the left side of the vehicle 100 in the first image.

The processor 870 may generate an around view image by compositing respective composition regions of the first image, the second image, the third image, and the fourth image.

As illustrated in FIG. 11B, with the left side mirror 101L being folded, the first camera 811 may acquire a first image. In this case, a subject in the first image acquired by the first camera 811 may be different from a subject in an image acquired when the left side mirror 101L is unfolded.

In response to folding movement of the left side mirror 101L, the first camera 811 is rotated toward the vehicle 100 in a counter-clockwise direction. In this case, an FOV of the first camera 811 is changed, and therefore, the first camera 811 may acquire a first image which is different from a first image acquired when the left side mirror 101L is unfolded.

The processor 870 may set a second region of the first image as a composition region of the first image. The second region of the first image may be a region which remains in the first image after cropping of regions unnecessary for an around view image. The second region of the first image may be a region 1121 that exists within a preset distance from the left side or the rear of the vehicle 100 in the first image.

The processor 870 may correct an around view image based on the second region of the first image.

The processor 870 may highlight a corrected region in the corrected around view image.

Meanwhile, a blind spot 1131 may be created by folding movement of the left side mirror 101L. A region corresponding to the blind spot 1131 in the corrected around view image may partly overlap with the first region of the first region that is acquired when the left side mirror 101L is unfolded.

Figure 12:
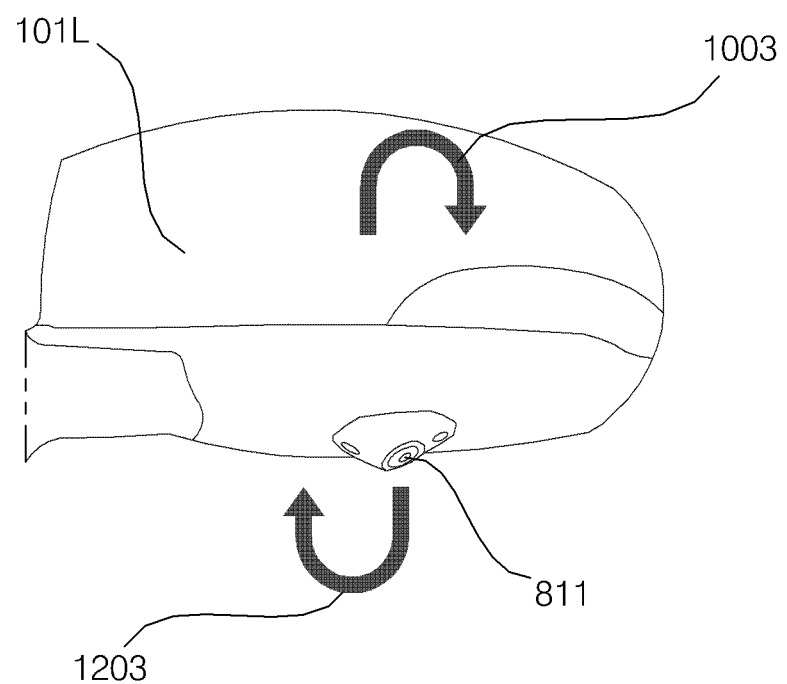

FIG. 12 is a diagram for explanation of an operation of adjusting position of a camera according to an implementation.

Referring to FIG. 12, when the left side mirror 101L is folded 1003, the processor 870 may control the first drive unit included in the camera position adjustment unit 830 to cause the first camera 811 to move responsive to folding 1003 of the left side mirror 101L.

The processor 870 may control the first drive unit to cause the first camera 811 to move in a direction 1203 opposite to a direction of the folding movement 1003 of the left side mirror 101L.

The processor 870 may control the first drive unit to cause the first camera 811 to move at a speed proportional to an absolute value of the speed of the folding movement of the left side mirror 101L.

FIGS. 13A to 15 are diagrams illustrating operation of an example of an around-view monitoring apparatus in different orientations of a front door.

FIGS. 13A to 15 shows the left side of the vehicle 100, and operation performed on the left side of the vehicle 100 is largely described with reference to FIGS. 13A to 15, but similar operation may be performed on the right side of the vehicle 100.

A moving part may include a left front door and a right front door.

Figure 13A:
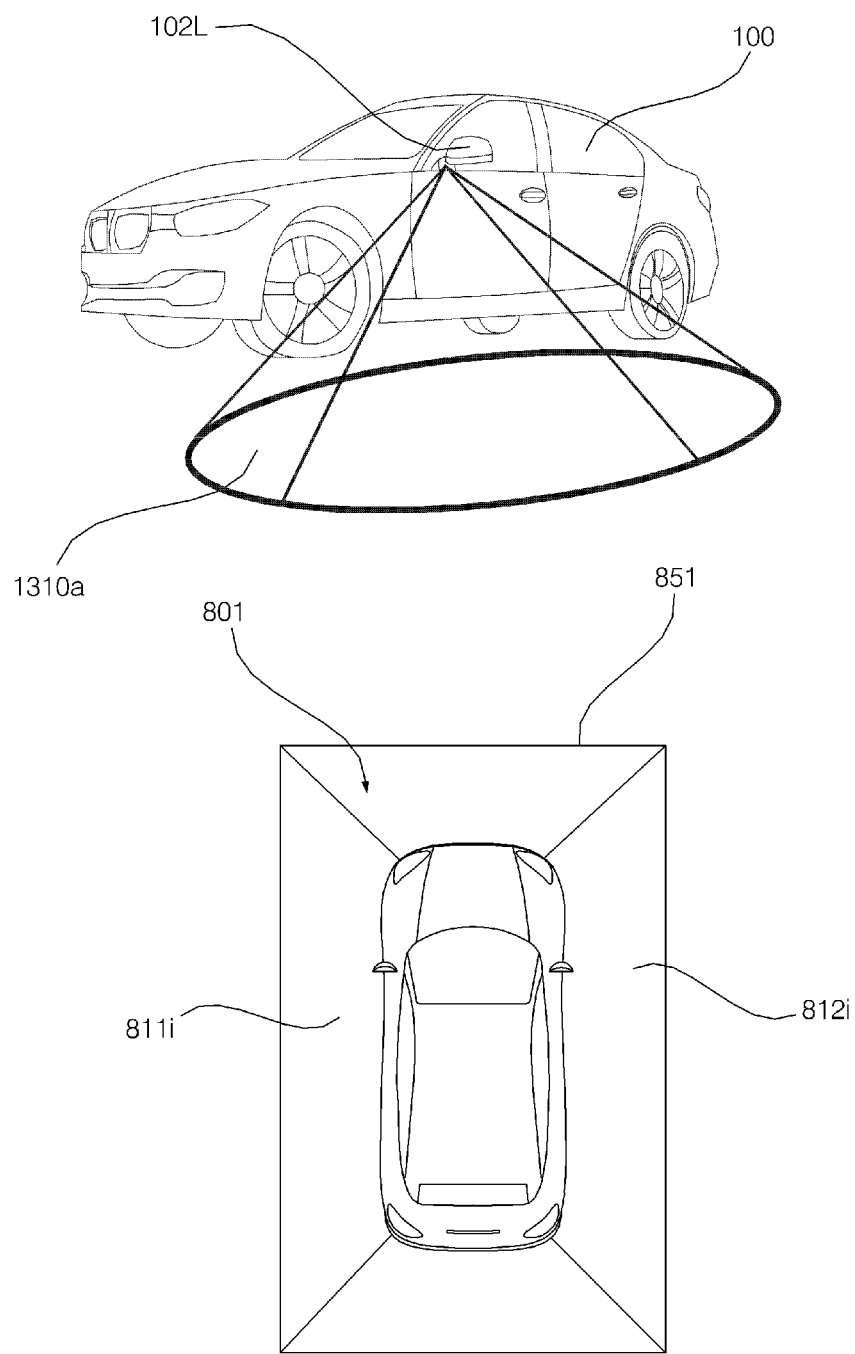
FIGS. 13A to 15 are diagrams illustrating operation of an example of an around-view monitoring apparatus in different orientations of a front door.

FIG. 13A illustrates an example of the display unit 851 and the vehicle 100 whose left front door 102L is closed.

The display unit 851 may display a top view image 801 as an around view image.

The first camera 811 may acquire a first image. The first camera 811 may acquire an image of a left side area 1310a of the vehicle 100. According to a set FOV, the first camera 811 may acquire an image of the left side area 1310a that is the lower image to the left of the vehicle 100.

Part of the image acquired by the first camera 811 may be used for a composition process to generate an around view image 801. For the composition process to generate an around view image 801, the processor 870 may utilize a first region in the image of the left side area 1310 acquired by the first camera 811. The processor 870 may utilize the first region as an image of the left region 811i in the around view image 801. This first region utilized for the compositing process to generate the around view image 801 may be referred to as a composition region of a first image.

The first camera 811 may be attached to a left front door 102L. For example, the first camera 811 may be attached to the case of the left side mirror. For example, the first camera 811 may be attached around a handle of the left front door 102L.

The second camera 812 may acquire a second image. The second camera 812 may acquire an image of a right side area of the vehicle 100. According to a set FOV, the second camera 812 may acquire an image of the right side area that is the lower image to the right of the vehicle 100.

Part of an image acquired by the second camera 812 may be used for a composition process to generate an around view image 801. For the composition process to generate the around view image 801, the processor 870 may utilize a first region in an image of the right side area acquired by the second camera 812. The processor 870 may utilize the first region as an image of the right region 812i in the around view image 801. This first region utilized for the composition process to generate the around view image 801 may be referred to as a composition region of a second image.

The second camera 812 may be attached to a right front door. For example, the second camera 812 may be attached to the case of the right side mirror. For example, the second camera 812 may be attached around a handle of the right front door.

Figure 13B:
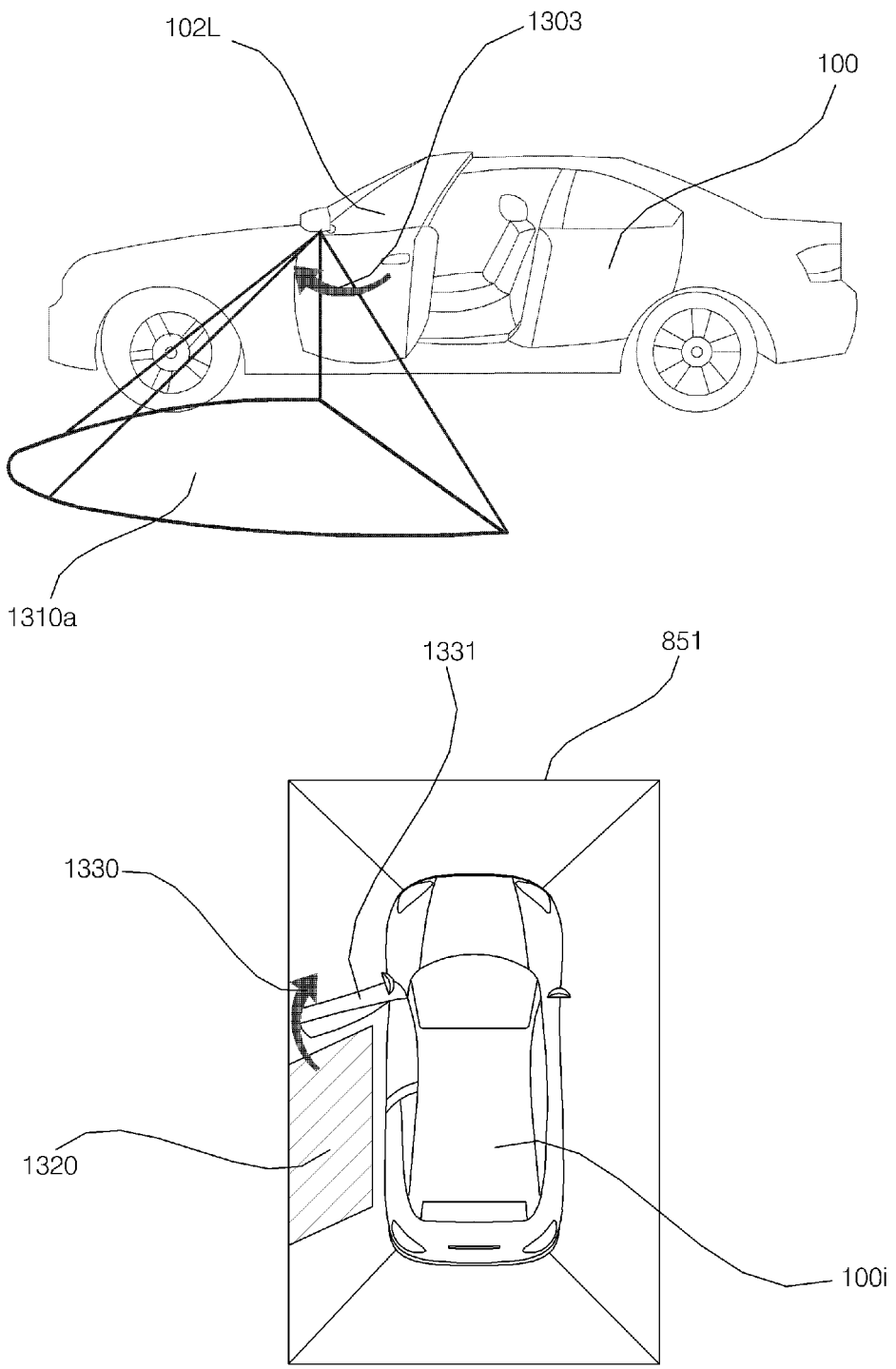

FIG. 13B illustrates an example of the display unit 851 and the vehicle 100 when the left front door 102L is opened.

The display unit 851 may display a top view image 802 as a corrected around view image.

In response to opening 1303 of the left front door 102L, the first camera 811 attached to the left front door 102L moves along a trajectory of the opening movement 1303 of the first camera 811. In this case, a range of an image to be acquired by the first camera 811 is changed according to the movement of the first camera 811.

Specifically, in response to the opening movement 1303 of the left front door 103L, the first camera 811 moves further towards the front of the vehicle 100. A region of an image to be acquired by the first camera 811 is changed so that the front side region of the vehicle 100 is extended.

In response to opening of a right front door, the second camera 812 attached to the right front door moves along a trajectory of the opening movement. In this case, a range of an image to be acquired by the second camera 812 may be changed according to the movement of the second camera 812.

Specifically, in response to opening movement of the right front door, the second camera 812 moves further towards the front side of the vehicle 100. A region of an image to be acquired by second camera 812 is changed so that the front side region of the vehicle 100 is extended.

The processor 870 may correct an around view image based on movement information of the left front door 102L and movement information of the right front door.

In response to the opening movement 1303 of the left front door 103L, the processor 870 may change a composition region of a first image acquired by the first camera 811. The processor 870 may correct an around view image based on the changed composition region of the first image.

In response to the opening movement 1303 of the left front door 102L, the processor 870 may determine that a new composition region of a first image, into which a previous composition region of the first image has been moved after the opening movement 1303 over image coordinates in a direction opposite to a direction of the opening movement 1303 in an effort to correspond to displacement of the opening movement 1303.

In response to opening movement of the right front door, the processor 870 may change a composition region of a second image acquired by the second camera 812. The processor 870 may correct an around view image based on the changed composition region of the second image.

In response to opening movement of the right front door, the processor 870 may determine a new composition region of a second image, into which a previous composition region of the second image has been moved after the opening movement over image coordinates in a direction opposite to a direction of the opening movement in an effort to correspond to displacement of the opening movement.

Meanwhile, the auxiliary camera 820 may include a first auxiliary camera and a second auxiliary camera.

When the opening movement 1303 of the left front door 102L is detected, the first auxiliary camera may acquire a left side image of the vehicle 100.

When the left front door 102L is opened, it is not possible to acquire an image of an area extending from the left front door 102L to the rearward door by using the first camera 811. It is because an FOV of the first camera 811 is blocked by the left front door 102L.

When the left front door 102L is opened, the first auxiliary camera may acquire an image of an area that is between the inner surface of the left front door 102L and the rearward door in the left side area of the vehicle 100. The image of the area extending from the inner surface of the left front door 102L to the rearward door, acquired by the first auxiliary camera, may be referred to as a first auxiliary image.

The processor 870 may correct an around view image by further compositing the first auxiliary image.

When opening of the right front door is detected, the second auxiliary camera may acquire a right view image of the vehicle 100.

When the right front door is opened, it is not possible to acquire, by using the second camera 812, an image of an area which extends the right front door to the backdoor. It is because a FOV of the second camera 812 is blocked by the right front door.

When the right front door is opened, the second auxiliary camera may acquire an image of an area which extends from the inner surface of the right front door to the rearward door in the right side area of the vehicle 100. The image of the area extending from the inner surface of the right front door to the rearward door, acquired by the second auxiliary camera, may be referred to as a second auxiliary image.

The processor 870 may correct an around view image by further compositing the second auxiliary image.

The processor 870 may determine whether a blind spot has been created by the opening movement 1303 of the left front door 102L or opening movement of the right front door.

When it is determined that a blind spot has been created, the processor 870 may highlight a region 1320, corresponding to the blind spot, in the corrected around view image 802.

When generating an around view image after the opening movement 1303 of the left side mirror 101L, the processor 870 may determine whether a blind spot has been created, by determining whether there is any missing part in the first image.

A subject of an image to be acquired by the first camera 811 is changed due to the opening movement 1303 of the left front door 102L. In this case, an image of a region necessary to generate an around view image may not be acquired.

The blind spot may be a region which cannot be acquired due to the opening movement 1303 of the left front door 103L among regions necessary to generate around view image.

The processor 870 may leave the region 1320, corresponding to a blind spot, blank in a corrected around view image 802.

The processor 870 may highlight the region 1320, corresponding to the blind spot, in the corrected around view image 802.

When generating an around view image after opening movement of the right front door, the processor 870 may determine whether a blind spot has been created, by determining whether there is a missing part in the second image.

A subject of an image to be acquired by the second camera 812 is changed due to opening movement of the right front door. In this case, an image of a region necessary to generate an around view image may not be acquired.

The blind spot may be a region which cannot be acquired due to the opening movement of the right front door among regions necessary to generate an around view image.

The processor 870 may leave a region, corresponding to a blind spot, blank in a corrected around view image.

The processor 870 may highlight a region, corresponding to a blind spot, in a corrected around view image.

The processor 870 may control the display unit 851 to output information about a state of opening movement of the left front door 102L or information about a state of opening movement of the right front door.

The processor 870 may display information about a state of opening movement of a door by displaying a graphic object corresponding to opening movement of the left front door 102L or the right front door. For example, the processor 870 may control the display unit 851 to display an arrow 1330 corresponding to opening movement of the left front door 102L.

The processor 870 may display information about a state of opening movement of a door by adding animation effects to a region 1331 corresponding to the left front door 102L or the right front door in the vehicle image 100i. For example, the processor 870 may control the display unit 851 to display animation such that an image of the left front door image or an image of the right front door image in the vehicle image 100i move to be opened. In this case, the processor 870 may perform a control action to display the animation with 2D or 3D images.

Meanwhile, in some implementations, the processor 870 may display information about a state of opening movement of the left front door 102L or the right front door by switching a view point of an around view image. For example, the processor 870 may display an around view image by switching between a front view, a rear view, and a side view.

The processor 870 may control the display unit 851 to output information as to whether an around view image has been corrected based on opening movement of the left front door 102L or the right front door.

Figure 14A:
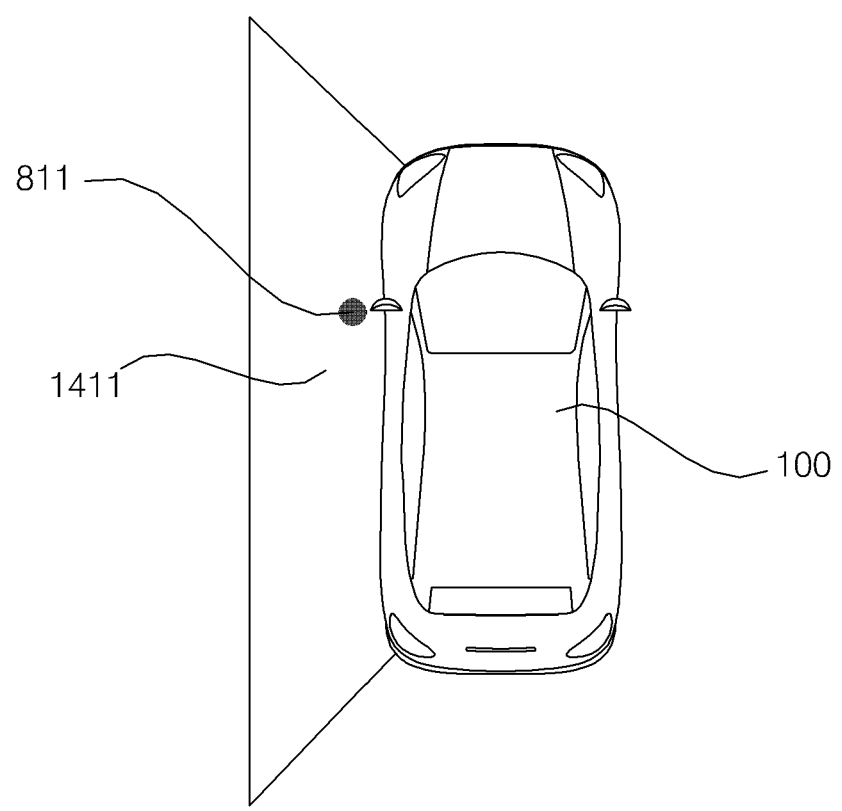
Figure 14B:
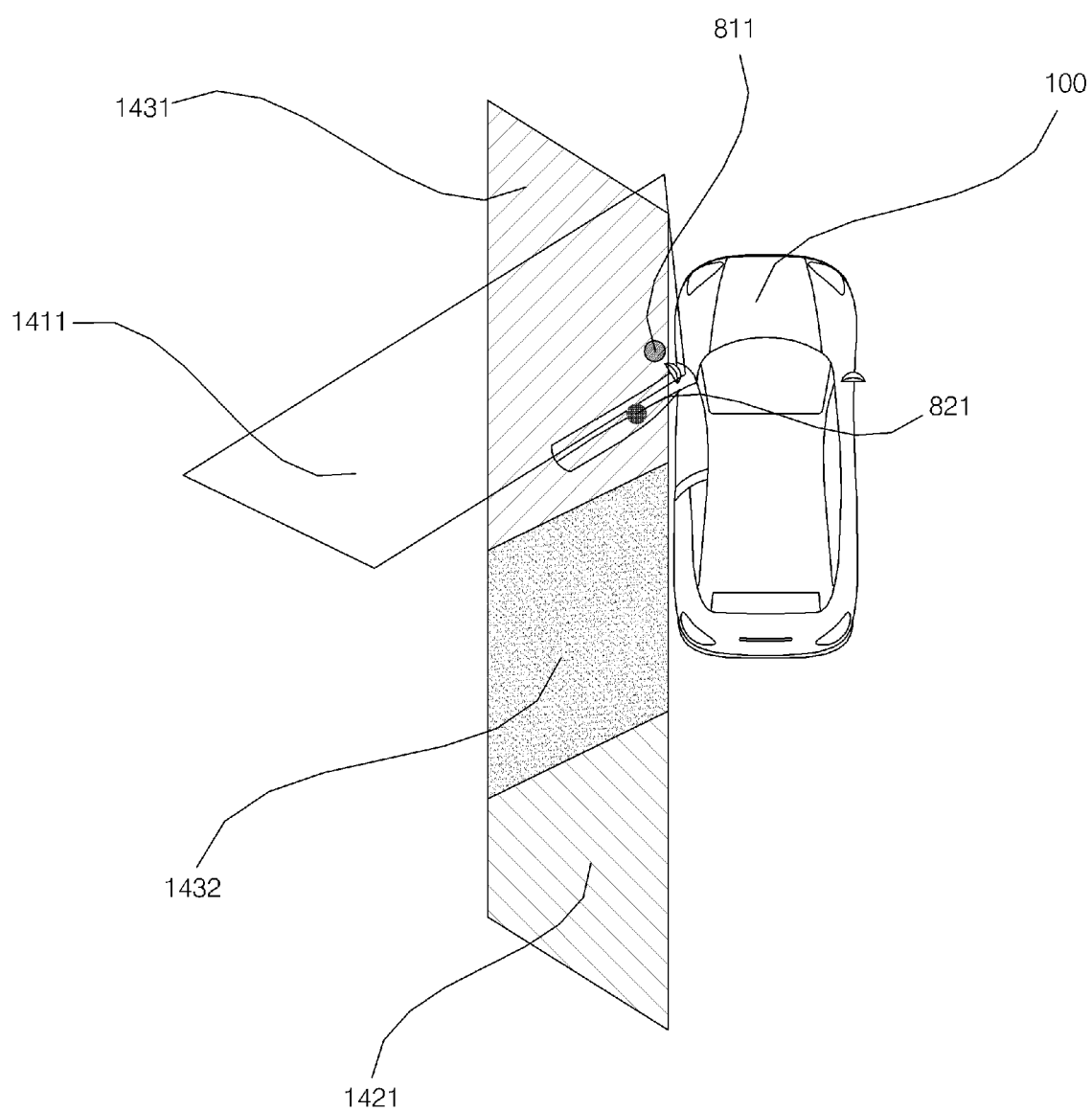

FIGS. 14A and 14B are diagrams for explanation of how to correct an around view image according to an implementation.

For convenience of explanation, description is provided with reference to a top view of the vehicle 100 in FIGS. 14A and 14B.

As illustrated in FIG. 14A, the first camera 811 may acquire a first image when the left front door 102L is close.

The second camera 812 may acquire a second image. The third camera may acquire a third image. The fourth camera 814 may acquire a fourth image.

The processor 870 may set a first region of the first image as a composition region. The first region of the first image may indicate a region which remains in the first image after cropping of regions unnecessary for an around view image. The first region of the first image may correspond to a region 1411 that exists within a preset distance from the left side of the vehicle 100 in the first image.

The processor 870 may generate an around view image by compositing respective composition regions of the first image, the second image, the third image, and the fourth image.

As illustrated in FIG. 14B, when the left front door 102L is opened, the first camera 811 may acquire a first image. In this case, a subject in the first image acquired by the first camera 811 is different from a subject in a first image acquired when the left front door 102L is closed.

In response to opening movement of the left front door 102L, the first camera 811 is rotated toward the left side of the vehicle 100 in a counter-clockwise direction. In this case, an FOV of the first camera 811 is changed, and therefore, the first camera 811 may acquire a first image which is different from a first image acquired when the left front door 102L is closed.

The processor 870 may determine a second region of the first image as a composition region of the first image. The second region of the first image may partly overlap with a first region of a first image that is acquired when the left front door 102L is close. The second region of the first image may indicate a region which remains in the first image after cropping of regions unnecessary for an around view image. Here, the second region of the first image may be a region 1431 that exists within a preset distance from the left side or the front of the vehicle 100 in the first image.

The processor 870 may correct the around view image based on the second region of the first image.

Meanwhile, the first auxiliary camera 821 may acquire a first auxiliary image. The first auxiliary image may be an image of an area which is formed between the inner surface of the opened left front door 102L and the backdoor in a longitudinal direction and which is formed within a specific distance from the left side of the vehicle 100 in a transverse direction.

When opening movement 1303 of the left front door 103L is detected, the first auxiliary camera 821 may acquire a left view image of the vehicle 100. For example, the first auxiliary camera 821 may acquire an image of an area extending from the inner surface of the left front door 102L to the backdoor.

The processor 870 may correct an around view image based on a first region of the first auxiliary image. The first region of the first auxiliary image may indicate a region which is left in the first auxiliary image after cropping of regions unnecessary for an around view image.

Meanwhile, the second auxiliary camera 821 may acquire a second auxiliary image. The second auxiliary image may be an image of an area which is formed between the inner surface of the opened right front door and the rearward door in a longitudinal direction and which is formed within a specific distance from the right side of the vehicle 100 in a traverse direction.

When opening movement of the right front door is detected, the second auxiliary camera 821 may acquire a right view image of the vehicle 100. For example, the auxiliary camera 821 may acquire an image of an area extending the inner surface of the right front door to the rearward door.

The processor 870 may correct an around view image based on a first region of a second auxiliary image.

The processor 870 may highlight a corrected region in a corrected around view image.

Figure 15:
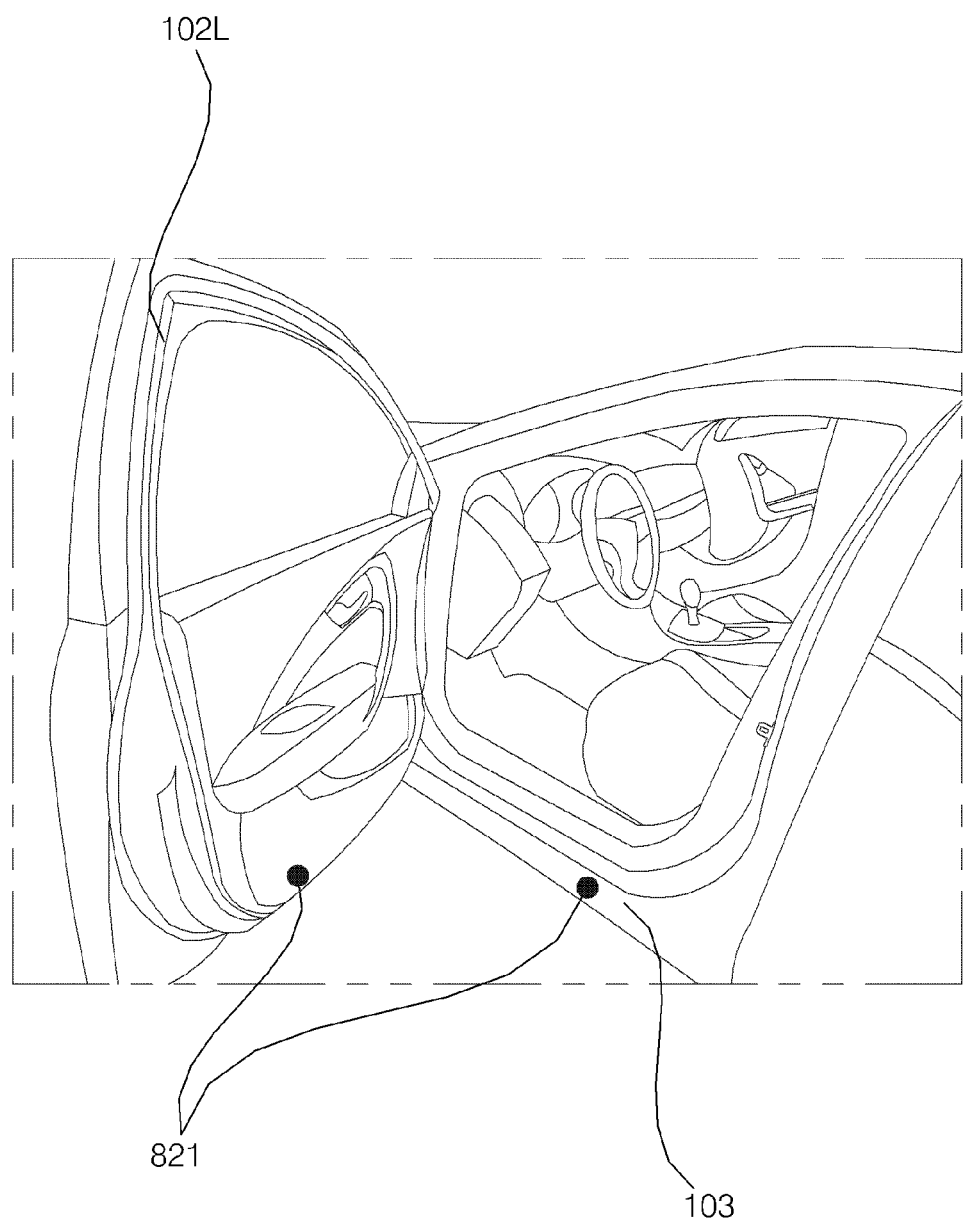

FIG. 15 is a diagram for explanation of an attached location of an auxiliary camera according to an implementation.

Referring to FIG. 15, the auxiliary camera 820 may include a first auxiliary camera 821 and a second auxiliary camera.

The first auxiliary camera 821 may be attached to the inner surface of the left front door 102L. Alternatively, the first auxiliary camera 821 may be attached to one region of a left rocker panel.

The second auxiliary camera may be attached to an inner surface of the right front door. Alternatively, the second auxiliary camera may be attached to one region of a right rocker panel.

Figure 16A:
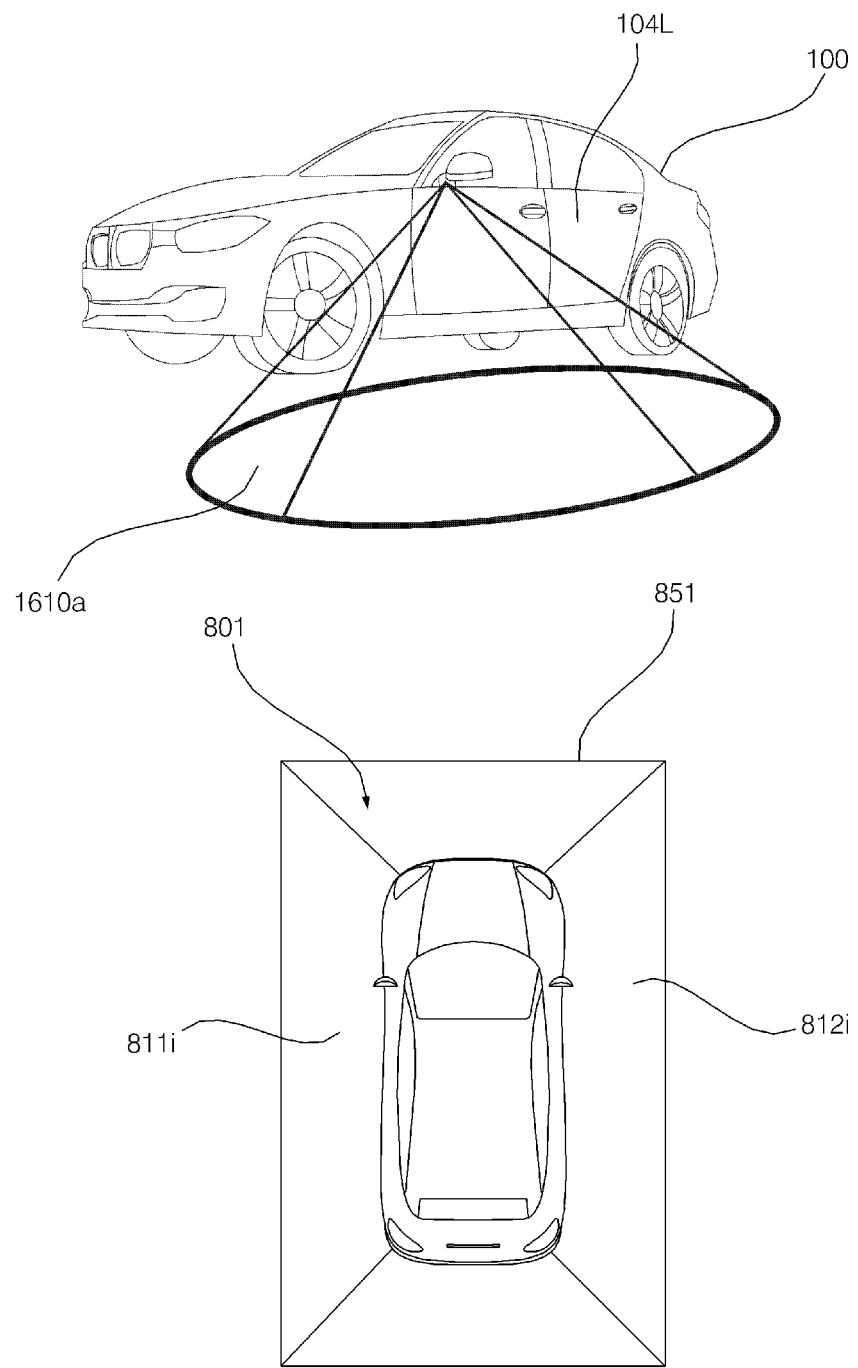
FIGS. 16A to 17 are diagrams illustrating operation of an example of an around-view monitoring apparatus in different orientations of a rear door.
Figure 16B:
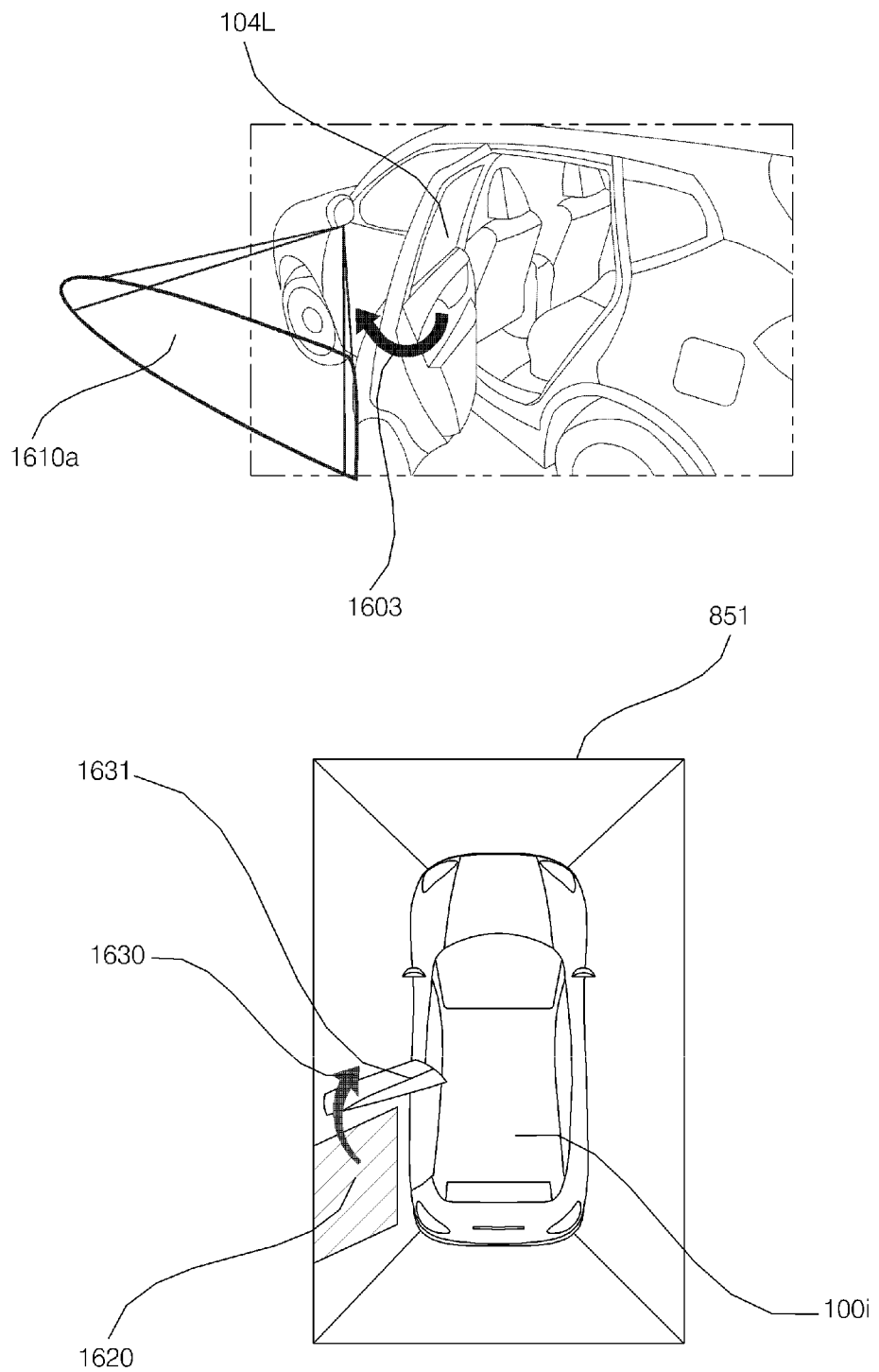
Figure 17:
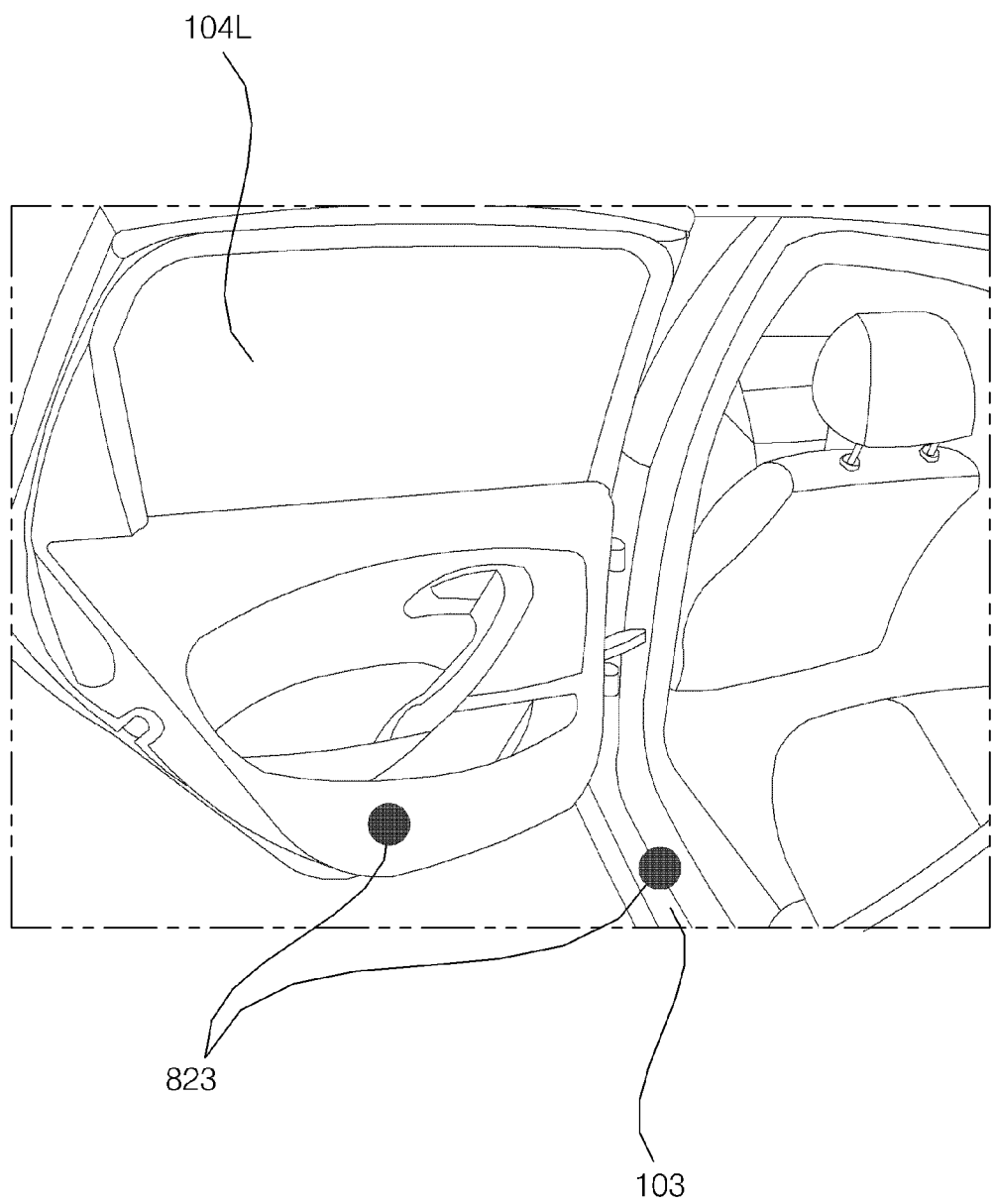

FIGS. 16A to 17 are diagrams illustrating operation of an example of an around-view monitoring apparatus in different orientations of a rear door.

FIGS. 16A to 17 shows the left side of the vehicle, and operation performed on the left side of the vehicle 100 is largely described, but the right side of the vehicle 100 may operate in a similar manner.

FIG. 16A illustrates the display unit 851 and the vehicle 100 when a left rear door 104L is not opened.

The display unit 851 may display a top view image 801 as an around view image.

FIG. 16B illustrates the vehicle 100 and the display unit 851 when the left rear door 104L is opened.

The display unit 851 may display a top view image 802 as a corrected around view image.

The display unit 851 may display a top view image as an around view image.

If the left rear door 104L is opened with the first camera 811 being attached to the left front door, the first camera 811 is not able to acquire an image of an area behind the opened left rear door 104L. In this case, a blind spot is created between the inner surface of the opened left rear door 104L and the rearward door.

The processor 870 may acquire information on opening movement 1603 of the left rear door 104L.

The processor 870 may acquire the information on the opening movement 1603 of the left rear door 104L based on a first image acquired by the first camera 811.

The processor 870 may receive the information on the opening movement 1603 of the left rear door 104L from the vehicle drive device 600 via the interface 880.

The processor 870 may determine whether a blind spot has been created by the opening movement 1603 of the left rear door 104L.

If it is determined that a blind spot has been crested, the processor 870 may highlight a region corresponding to the blind spot in a corrected around view image.

When generating an around view image after the opening movement 1603 of the left rear door 104L, the processor 870 may determine whether a blind spot has been created, by determining whether there is any missing part in the first image.

The blind spot may be a region which cannot be acquired due to the opening movement 1603 of the left rear door 104L among regions necessary to generate an around view image.

If the right rear door is opened with the second camera 812 being attached to the right front door, the second camera 812 is not able to acquire an image of an area behind the opened right rear door. In this case, a blind spot is created between the inner surface of the opened left rear door and the rearward door.

The processor 870 may acquire information on opening movement of the right rear door.

The processor 870 may acquire the information on the opening movement of the right rear door based on a second image acquired by the second camera 812.

The processor 870 may receive the information on the opening movement of the right rear door from the vehicle drive 600 via the interface 800.

The processor 870 may determine whether a blind spot has been created by opening movement of the right rear door.

When it is determined that a blind spot has been created, the processor 870 may highlight a region corresponding to the blind spot in a corrected around view image.

When generating an around view image after the opening movement of the right rear door, the processor 870 may determine whether a blind spot has been created, by determining whether there is any missing part in the second image.

The blind spot may be a region which cannot be acquired due to opening movement of the right rear door among regions necessary to generate an around view image.

The processor 870 may leave a region 1320, corresponding to the blind spot, blank in a corrected around view image.

The processor 870 may highlight the region 1320, corresponding to the blind spot, in a corrected around view image.

The processor 870 may control the display unit 851 to output information about a state of opening movement of the left rear door 104L or information about a state of opening movement of the right rear door.

The processor 870 may display the information about a state of opening movement of the left rear door 104L or the information about a state of opening movement of the right rear door, by displaying a graphic object corresponding to opening movement of the left rear door 104L or the right rear door. For example, the processor 870 may control the display unit 851 to display an arrow 1603 corresponding to opening movement of the left rear door 104L.

The processor 870 may display the information about a state of opening movement of the left rear door 104L or the information about a state of opening movement of the right rear door, by adding animation effects to a region 1631 corresponding to the left rear door 104L or the right rear door. For example, the processor 870 may control the display unit 851 such that an image of the left rear door or an image of the right rear door in the vehicle image 100i move to be opened. In this case, the processor 870 may perform a control action to display the animation with 2D images or 3D images.

Meanwhile, in some implementations, the processor 870 may display information about a state of opening movement of the left rear door 104L or the right rear door by switching a view point of an around view image. For example, the processor 870 may display the around view image by switching between a front view, a rear view, and a side view.

FIG. 17 is a diagram for explanation of an auxiliary camera according to an implementation.

Referring to FIG. 17, the auxiliary camera 820 may include a third auxiliary camera 823 and a fourth auxiliary camera.

When opening movement 1603 of the left rear door 104L is detected, the third auxiliary camera 823 may acquire a left view image of the vehicle 100.

When the left rear door 104L is opened, it is not possible to acquire an image of an area extending from the left rear door 104L to the rearward door. It is because an FOV of the first camera 811 is blocked by the left rear door 104L.

When the left rear door 104L is opened, the auxiliary camera 823 may acquire an image of an area extending the inner surface of the left rear door 104L to the rearward door. Here, the image of the area extending from the inner surface of the left rear door 104L to the rearward door, acquired by the third auxiliary camera, may be referred to as a third auxiliary image.

The processor 870 may correct an around view image by further compositing a third auxiliary image.

The third auxiliary camera 823 may be attached to the inner surface of the left rear door 104L. Alternatively, the third auxiliary camera 823 may be attached to one region of a left rocker panel.

When opening movement of the right rear door is detected, the fourth auxiliary camera may acquire a right view image of the vehicle 100.

When the right rear door is opened, it is not possible to acquire, using the second camera 812, an image of an area extending from the right rear door to the rearward door. It is because an FOV of the second camera 812 is blocked by the right rear door.

When the right rear door is opened, the fourth auxiliary camera may acquire an image of an area which extends from the inner surface of the right rear door to the rearward door in the right side area of the vehicle 100. Here, the image of the area extending from the inner surface of the right rear door to the rearward door, acquired by the fourth auxiliary camera, may be referred to as a fourth auxiliary image.

The processor 870 may correct an around view image by further compositing a fourth auxiliary image.

The fourth auxiliary camera may be attached to the inner surface of the right rear door. Alternatively, the fourth auxiliary camera may be attached to one region of a right rocker panel.

FIGS. 18A to 20 are diagrams illustrating operation of an example of an around-view monitoring apparatus in different orientations of a rearward door (such as a trunk or tailgate).

Figure 18A:
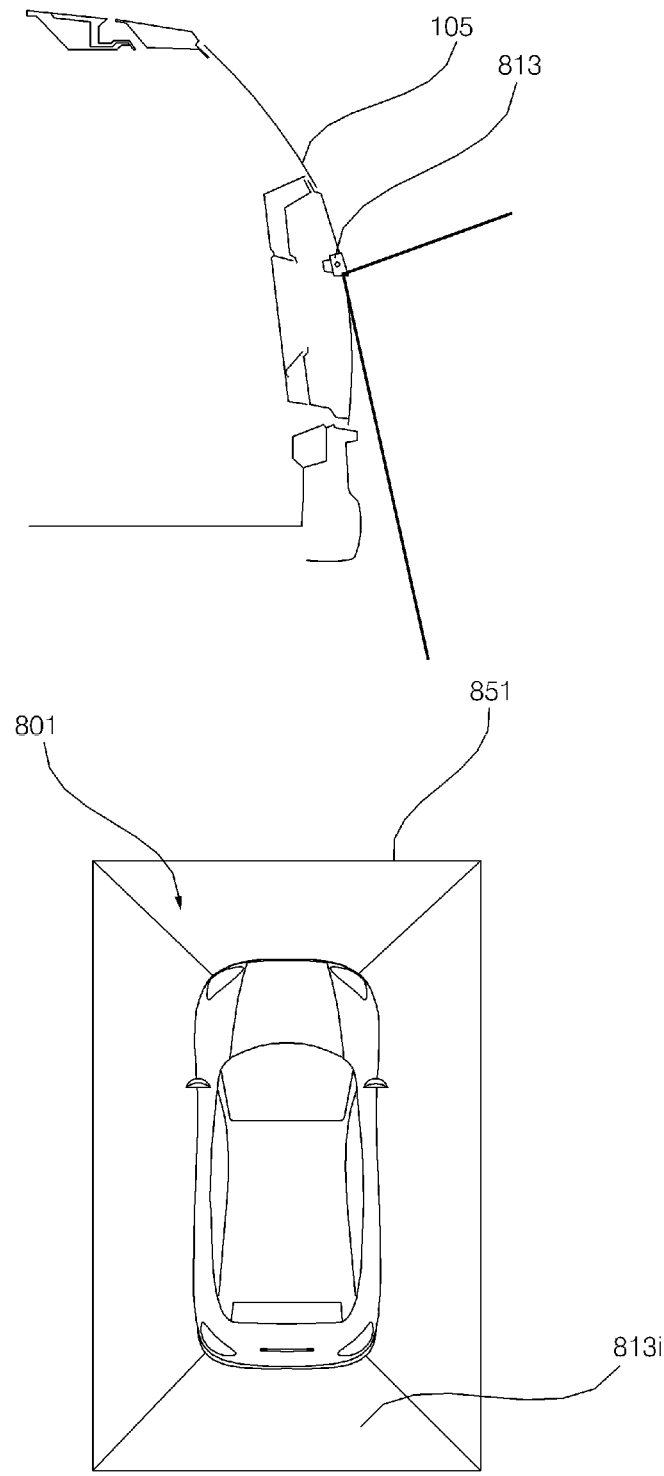
FIGS. 18A to 20 are diagrams illustrating operation of an example of an around-view monitoring apparatus in different orientations of a rearward door.

FIG. 18A illustrates part of the vehicle 100 whose door is not opened, and the display unit 851.

The display unit 851 may display a top view image 801 as an around view image.

The third camera 813 may acquire a third image. The third camera 813 is not able to acquire an image of a rear side area of the vehicle 100. According to a set FOV, the third camera 813 is not able to acquire an image of the rear side area which is the lower image to the rear of the vehicle 100.

Part of an image acquired by the third camera 813 may be used for a composition process to generate the around view image 801. For the composition process to generate the around view image 801, the processor 870 may utilize the first region in an image of the rear side area. For the composition process to generate the around view image 801, the processor 870 may utilize the first region in an image of the rear side area acquired by the third camera 813. The processor 870 may utilize the first region as an image of the rear region 813*i* in the around view image 801. Here, this first region used in the composition process to generate the around view image 801 may be referred to as a composition region of a third image.

The third camera 813 may be attached to the rearward door 105.

For example, the third camera 813 may be disposed inside an emblem formed in one region of the rearward door 105. In this case, the camera 813 may be hidden by the emblem. The camera 813 may be hidden behind the emblem normally and exposed upon operation of the AVM apparatus 100. Meanwhile, the emblem may be formed on the rearward door and able to be rotated in a horizontal or vertical direction.

Figure 18B:
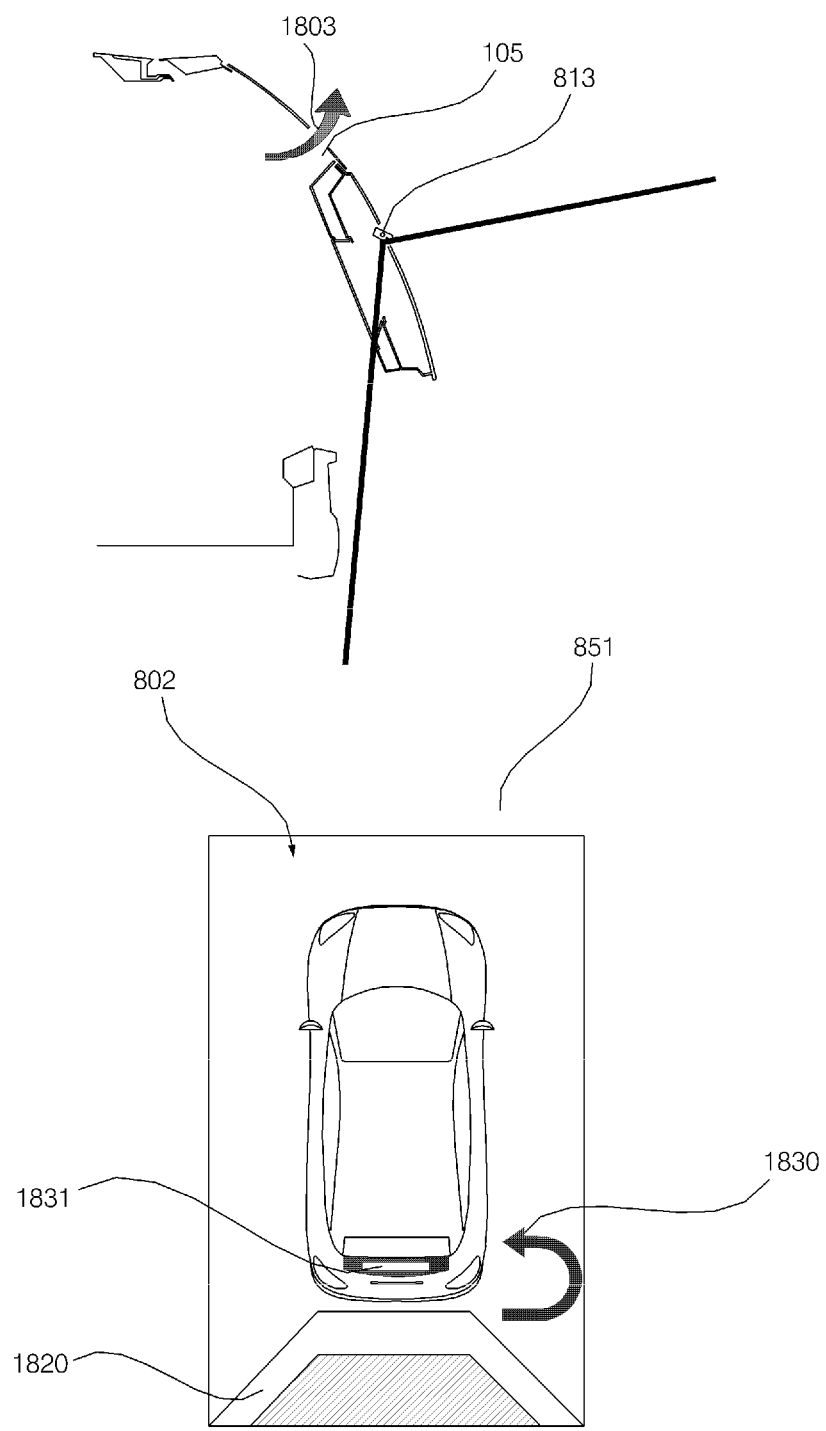

FIG. 18B illustrates an example of part of the vehicle 100 whose door is opened, and the display unit 851.

The display unit 851 may display a top view image 802 as a corrected around view image.

In response to opening 1803 of the rearward door 105, the third camera 813 moves along a trajectory of the opening movement 1803. In this case, a range of an image to be acquired by the third camera 813 is changed according to the movement of the third camera 813.

Specifically, in response to the opening movement 1803 of the rearward door 105, the third camera 813 moves to point further towards the top (sky) above the vehicle 100. A region of an image to be acquired by the third camera 813 is changed so that the top region of the vehicle 100 is extended.

The processor 870 may correct an around view image based on movement information of the rearward door 105.

In response to the opening movement 1803 of the rearward door 105, the processor 870 may change a composition region of the third image acquired by the third camera 813. The processor 870 may correct an around view image based on the changed composition region of the third image.

In response to the opening movement 1803 of the rearward door 105, the processor 870 may determine a new composition region of a third image, into which a previous composition region of the third image has been moved after the opening movement 1803 over image coordinates in a direction opposite to a direction of the opening movement 1803 in an effort to correspond to displacement of the opening movement 1803.

The processor 870 may correct an around view image by adjusting the scale of the third image based on the opening movement 1803 of the rearward door 105.

When the rearward door 105 is opened, the third camera 813 moves further upward from the ground. In this case, the scale of the third image may be adjusted to overcome the difference in height between the third camera 813 and other cameras, such as the first camera 811, the second camera 812, and the fourth camera 814.

Meanwhile, the camera position adjustment unit 830 may include a third drive unit configured to adjust a position of the third camera 813.

The processor 870 may control the third drive unit to cause the third camera 813 to move responsive to opening movement of the rearward door 105.

For example, the processor 870 may control the third drive unit to cause the third camera 813 to move in a direction opposite to a direction of opening movement of the rearward door 105.

For example, the processor 870 may control the third drive unit to cause the third camera 813 to move at a speed corresponding to a speed of opening movement of the rearward door 105. For example, the processor 870 may control the third drive unit to cause the third camera 813 to move at a speed proportional to an absolute value of the speed of the opening movement of the rearward door 105.

For example, the processor 870 may control the third drive unit to cause the third camera 813 to move corresponding to displacement of opening movement of the rearward door 105. For example, the processor 870 may control the third drive unit to cause the camera 813 to move proportionally to displacement of opening movement of the rearward door 105.

For example, in response to opening movement of the rearward door 105, the processor 870 may control the third drive unit to cause the third camera 813, which faces the outside the rearward door 105, to be rotated to thereby face the inside of the rearward door 105.

After movement of the third camera 813, the processor 870 may correct an around view image based on an acquired image. The processor 870 may determine whether a blind spot has been created by opening movement of the rearward door 105.

When it is determined that a blind spot has been created, the processor 870 may highlight a region 1820 corresponding to the blind spot in a corrected around view image 802.

When generating an around view image after the opening movement 1803 of the rearward door 105, the processor 870 may determine whether a blind spot has been created, by determining whether there is any missing part in the third image.

A subject in an image to be acquired by the third camera 813 is changed due to the opening movement 1803 of the rearward door 105. In this case, an image of a region necessary to generate an around view image may not be acquired.

The blind spot may be a region which cannot be acquired due to the opening movement 1803 of the rearward door 105 among regions necessary to generate an around view image.

The processor 870 may leave the region 1820, corresponding to the blind spot, blank in the corrected around view image 802.

The processor 870 may highlight the region 1820, corresponding to the blind spot, in the corrected around view image 802.

The processor 870 may control the display unit 851 to output information about a state of opening movement of the rearward door 105.

The processor 870 may display information about a state of opening movement of the rearward door 105, by displaying a graphic object corresponding to the opening movement of the rearward door 105. For example, the processor 870 may control the display unit 851 to display an arrow 1830 corresponding to opening movement of the rearward door 105.

The processor 870 may display information about a state of opening movement of the rearward door 105, by adding animation effects to a region 1831 corresponding to the rearward door 105. For example, the processor 870 may control the display unit 851 to display animation such that a rearward door in the vehicle image 100*i* moves to be opened. In this case, the processor 870 may perform a control action such that the animation is displayed with 2D images or 3D images.

Meanwhile, in some implementations, the processor 870 may display information about a state of opening movement the rearward door 105, by switching a view point of the around view image. For example, the processor 870 may display an around view image by switching between a front view, a rear view, and a side view.

The processor 870 may control the display unit 851 to output information as to whether an around view image has been corrected based on opening movement of the rearward door 105.

Figure 19A:
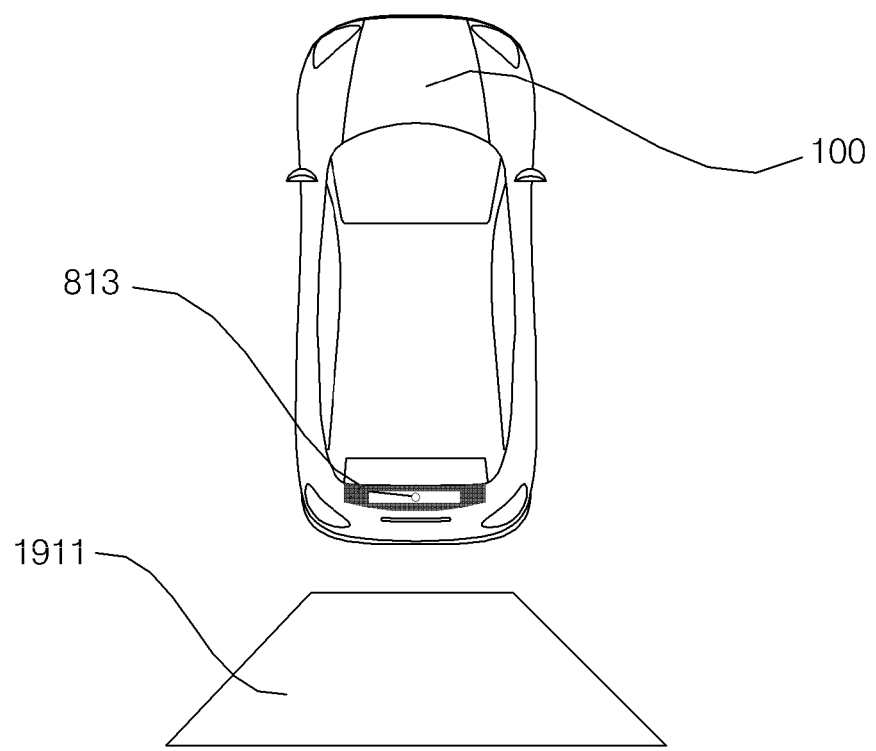
Figure 19B:
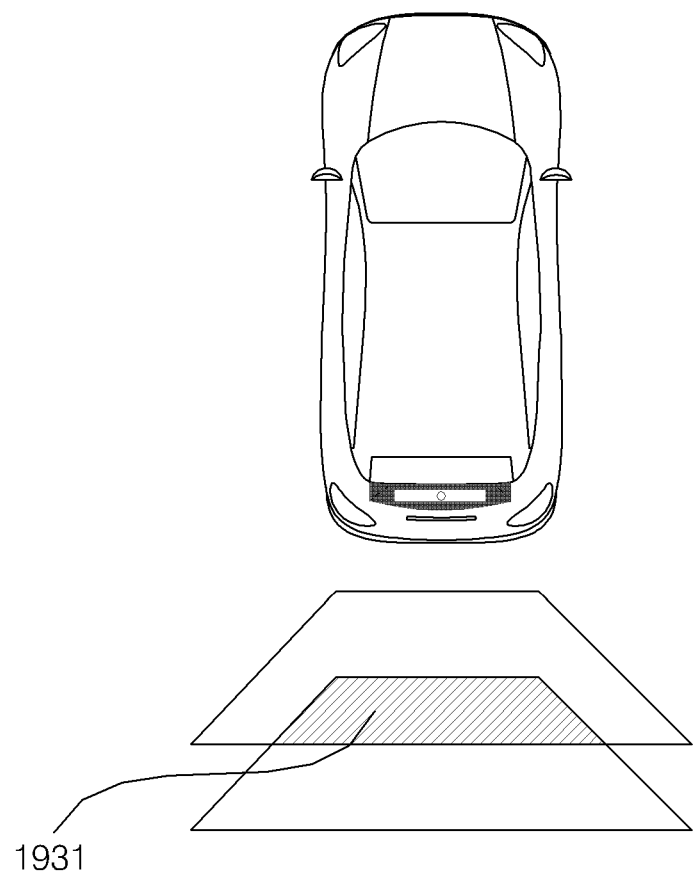

FIGS. 19A and 19B are diagrams for explanation of operation of correcting an around view image according to an implementation.

For convenience of explanation, description is provided with reference to a top view of the vehicle 100 in FIGS. 19A and 19B.

As illustrated in FIG. 19A, while the rearward door 104 is closed, the third camera 813 may acquire a third image.

The processor 870 may set a first region of the third image as a composition region of the third image. Here, the first region of the third image may be a region which is left in the third image after cropping of regions unnecessary for an around view image. Here, the first region of the third image may be a region that corresponds to a region 1911 that exists within a preset distance behind the vehicle 100 in the first image.

The processor 870 may generate an around view image by compositing a composition region of the first image, a composition region of the second image, a composition region of the third image, and a composition region of the fourth image.

As illustrated in FIG. 19B, while the rearward door 105 is opened, the third camera 813 may acquire a third image. In this case, a subject in the third image acquired by the third camera 813 is different from a subject in a third image acquired when the rearward door 105 is closed.

In response to opening movement of the rearward door 105, the third camera 813 is rotated towards the top of the vehicle 100 in a counter-clockwise direction. In this case, an FOV of the third camera 813 is changed, and therefore, the third camera 813 may acquire a third image which is different from a third image that is acquired when the rearward door 105 is closed.

The processor 870 may set a second region of the third image as a composition region of the third image. The second region of the third image may partly overlap with the first region of the third image acquired when the rearward door 105 is closed. Here, the second region of the third image may be a region which remains in the third image after cropping of regions unnecessary for an around view image. Here, the second region of the third image may be a region 1931 that exists within a preset distance behind the vehicle 100 in the first image.

The processor 870 may correct an around view image based on the second region of the third image.

Figure 20:
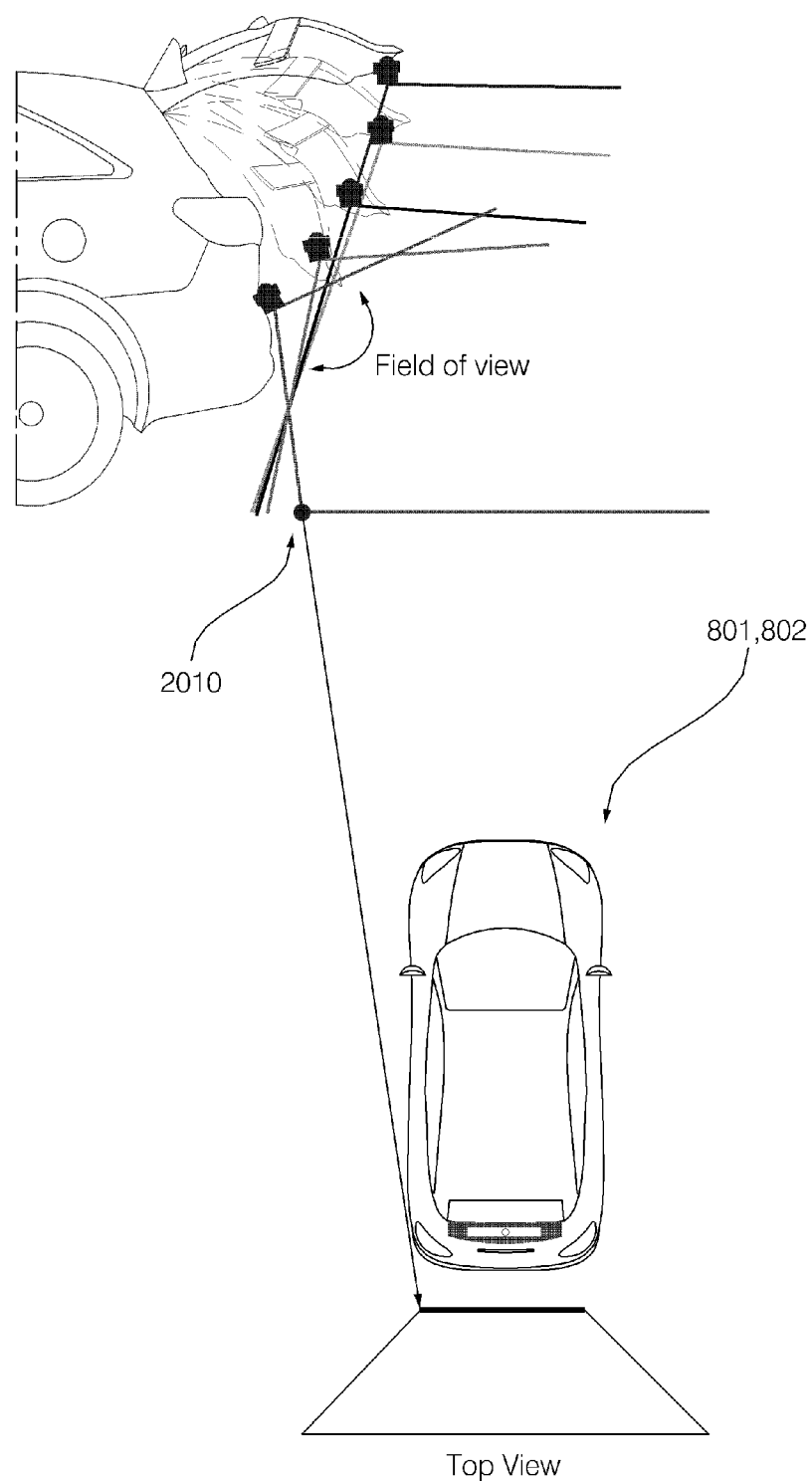

FIG. 20 is a diagram for explanation of rotation of the third camera according to an implementation.

Referring to FIG. 20, the third drive unit of the camera position adjustment unit 830 may adjust the position of the third camera 813.

The processor 870 may control the third drive unit to cause the third camera 813 to move responsive to opening movement of the rearward door 105.

The processor 870 may set a virtual boundary 2010. The processor 870 may control the third drive unit to cause the camera 813 to move based on the virtual boundary 2010.

For example, in response to opening movement of the rearward door 105, the processor 870 may control movement of the first camera 813 so that a third image include the virtual boundary 2010. The processor 870 may perform a control action so that a third image acquired with a closed rearward door 105 includes the virtual boundary 2010. The processor 870 may perform a control action so that a third image acquired with an opened rearward door 105 includes the virtual boundary 2010.

The virtual boundary 2010 may be a line that is formed by contact between the ground and a virtual plane which is extended in an overall-width direction from the exterior of the bumper of the vehicle 100.

The virtual boundary 2010 may correspond to a boundary between a composition region of the third image and the vehicle image 100i in the around view image 801 or the corrected around view image 802.

FIGS. 21A to 21D are diagrams illustrating detection of an object based on a corrected around view image.

Figure 21A:
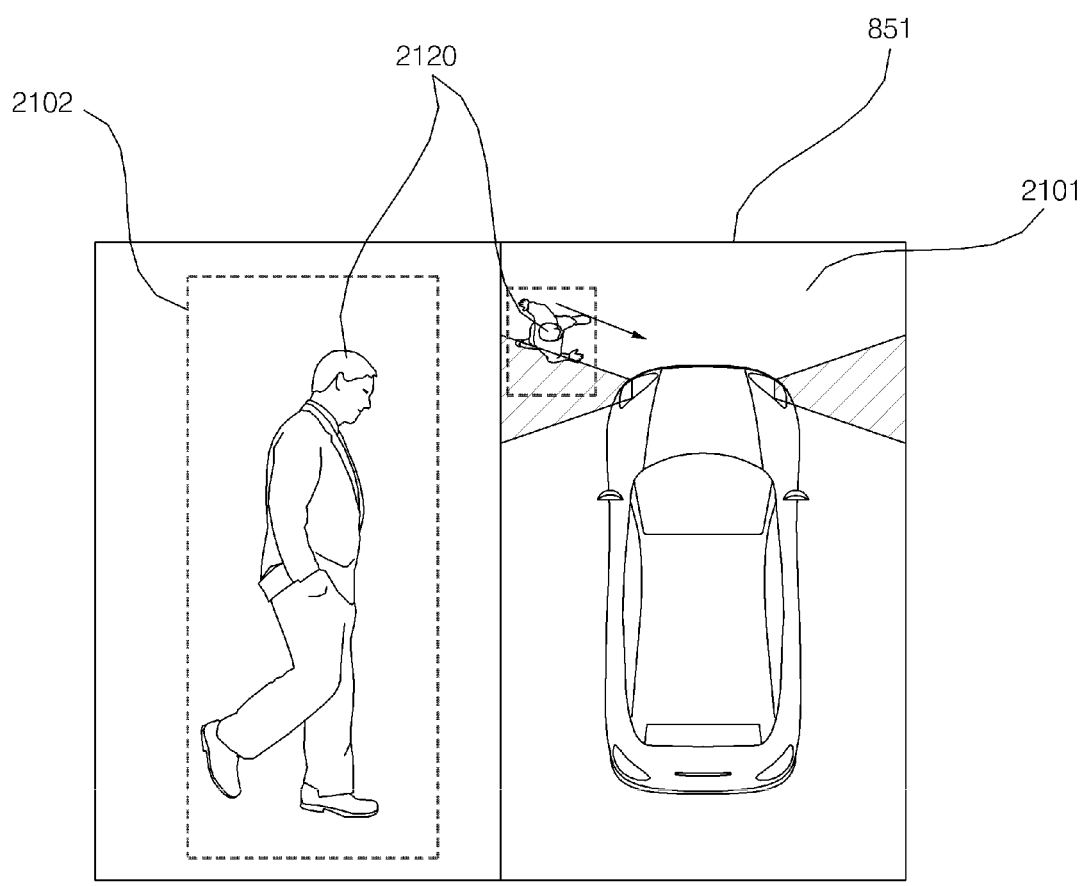
FIGS. 21A to 21D are diagrams illustrating detection of an object based on a corrected around view image.

As illustrated in FIG. 21A, the processor 870 may correct an around view image based on folding movement of the left side mirror and the right side mirror.

Figure 21B:
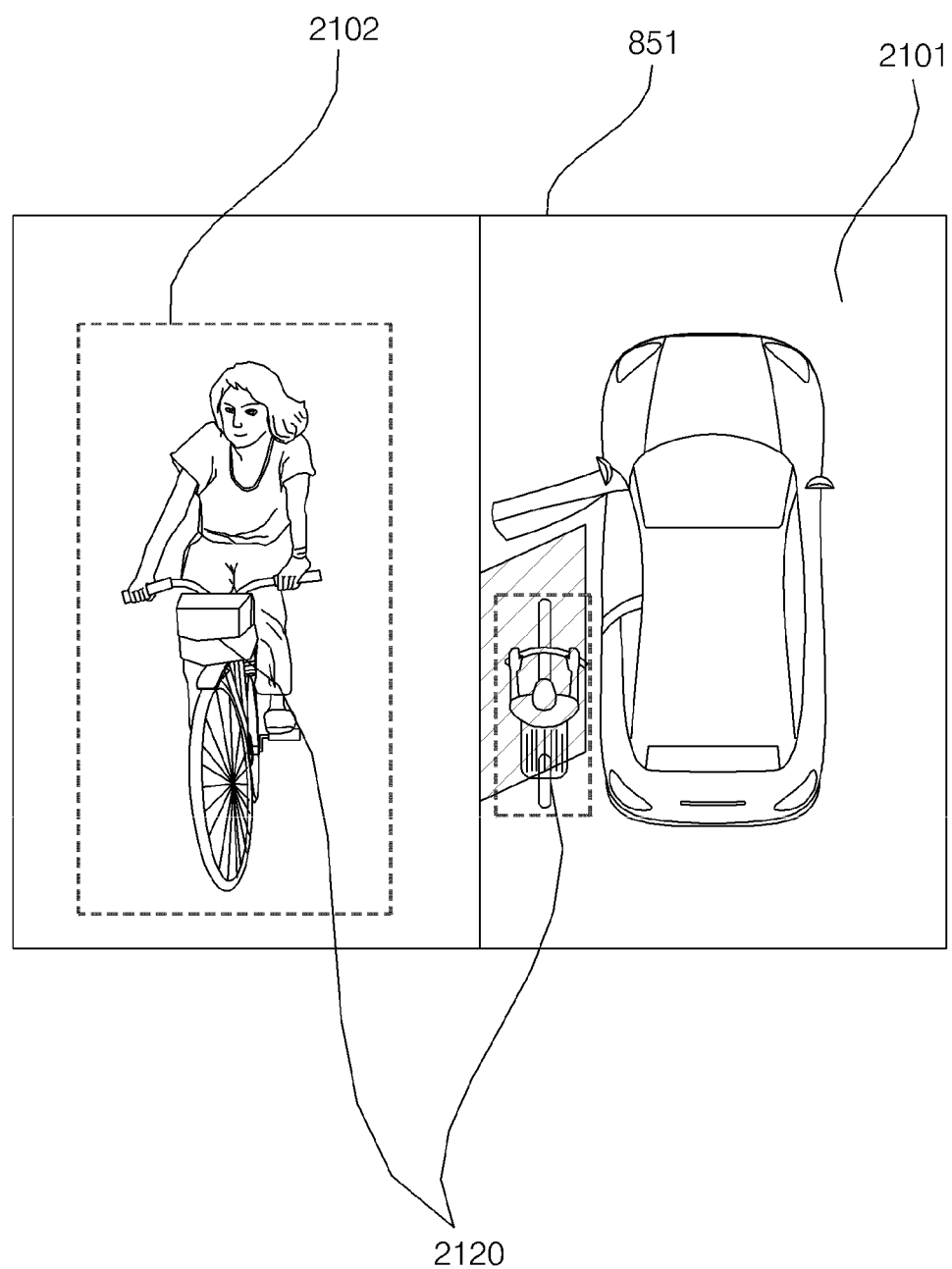

As illustrated in FIG. 21B, the processor 870 may correct an around view image based on opening movement of the left front door or the right front door.

Figure 21C:
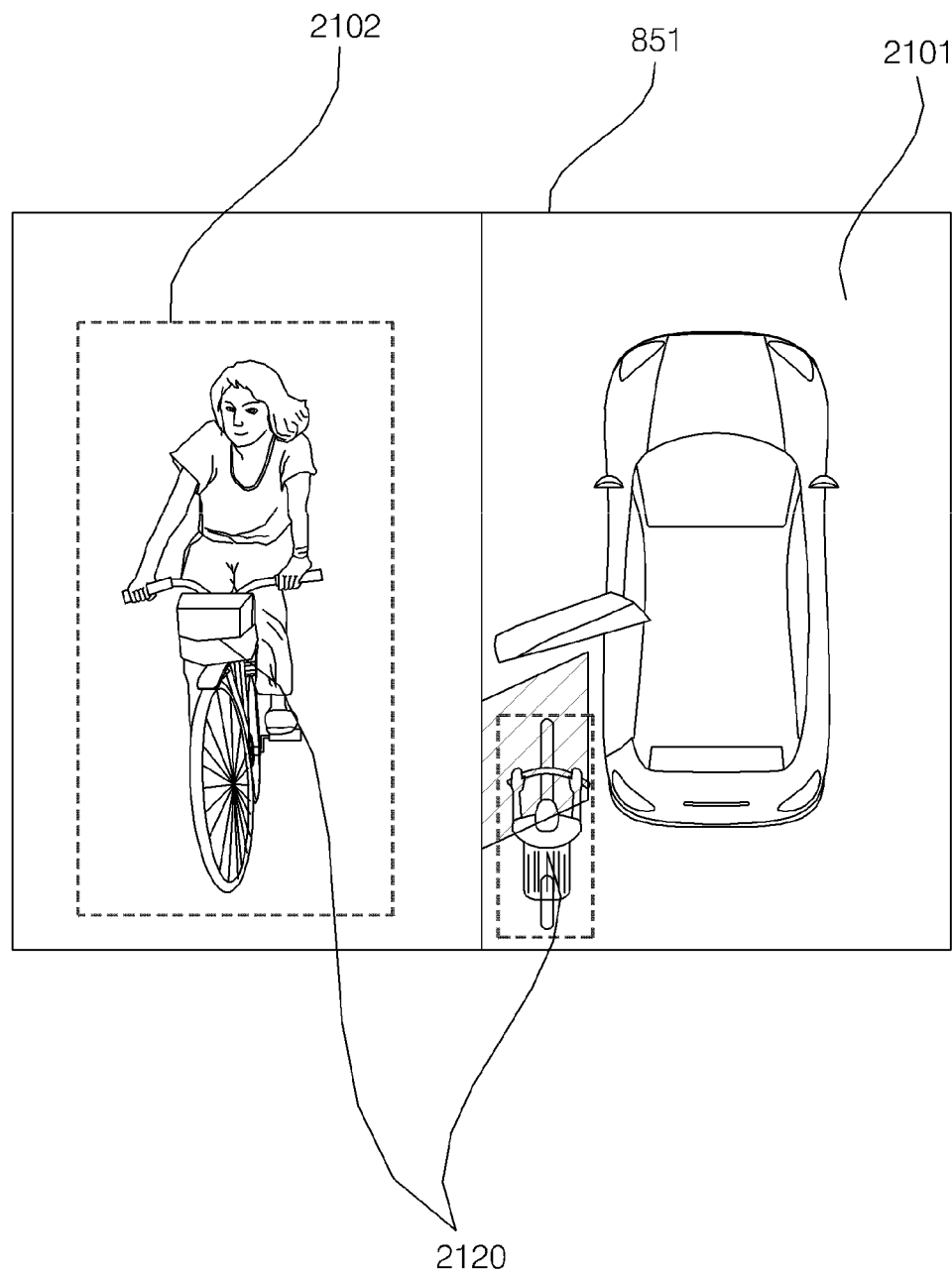

As illustrated in FIG. 21C, the processor 870 may correct an around view image based on opening movement of the left rear door or the right rear door.

Figure 21D:
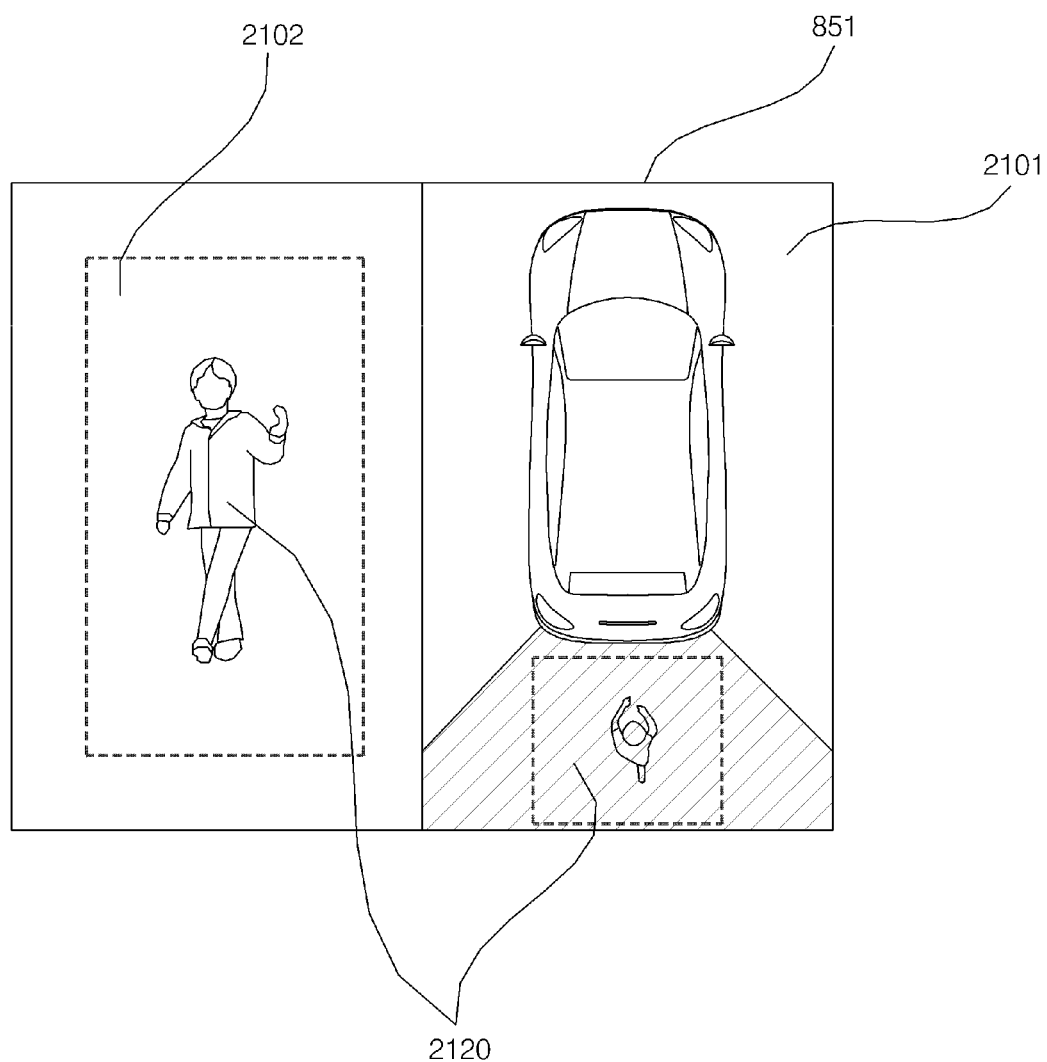

As illustrated in FIG. 21D, the processor 870 may correct an around view image based on opening movement of the rearward door.

The processor 870 may detect a surrounding object based on a corrected around view image. The processor 870 may generate object detection information.

The processor 870 may control the display unit 851 to display a corrected around view image. The processor 850 may control the display unit 851 to display a graphic object 2120, corresponding to an object, in the corrected around view image.

The processor 870 may divide the display unit 851 into a plurality of areas. For example, the processor 870 may divide the display unit 851 into a first display area and a second display area.

The processor 870 may control the display unit 851 to output a corrected around view image in a first display area 2101.

If an object is detected from the corrected around view image, the processor 870 may control the display unit 851 to display, in a second display area 2102, an image acquired by a camera that has photographed the object.

The processor 870 may detect a surrounding object based on the corrected around view image.

Figure 22A:
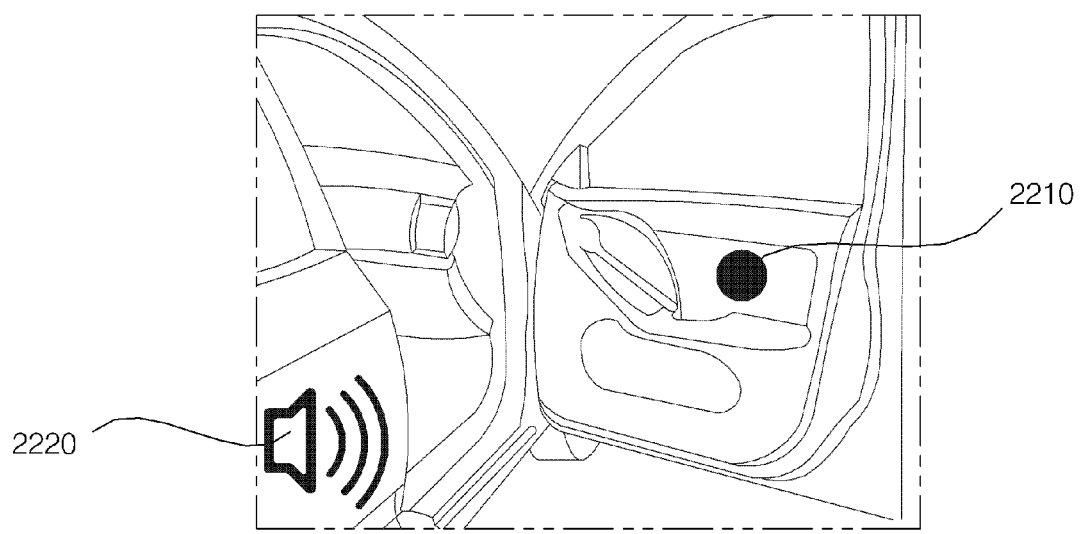
FIGS. 22A and 22B are diagrams illustrating warning generation based on detection of an object.
Figure 22B:
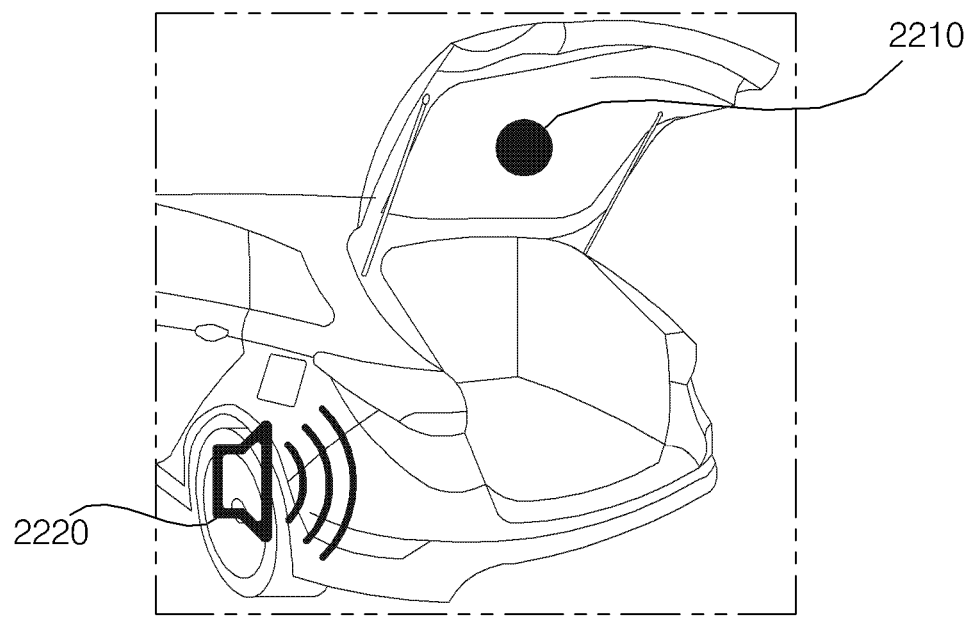

FIGS. 22A and 22B are diagrams illustrating warning generation based on detection of an object.

Referring to FIGS. 22A and 22B, the processor 870 may output a warning based on object detection information.

The vehicle AVM apparatus 800 may further include a lamp 2210.

As illustrated in FIG. 22A, the lamp 2210 may be disposed on the inner surface of any one of the left front door, the right front door, the left rear door, and the right rear door.

As illustrated in FIG. 22B, the lamp 2210 may be disposed on the inner surface of the rearward door.

The AVM apparatus 800 may further include a sound output unit 852.

The processor 870 may acquire passenger boarding/disembarking information. The processor 870 may acquire information on a distance between the vehicle 100 and an object.

If it is determined that a distance between a detected object and the vehicle is equal to or smaller than a reference value when passenger boarding information or passenger disembarking information has been received, the processor 870 may control the lamp 2210 to output a visual signal.

If it is determined that a distance between a detected object and the vehicle is equal to or smaller than a reference value when passenger boarding information or passenger disembarking information has been received, the processor 870 may control the sound output unit 852 to output an audio signal 2220.

Figure 23:
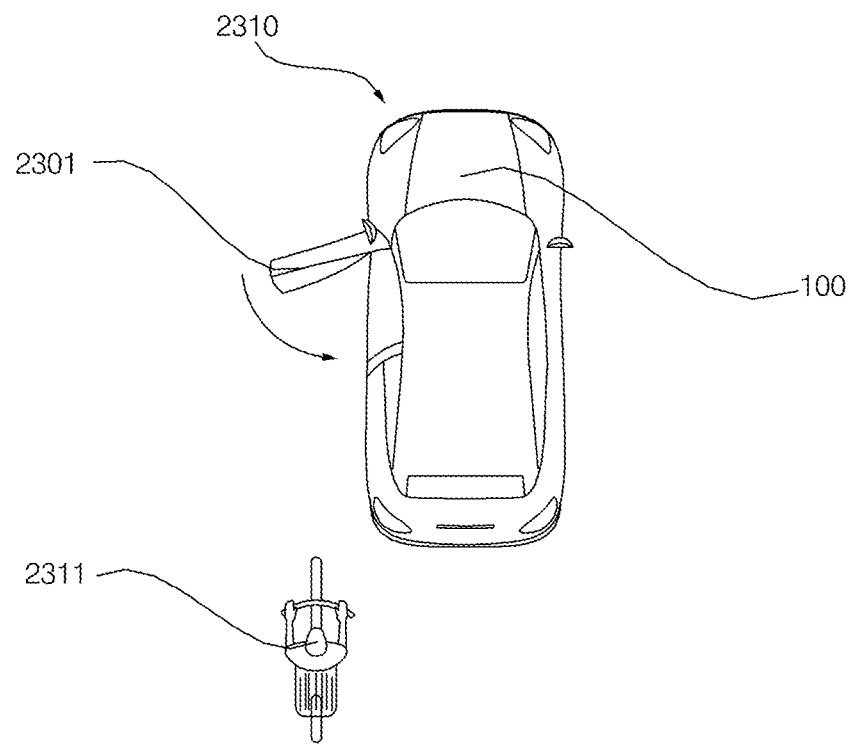
FIG. 23 is a diagram illustrating controlling of a moving part based on detection of an object.
Figure 23:
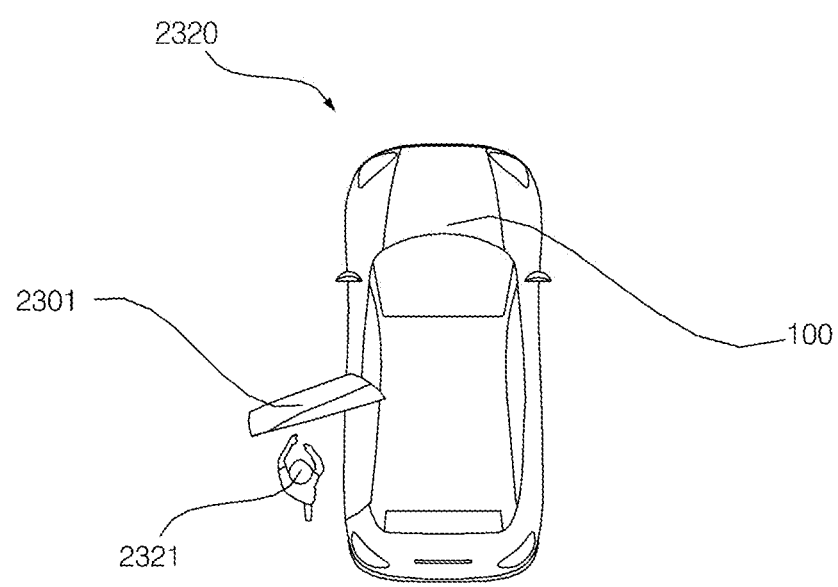

FIG. 23 is a diagram illustrating controlling of a moving part based on detection of an object.

Referring to FIG. 23, the processor 870 may control a moving part based on object detection information.

If it is determined that a distance between a detected object and the vehicle 100 is equal to or smaller than a reference value, the processor 870 may provide a signal to control a moving part.

For example, the moving part may include the left front door, the right front door, the left rear door, the right rear door, and the rearward door.

When information on opening movement of a moving part 2301 is received and a distance between a detected object 2311 and the vehicle 100 is equal to or smaller than a first reference value, as shown in an example indicated by reference numeral 2310, the processor 870 may provide a signal to close a moving part 2301.

When information on opening movement of a moving part 2301 is received and a distance between a detected object 2321 and the vehicle 100 is equal to or smaller than a second reference value, as shown in an example indicated by reference numeral 2320, the processor 870 may provide a signal to stop the moving part 2301 from being opened further.

When it is determined that Time to Collision (TTC) between a detected object and the vehicle 100 is equal to or smaller than a reference value, the processor 870 may provide a signal to control the moving part. Here, TTC may be determined by a relative distance of the vehicle 100 to the object and a speed of the vehicle 100 relative to the object.

If the vehicle 100 moves with a moving part left opened, the processor 870 may provide a signal to control movement of the vehicle 100 based on information on a detected object.

For example, if a distance between the detected object 2311 and the vehicle 100 is equal to or smaller than a reference value when the vehicle 100 moves forward or backwards with a moving part left opened, the processor 870 may provide a signal to stop the vehicle 100. In this case, the processor 870 may provide a signal to close the moving part 2301 or stop the moving part 2301 from being opened further.

Figure 24A:
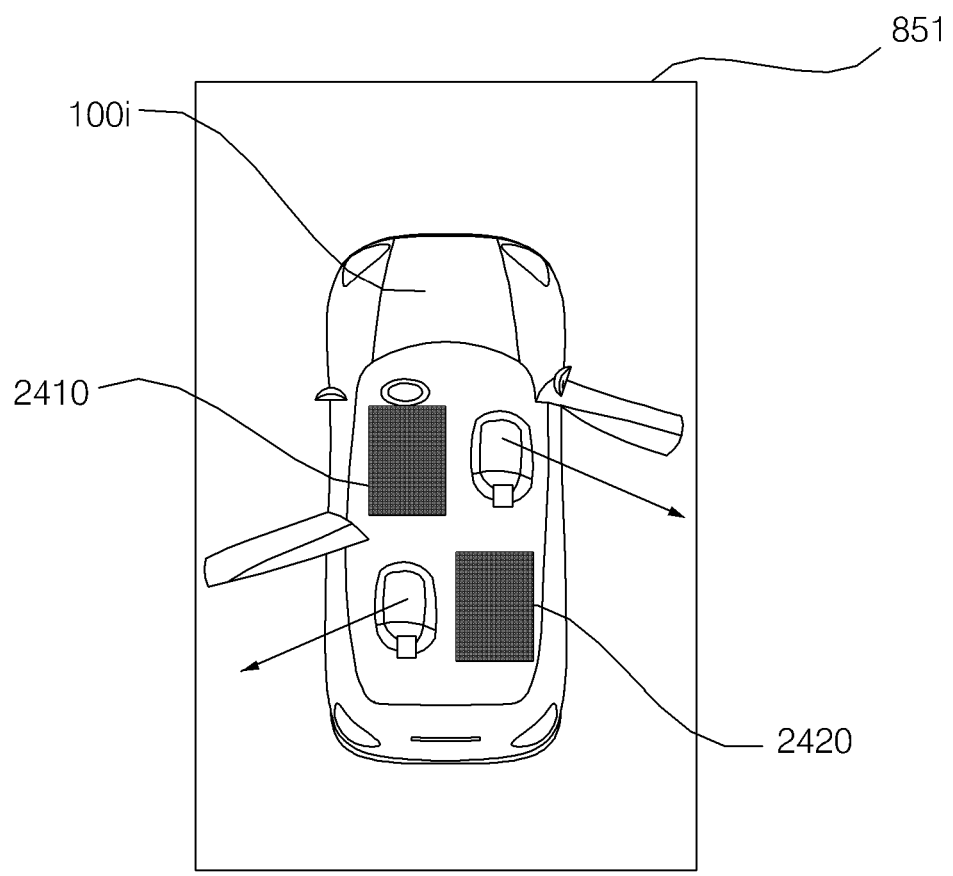
FIGS. 24A and 24B are diagrams illustrating seat occupancy information display.
Figure 24B:
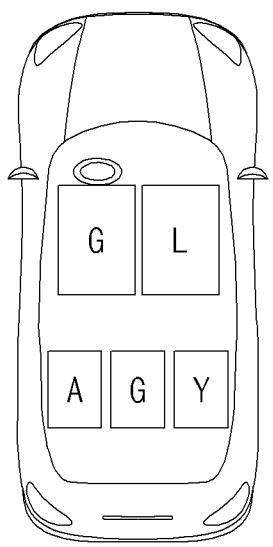

FIGS. 24A and 24B are diagrams illustrating seat occupancy information display.

The processor 870 may receive passenger boarding information, passenger disembarking information, and seat occupancy information.

The processor 870 may control the display unit 851 to output seat occupancy information.

The processor 870 may control the display unit 851 to display a graphic object corresponding to seat occupancy information in an around view image or a corrected around view image.

As illustrated in FIG. 24A, the processor 870 may acquire information indicating that the left front seat and the right rear seat are occupied by passengers. The processor 870 may display a plurality of seat images corresponding seats of the vehicle 100 to be overlaid on the vehicle image 100i of the around view image. The processor 870 may display a graphic object (indicator) on an occupied seat image among the plurality of seat images.

The processor 870 may classify an object that has occupied a seat. The processor 870 may display a graphic image corresponding to the classified object.

As illustrated in FIG. 24B, the processor 870 may classify a seat occupied object as general (G), load (L), infant or young child (Y), and animal (A). The processor 870 may acquire object information which is used to classify a seat occupied object. The user interface device 200 may determine a type of a seat occupied object via the internal camera 220. The processor 870 may receive information on the type of the object via the interface 880.

The processor 870 may display a plurality of seat images corresponding to seats of the vehicle 100 to be overlaid on the vehicle image 100i of the around view image. The processor 870 may display a text or icon, corresponding to classification of each seat occupied object, on the plurality of seat images.

FIGS. 25 to 27B are diagrams illustrating various autonomous parking maneuvers based on a corrected around view image.

Figure 25:
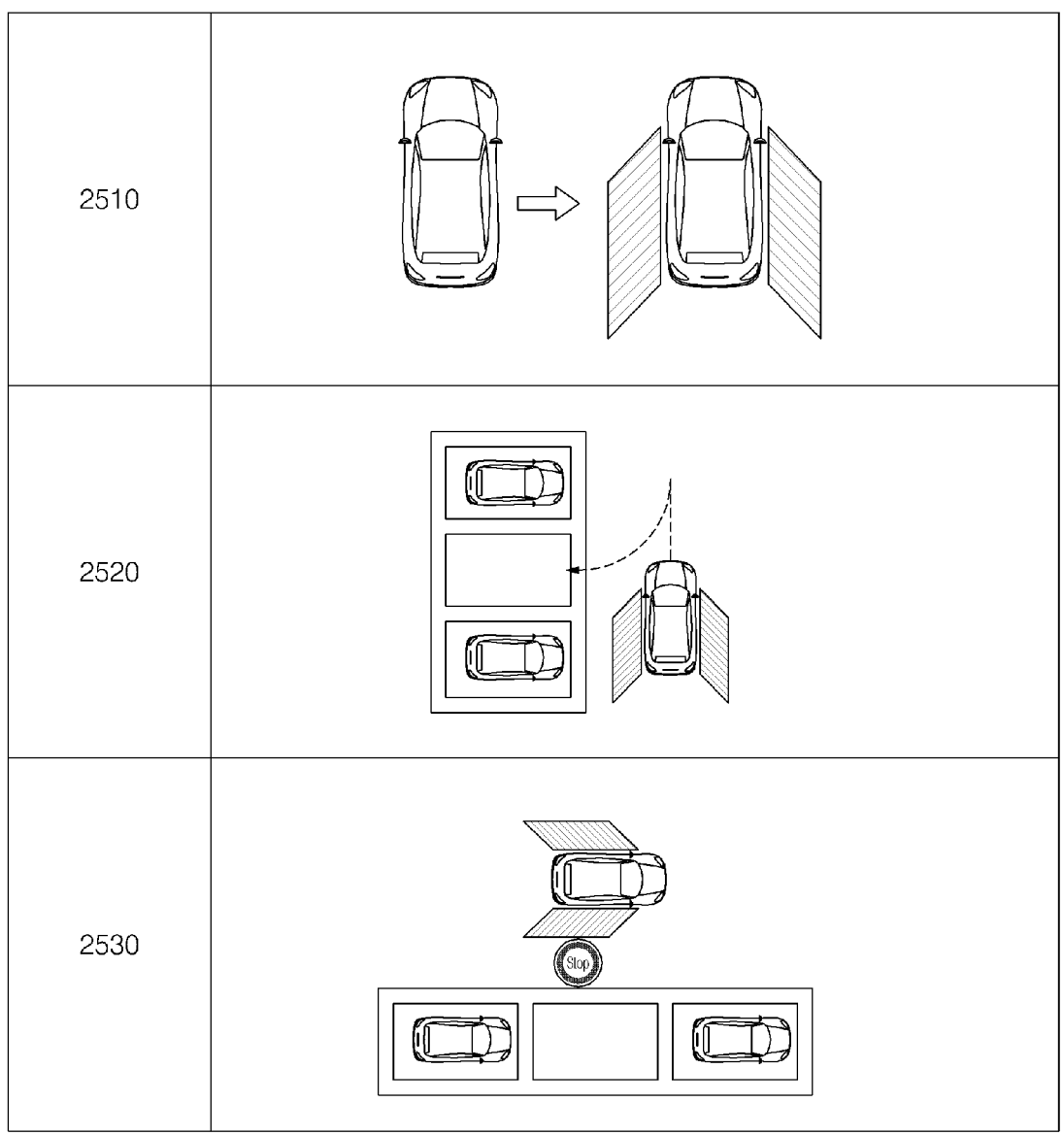
FIGS. 25 to 27B are diagrams illustrating various autonomous parking maneuvers based on a corrected around view image.

FIG. 25 shows an example of how to perform an autonomous parking maneuver when a side mirror is folded, according to an implementation.

As shown in an example indicated by reference numeral 2510, the processor 870 may output information about a state of folding movement of a side mirror. In this case, in response to folding movement of the side mirrors, the processor 870 may output movement information of cameras 811 and 812 attached to side mirrors.

The processor 870 may correct an around view image based on information on folding movement of the side mirrors. The processor 870 may control the display unit 851 to display the corrected around view image.

Then, as shown in an example indicated by reference numeral 2520, the processor 870 may provide a signal based on the corrected around view image to perform an autonomous parking maneuver.

Specifically, based on the corrected around view image, the processor 870 may detect a surrounding object and generate a parking path. Then, the processor 870 may perform the autonomous parking maneuver along the generated parking path.

If it is determined that a blind spot has been created, as shown in an example indicated by reference numeral 2530, the processor 870 may provide a control signal to stop performing the autonomous parking maneuver.

Figure 26A:
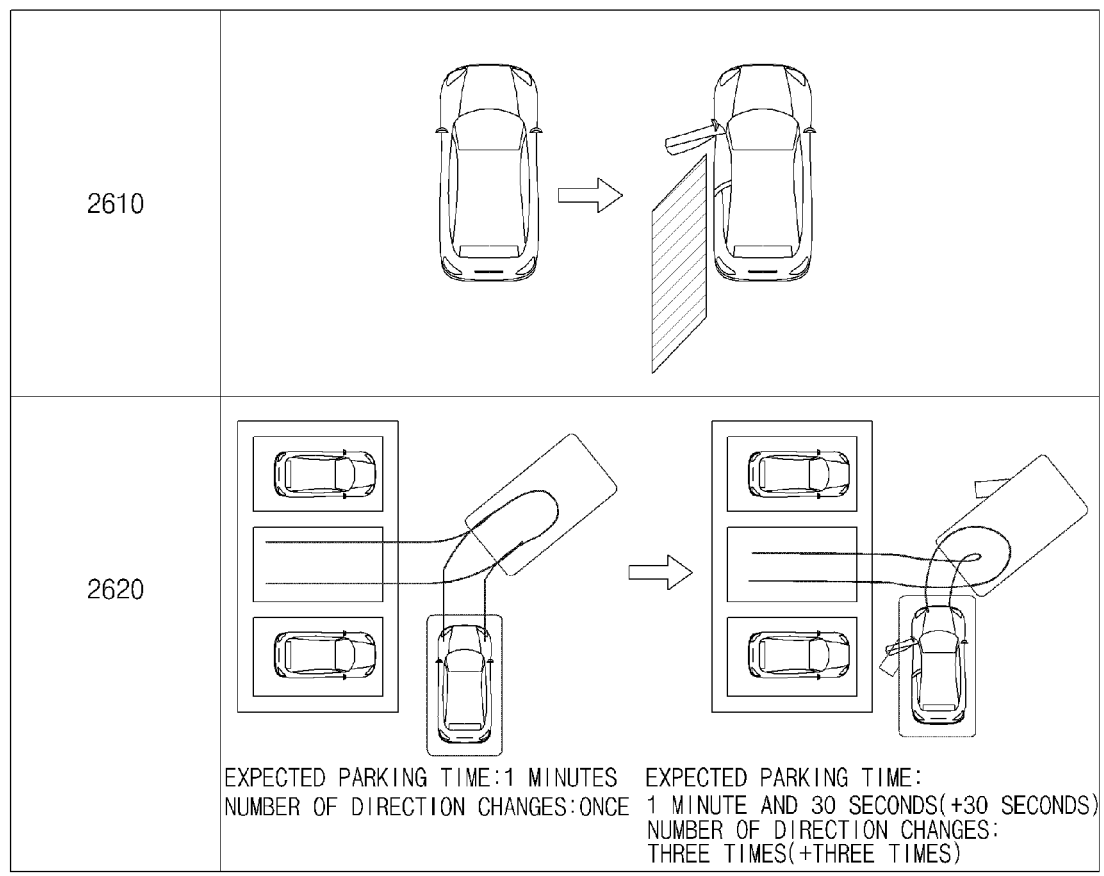
Figure 26B:
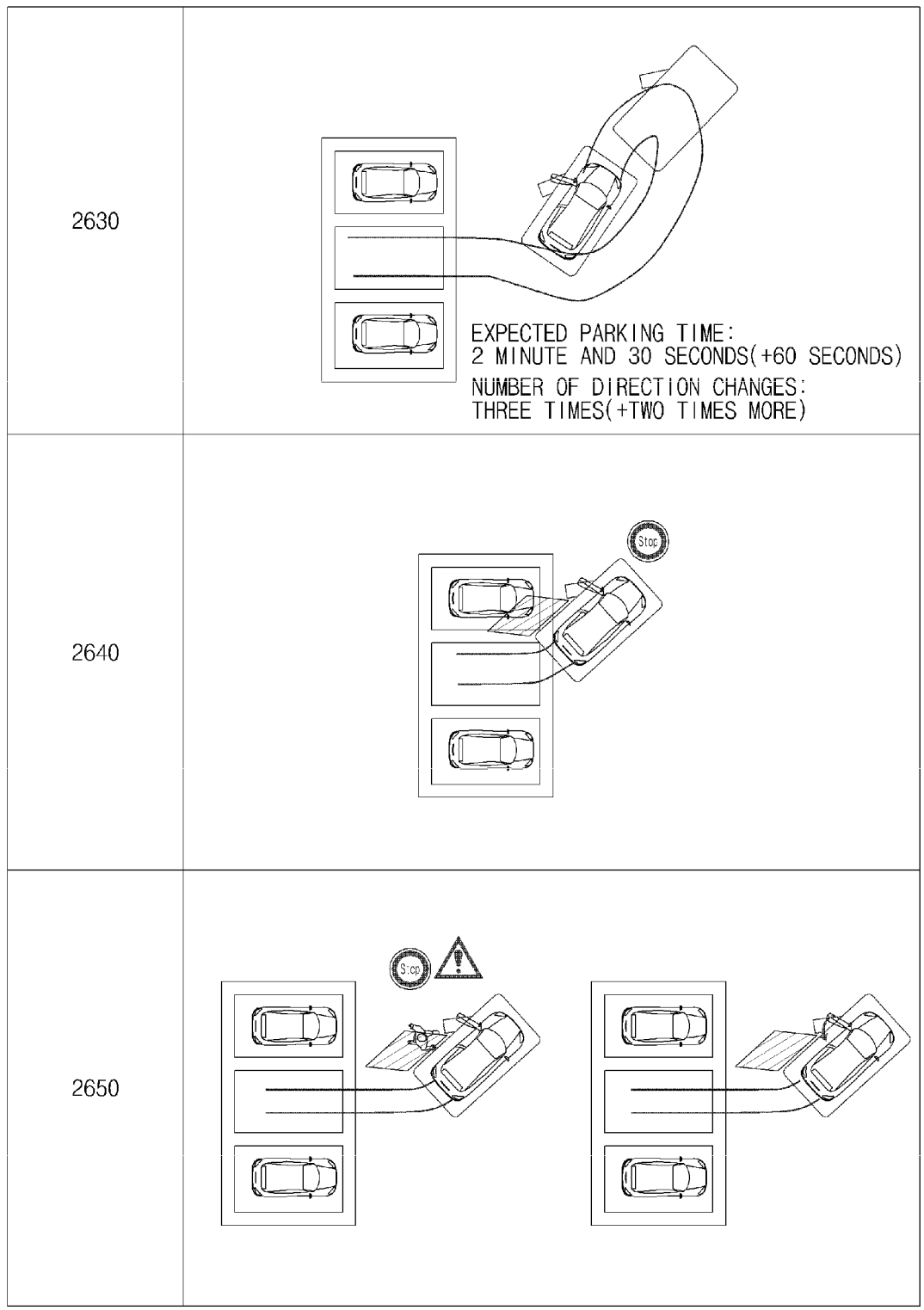

FIGS. 26A and 26B show examples of how to perform an autonomous parking maneuver when one of the left front door, the right front door, the left rear door, and the right rear door is opened, according to an implementation.

As shown in an example indicated by reference numeral 2610, the processor 870 may output information about a state of opening movement of a door. In this case, in response to door opening movement, the processor 870 may output movement information of the cameras 811 and 812 attached to doors.

The processor 870 may correct an around view image based on information on opening movement of a door. The processor 870 may control the display unit 851 to display the corrected around view image.

Meanwhile, a door may include at least one of the left front door, the right front door, the left rear door, and the right rear door.

Then, as shown in examples indicated by reference numerals 2620 and 2630, the processor 870 may generate a parking path based on a door-opened state.

For example, when it is necessary to park the vehicle 100 with the left rear door opened, the processor 870 may generate a parking path by taking into account an extended overall width of the vehicle 100.

Then, the processor 870 may perform an autonomous parking maneuver along the generated parking path.

Meanwhile, as the parking maneuver is performed with the door opened, the processor 870 may control the display unit 851 to output information that is changed compared to the case of performing the parking maneuver with the door closed.

For example, the processor 870 may control the display unit 851 to output parking direction information, information indicative of the number of direction changes, anticipated parking time information, all those information which are changed as the parking maneuver is performed with the door opened.

As shown in the example indicated by reference numeral 2620, the processor 870 may control the display unit 851 to display, in a comparative manner, information about performing a parking maneuver with the door left closed and information about parking in the door-opened state.

Alternatively, as shown in the example indicated by reference numeral 2630, the processor 870 may control the display unit 851 to display only the information about parking in the door-opened state.

If it is determined that opening movement of the door will lead to collision with a surrounding object, as shown in an example indicated by reference numeral 2640, the processor 870 may control the display unit 851 or the sound output unit 852 to output a warning to notify a possibility of collision.

In this case, the processor 870 may determine whether it is possible to close a door, based on an image(s) acquired by the plurality of camera 810 or the auxiliary camera 820.

If it is possible to close the door, the processor 870 may provide a control signal to close the door. Then, the processor 870 may provide a control signal to continue performing the autonomous parking maneuver.

As shown in an example indicated by reference numeral 2650, the processor 870 may determine whether a passenger's body or a load is out of the vehicle 100 through an opened door, based on an image(s) acquired by the plurality of camera 810 or the auxiliary camera 820.

If it is determined that the passenger's body or the load is out of the vehicle 100, the processor 870 may provide a control signal to stop performing the autonomous parking maneuver.

After a while, if it is determined that the passenger's body or the load is not out of the vehicle 100, the processor 870 may provide a control signal to continue performing the autonomous parking maneuver.

Figure 27A:
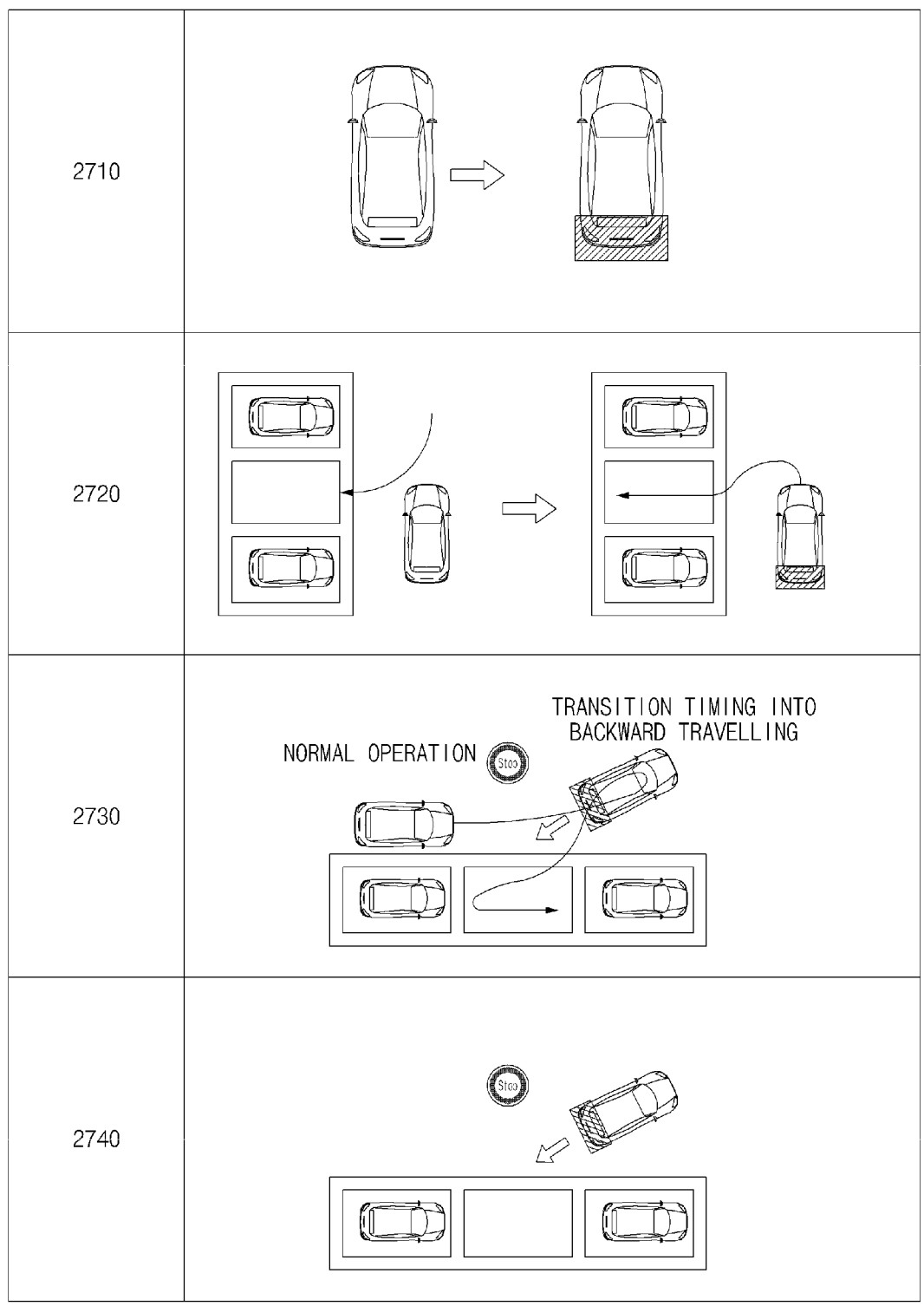
Figure 27B:
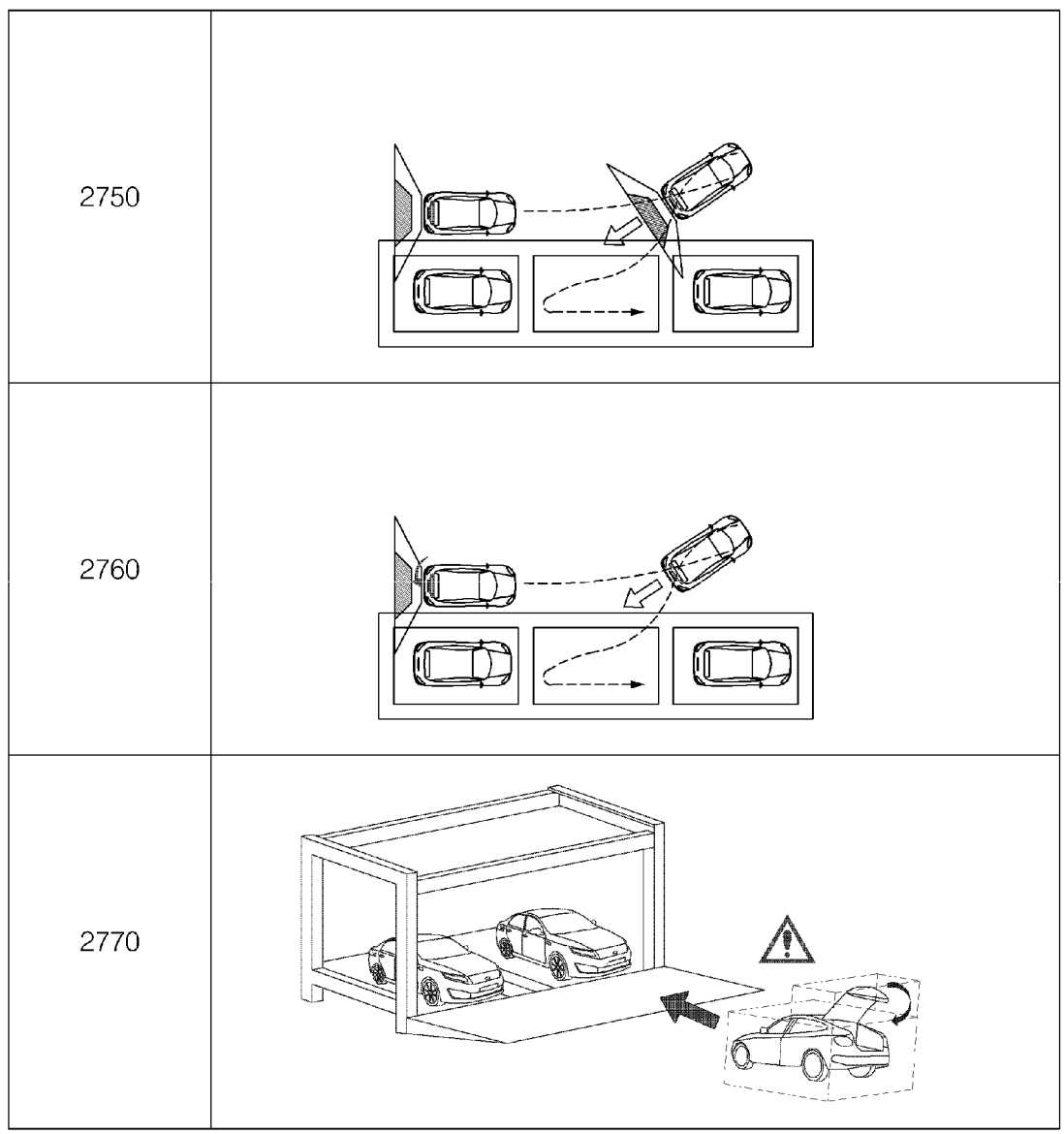

FIGS. 27A and 27B show examples of how to perform an autonomous parking maneuver when a rearward door is opened, according to an implementation of the preset disclosure.

As shown in an example indicated by reference numeral 2710, the processor 870 may output information about a state of opening movement of the rearward door. In this case, in response to opening movement of the rearward door, the processor 870 may output movement information of the camera 813 attached to the rearward door.

The processor 870 may correct an around view image based on information on opening movement of the rearward door. The processor 870 may control the display unit 851 to display the corrected around view image.

Then, as shown in an example indicated by reference numeral 2720, the processor 870 may generate a parking path based on the rearward door-opened state.

For example, when a parking maneuver is performed with the rearward door opened, a blind spot is created in the area to the rear of the vehicle 100. In this case, the processor 870 may provide a control signal to minimize backward travel of the vehicle 100 during the parking maneuver.

When the vehicle 100 can be parked simply by travelling forward, the processor 870 may generate a parking path composed only of forward travel. The processor 870 may provide a control signal to park the vehicle 100 along the generated parking path.

If information on opening movement of the rearward door is received when the vehicle 100 is forward travelling during the parking maneuver, as shown in an example indicated by reference numeral 2730, the processor 870 may provide a control signal to stop performing the parking maneuver at a time when the vehicle 100 changes a direction of travel from a forward direction to a backward direction. In this case, the processor 870 may control the display unit 851 to output a request for closing the rearward door. In some implementations, the processor 870 may provide a control signal to close the rearward door. When the rearward door is closed, the processor 870 may provide a control signal to continue performing the parking maneuver.

If information on opening movement of the rearward door is received when the vehicle 100 is travelling backward during the parking maneuver, as shown in an example indicated by reference numeral 2740, the processor 870 may display the display unit 851 to output a request for closing the rearward door. In some implementations, the processor 870 may provide a control signal to close the rearward door. When the rearward door is closed, the processor 870 may provide a control signal to continue performing the parking maneuver.

If a blind spot has not been created by movement of the camera 813, as shown in an example indicated by reference numeral 2750, the processor 870 may provide a control signal to continue performing the parking maneuver even when the rearward door is opened.

As shown in an example indicated by reference numeral 2760, the processor 870 may determine whether it is possible to close the rearward door, based on an image(s) acquired by the plurality of cameras 810 or the auxiliary camera 820.

If it is possible to close the rearward door, the processor 870 may provide a control signal to close the rearward door. If the rearward door is closed, the processor 870 may provide a control signal to continue performing the parking maneuver.

As shown in an example indicated by reference numeral 2770, the processor 870 may determine whether it is possible to park the vehicle 100 in the back-door opened state, based on an image(s) acquired by the plurality of cameras 810 and the auxiliary camera 820.

When it is not possible to park the vehicle 100 due to an expected collision with an object, the processor 870 may provide a control signal to stop performing the parking maneuver.

The processor 870 may control the display unit 851 or the sound output unit 852 to output a warning to notify a possibility of collision with the object.

Then, the processor 870 may determine whether it is possible to park the vehicle 100 with the rearward door left closed, based on an image(s) acquired by the plurality of cameras 81- or the auxiliary camera 820.

When it is possible to park the vehicle 100, the processor 870 may control the display unit 851 to output a request for closing the rearward door. In some implementations, the processor 870 may provide a control signal to close the rearward door. When the rearward door is closed, the processor 870 may provide a control signal to continue performing the parking maneuver.

Figure 28:
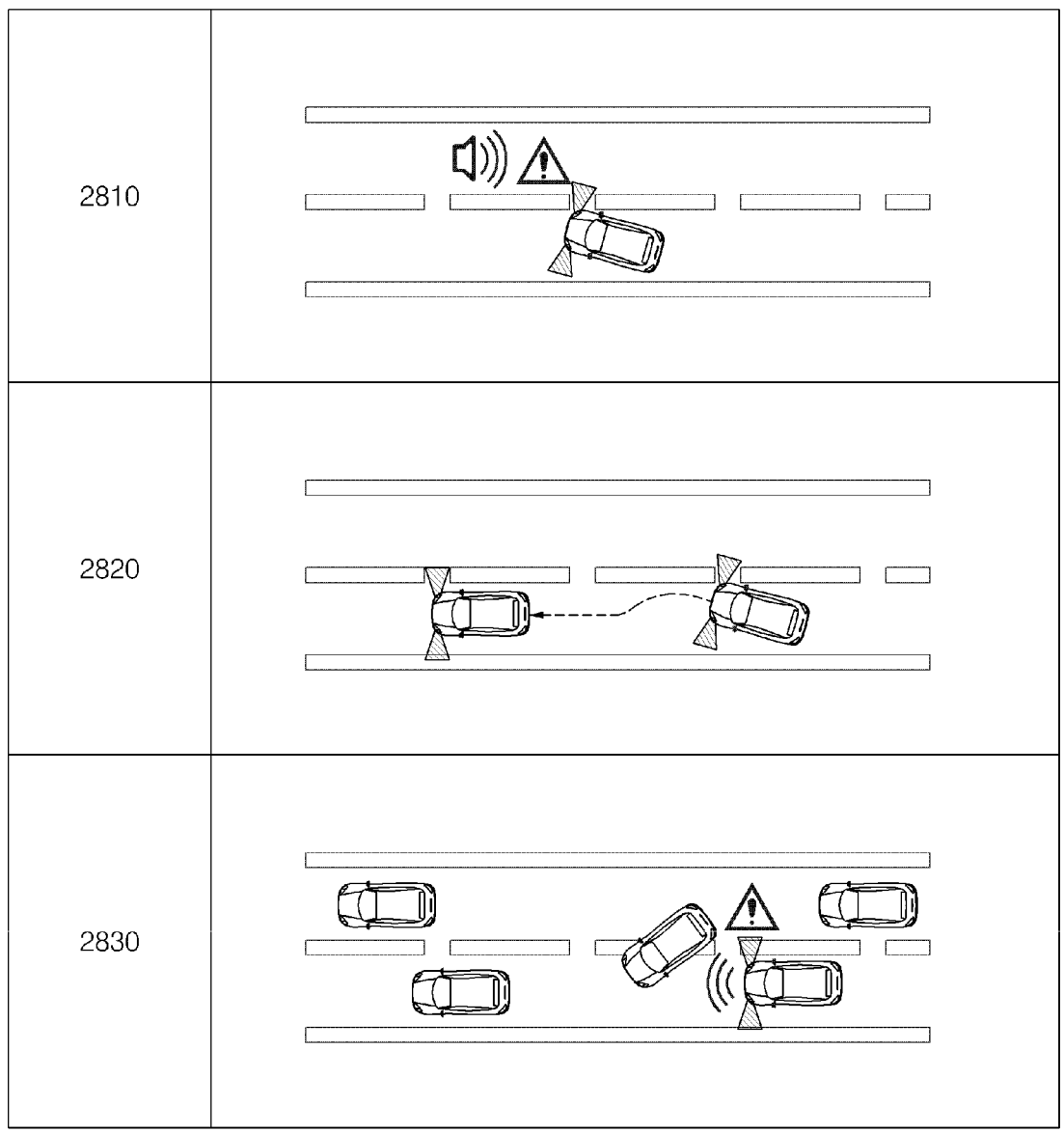
FIGS. 28 and 29 are diagrams illustrating various driver assistance operations based on a corrected around view image.
Figure 29:
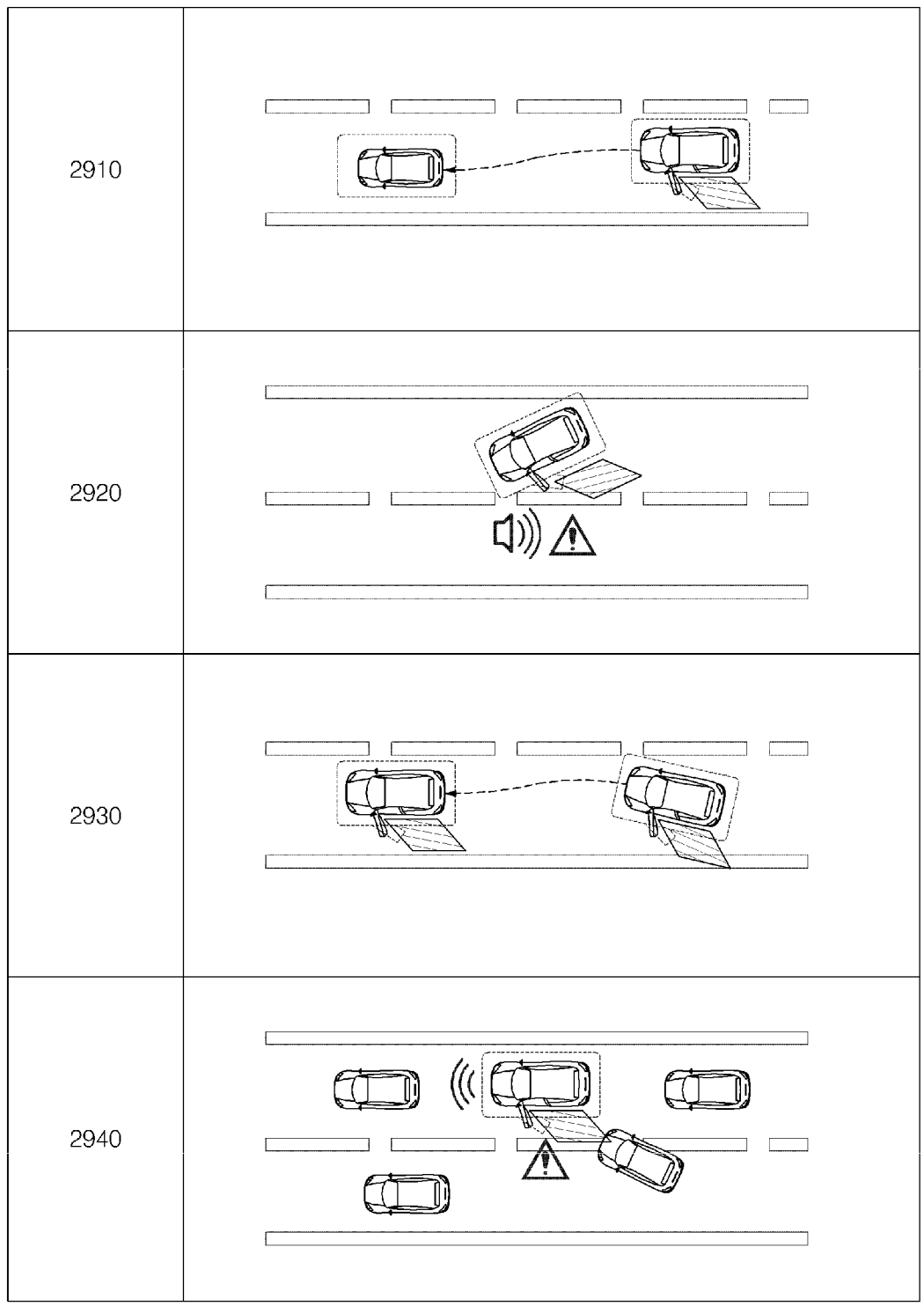

FIGS. 28 and 29 are diagrams illustrating various driver assistance operations based on a corrected around view image.

Referring to FIG. 28, the processor 870 may output information about a state of folding movement of a side mirror. In this case, in response to folding movement of the side mirrors, the processor 870 may output movement information of the cameras 811 and 812 attached to the side mirrors.

The processor 870 may correct an around view image based on information on folding movement of the side mirrors. The processor 870 may control the display unit 851 to display the corrected around view image.

The processor 870 may detect a line based on the corrected around view image. The processor 870 may perform a driving assist function based on the detected line.

As shown in an example indicated by reference numeral 2810, the processor 870 may provide a control signal based on a corrected around view image to perform a Lane Departure Warning System (LDWS) function.

As shown in an example indicated by reference numeral 2820, the processor 870 may provide a control signal based on a corrected around view image to perform a Lane Keeping Assist System (LKAS) function.

As shown in an example indicated by reference numeral 2830, the processor 870 may provide a control signal based on a corrected around view image to perform a Traffic Jam Assistant (TJA) function.

Referring to FIG. 29, the processor 870 may output information about a state of opening movement of a door. In this case, in response to the opening movement of doors, the processor 870 may output movement information of the cameras 811 and 812 attached to the doors.

The processor 870 may correct an around view image based on information on the opening movement of the doors. The processor 870 may control the display unit 851 to display the corrected around view image.

Meanwhile, a door may include at least one of the left front door, the right front door, the left rear door, the right rear door, and the rearward door.

As shown in an example indicated by reference numeral 2910, the processor 870 may determine whether it is possible to close a door, based on an image(s) acquired by the plurality of cameras 810 or the auxiliary camera 820.

If it is possible to close the door, the processor 870 may provide a control signal to close the door.

As shown in an example indicated by reference numeral 2920, the processor 870 may provide a control signal to perform a LDWS function by taking into account an extended overall width of the vehicle 100.

When the door is opened as shown in an example indicated by reference 2930, the processor 870 may provide a control signal to perform a Lane Keeping Assist system (LKAS) function by taking into account an extended overall width of the vehicle 100. In this case, the processor 870 may provide a control signal, so that the vehicle 100 travels along the center of a lane with the door opened. That is, the processor 870 may determine the center of the overall width of the vehicle 100, when the door is opened. The processor 870 may provide a control signal, to match the determined center of the overall width of the vehicle 100 with the center of the lane.

When the door is opened as shown in an example indicated by 2940, the processor 870 may provide a control signal to perform a Traffic Jam Assistant (TJA) function by taking into account an increased volume of the vehicle 100.

Figure 30:
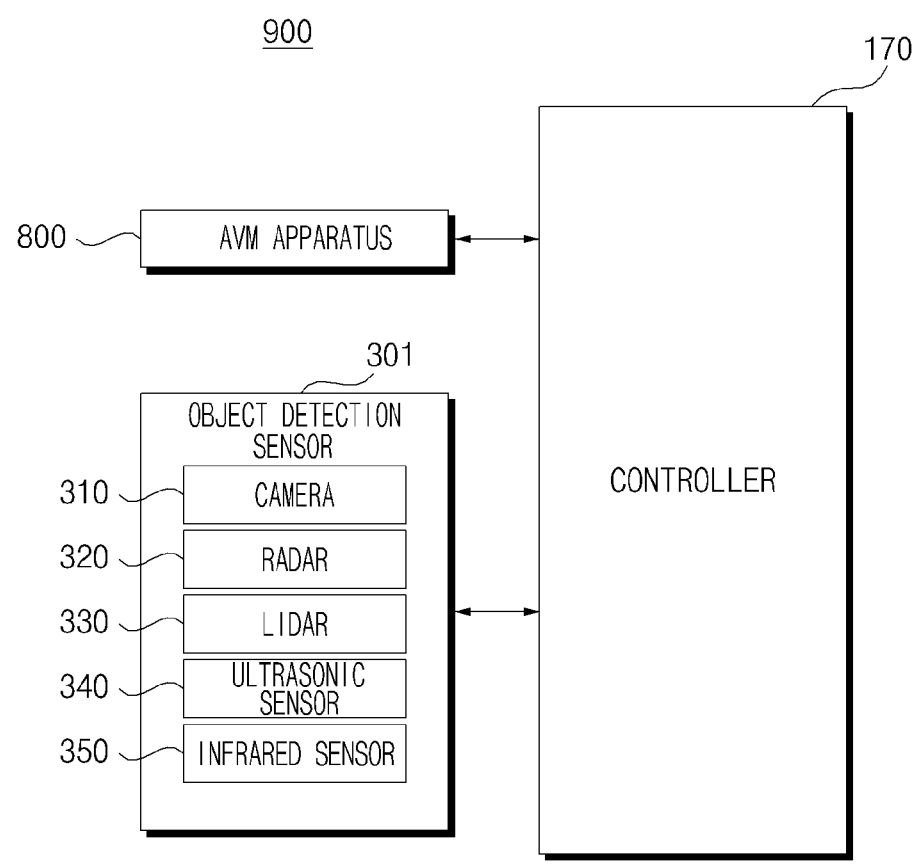
FIG. 30 is a block diagram illustrating subsystems of an example of a driving control apparatus.

FIG. 30 is a block diagram illustrating subsystems of an example of a driving control apparatus.

The vehicle 100 may include an operation system (indicated by reference numeral 700 in FIG. 7). The operation system 700 may be referred to as a driving control apparatus.

Unlike the example shown in FIG. 7, the operation system may include an AVM apparatus 800, an object detection sensor 301, and a controller 170.

The AVM apparatus 800 may be the same as the AVM apparatus described above with reference to FIGS. 1 to 29.

In particular, the AVM apparatus may detect a surrounding based on a corrected around view image. Based on information on the surrounding object, the AVM apparatus 800 may provide a first control signal to control movement of the vehicle 100.

The object detection sensor 301 may include at least one of the camera 310, the radar 320, the lidar 330, the ultrasonic sensor 340, and the infrared sensor 350.

The object detection sensor 310 may detect a surrounding object and generate information on the object.

The controller 170 may generate a second control signal based on the information on the object to control movement of the vehicle 100. The controller 170 may generate a control signal to drive the vehicle 100, park the vehicle 100 out of a parking space, or park the vehicle 100.

The controller 170 may control the vehicle drive device 600 to cause the vehicle 100 to move based on the first control signal and a second control signal.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus configured to provide a view around a vehicle, the apparatus comprising:
    a plurality of cameras attached to a body of the vehicle and configured to acquire respective images of surroundings of the vehicle, wherein at least one of the plurality of cameras is attached to a movable part of the body of the vehicle;
    a display unit; and
    at least one processor configured to:
        obtain movement information of the movable part of the body of the vehicle;
        generate an around view image by compositing respective images acquired by the plurality of cameras;
        correct the around view image based on the movement information of the movable part of the body of the vehicle; and
        control the display unit to display the corrected around view image,
    wherein the at least one processor is further configured to:
    correct, based on the movement information of the movable part of the body of the vehicle, the around view image by modifying a composition region of an image acquired by a camera attached to the movable part of the body of the vehicle and moved in a direction opposite to a direction of the movement of the movable part of the body of the vehicle, and
    wherein the composition region is a portion of the image used for generating the around view image.

2. The apparatus of claim 1, wherein the at least one processor is configured to control the display unit to display a correction status of the around view image.

3. The apparatus of claim 1, wherein the at least one processor is configured to:
    determine that a blind spot is created in the around view image due to a movement of the movable part; and
    highlight a region in the corrected around view image, wherein the region corresponds to the blind spot.

4. The apparatus of claim 1, further comprising a camera position adjustment unit configured to adjust respective positions of the plurality of cameras,
    wherein the at least one processor is configured to adjust, based on the movement information of the movable part, the respective positions of the plurality of cameras through the camera position adjustment unit.

5. The apparatus of claim 4, wherein:
    the plurality of cameras comprises a first camera attached to the movable part,
    the camera position adjustment unit comprises a first drive unit configured to adjust a position of the first camera, and
    the at least one processor is configured to:

acquire first movement information indicating a movement of the movable part in a first direction; and
based on the first movement information, control the first drive unit to move the first camera in a second direction opposite to the first direction.

6. The apparatus of claim 5, wherein the at least one processor is configured to:
determine a first speed at which the movable part moves in the first direction; and
control the first drive unit to move the first camera in the second direction at a second speed that corresponds to the first speed of the movable part moving in the first direction.

7. The apparatus of claim 1, further comprising an auxiliary camera configured to acquire an auxiliary image,
wherein the at least one processor is configured to:
acquire the auxiliary image based on a detection of movement of the movable part; and
correct the around view image by compositing the auxiliary image.

8. The apparatus of claim 1, wherein the at least one processor is configured to control the display unit to display information associated with a state of movement of the movable part.

9. The apparatus of claim 1, wherein:
the movable part comprises a left side mirror and a right side mirror,
the plurality of cameras comprises a first camera attached to the left side mirror and a second camera attached to the right side mirror, and
the at least one processor is configured to correct the around view image based on respective movement information of the left side mirror and the right side mirror.

10. The apparatus of claim 9, wherein the at least one processor is configured to:
determine that a blind spot is created in the around view image due to respective folding movements of the left side mirror and the right side mirror, and
highlight a region in the corrected around view image, wherein the region corresponds to the blind spot.

11. The apparatus of claim 9, wherein the at least one processor is configured to correct the around view image by modifying a first composition region of a first image acquired by the first camera based on a folding movement of the left side mirror and by modifying a second composition region of a second image acquired by the second camera based on a folding movement of the right side mirror, wherein the first and second composition regions are respective portions of the first and second images used for generating the around view image.

12. The apparatus of claim 9, further comprising a camera position adjustment unit configured to adjust respective positions of the plurality of cameras,
wherein the camera position adjustment unit comprises a first drive unit configured to adjust a position of the first camera and a second drive unit configured to adjust a position of the second camera, and
wherein the at least one processor is configured to:
control the first drive unit to move the first camera based on a folding movement of the left side mirror; and
control the second drive unit to move the second camera based on a folding movement of the right side mirror.

13. The apparatus of claim 12, wherein the at least one processor is configured to:
control the first drive unit to move the first camera in a direction opposite to a direction of the folding movement of the left side mirror; and
control the second drive unit to move the second camera in a direction opposite to a direction of the folding movement of the right side mirror.

14. The apparatus of claim 13, wherein the at least one processor is configured to:
determine a first speed of the folding movement of the left side mirror and a second speed of the folding movement of the right side mirror;
control the first drive unit to move the first camera at a third speed that corresponds to the first speed of the folding movement of the left side mirror; and
control the second drive unit to move the second camera at a fourth speed that corresponds to the second speed of the folding movement of the right side mirror.

15. The apparatus of claim 9, wherein the at least one processor is configured to control the display unit to display information associated with respective states of folding movement of the left side mirror and the right side mirror.

16. The apparatus of claim 1, wherein:
the movable part comprises a left front door and a right front door;
the plurality of cameras comprises a first camera attached to the left front door and a second camera attached to the right front door; and
the at least one processor is configured to correct the around view image based on respective movement information of the left front door and the right front door.

17. The apparatus of claim 16, wherein the at least one processor is configured to:
determine that a blind spot is created in the around view image due to respective opening movements of the left front door and the right front door; and
highlight a region in the corrected around view image, wherein the region corresponds to the blind spot.

18. The apparatus of claim 16, wherein the at least one processor is configured to correct the around view image by modifying a first composition region of a first image acquired by the first camera based on an opening movement of the left front door and by modifying a second composition region of a second image acquired by the second camera based on an opening movement of the right front door, wherein the first and second composition regions are respective portions of the first and second images used for generating the around view image.

19. The apparatus of claim 16, wherein the at least one processor is configured to control the display unit to display information associated with respective states of opening movement of the left front door and the right front door.

20. The apparatus of claim 16, further comprising:
a first auxiliary camera configured to acquire a first auxiliary image of a left side area of the vehicle; and
a second auxiliary camera configured to acquire a second auxiliary image of a right side area of the vehicle,
wherein the at least one processor is configured to:
acquire the first and second auxiliary images based on a detection of respective opening movements of the left front door and the right front door; and
correct the around view image by compositing the first and second auxiliary images.

21. The apparatus of claim 20, wherein:
the first auxiliary camera is attached to an inner surface of the left front door or to a left rocker panel, and the second auxiliary camera is attached to an inner surface of the right front door or to a right rocker panel.

22. The apparatus of claim 16, wherein:
the at least one processor is configured to:
acquire movement information associated with respective opening movements of a left rear door and a right rear door;
determine that a blind spot is created in the around view image due to respective opening movements of the left rear door and the right rear door; and
highlight a region in the corrected around view image, wherein the region corresponds to the blind spot.

23. The apparatus of claim 22, wherein the at least one processor is configured to control the display unit to display information associated with respective states of opening movement of the left rear door and the right rear door.

24. The apparatus of claim 22, further comprising:
a third auxiliary camera configured to acquire a third auxiliary image of a left side area of a vehicle; and
a fourth auxiliary camera configured to acquire a fourth auxiliary image of a right side area of the vehicle,
wherein the at least one processor is configured to:
acquire the third and fourth auxiliary images based on a detection of respective opening movements of the left rear door and the right rear door; and
correct the around view image by compositing the third and fourth auxiliary images.

25. The apparatus of claim 24, wherein:
the third auxiliary camera is attached to an inner surface of the left rear door or to a left rocker panel, and
the fourth auxiliary camera is attached to an inner surface of the right rear door or to a right rocker panel.

26. The apparatus of claim 1, wherein:
the movable part comprises a rearward door,
the plurality of cameras comprises a third camera attached to the rearward door, and
the at least one processor is configured to correct the around view image based on movement information of the rearward door.

27. The apparatus of claim 26, wherein the at least one processor is configured to:
determine that a blind spot has been created in the around view image due to an opening movement of the rearward door; and
highlight a region in the corrected around view image, wherein the region corresponds to the blind spot.

28. The apparatus of claim 26, wherein the at least one processor is configured to, based on an opening movement of the rearward door, correct the around view image by modifying a composition region of a third image acquired by the third camera, wherein the composition region is a portion of the third image used for generating the around view image.

29. The apparatus of claim 28, wherein the at least one processor is configured to correct the around view image by scaling the third image based on the opening movement of the rearward door.

30. The apparatus of claim 26, further comprising a camera position adjustment unit configured to adjust respective positions of the plurality of cameras,
wherein the camera position adjustment unit comprises a third drive unit configured to adjust a position of the third camera, and
wherein the at least one processor is configured to control the third drive unit to move the third camera based on an opening movement of the rearward door.

31. The apparatus of claim 30, wherein the at least one processor is configured to, based on the opening movement of the rearward door, control the third drive unit to rotate the third camera in a direction opposite to a direction of the opening movement of the rearward door.

32. The apparatus of claim 31, wherein the at least one processor is configured to:
determine a speed of the opening movement of the rearward door; and
control the third drive unit to move the third camera at a speed proportional to the speed of the opening movement of the rearward door.

33. The apparatus of claim 26, wherein the at least one processor is configured to control the display unit to display information associated with a state of movement of the rearward door.

* * * * *